(12) United States Patent
Nakanishi

(10) Patent No.: US 8,416,501 B2
(45) Date of Patent: Apr. 9, 2013

(54) IMAGE DISPLAY APPARATUS AND METHOD OF CONTROLLING THE SAME

(75) Inventor: Hiroyuki Nakanishi, Yokohama (JP)

(73) Assignee: Canon Kabushiki Kaisha (JP)

( * ) Notice: Subject to any disclaimer, the term of this patent is extended or adjusted under 35 U.S.C. 154(b) by 645 days.

(21) Appl. No.: 12/538,517

(22) Filed: Aug. 10, 2009

(65) Prior Publication Data

US 2010/0033791 A1 Feb. 11, 2010

(30) Foreign Application Priority Data

Aug. 11, 2008 (JP) ................. 2008-207401

(51) Int. Cl.
*G02B 27/14* (2006.01)
*G09G 5/00* (2006.01)

(52) U.S. Cl.
USPC .............................. 359/633; 345/7

(58) Field of Classification Search ........ 359/13, 359/630, 633, 196.1–226.3; 347/7–9
See application file for complete search history.

(56) References Cited

U.S. PATENT DOCUMENTS

| 7,206,135 | B2 | 4/2007 | Yamazaki | |
| 2003/0021497 | A1* | 1/2003 | Kandori et al. | 382/323 |
| 2006/0119952 | A1* | 6/2006 | Yamazaki | 359/630 |

FOREIGN PATENT DOCUMENTS

| JP | 11-095144 | A | 4/1999 |
| JP | 2004-517350 | T | 6/2004 |
| JP | 2004527793 | A | 9/2004 |
| JP | 2006-162780 | A | 6/2006 |
| JP | 2006-220745 | A | 8/2006 |
| WO | 02/37163 | A1 | 5/2002 |
| WO | 02086588 | A1 | 10/2002 |

\* cited by examiner

*Primary Examiner* — Alessandro Amari
*Assistant Examiner* — Kimberly N Kakalec
(74) *Attorney, Agent, or Firm* — Rossi, Kimms & McDowell LLP

(57) ABSTRACT

An image display apparatus generates a first light beam and a second light beam corresponding to image signals for the eyes of an observer, and makes the first light beam and the second light beam incident on a reflection surface which makes a reciprocating rotation about a first axis, thereby generating first and second scanning light beams to scan in a lateral direction. Images observable by the eyes of the observer are formed based on the first and second scanning light beams. Control is performed to reflect the first light beam and generate the first scanning light beam while the reflection surface rotates in the first direction of the reciprocating rotation and reflect the second light beam and generate the second scanning light beam while the reflection surface rotates in the second direction opposite to the first direction.

13 Claims, 36 Drawing Sheets

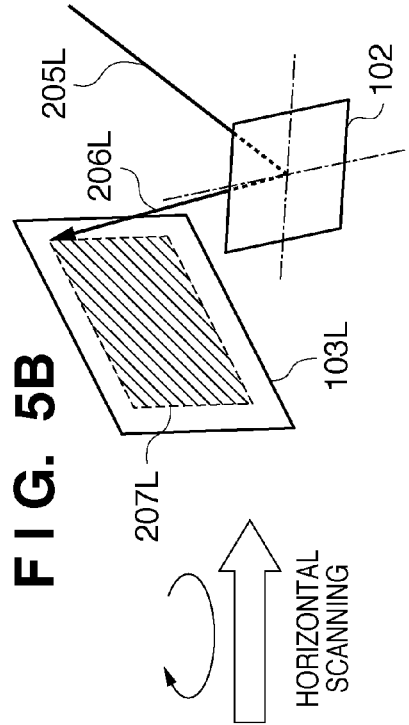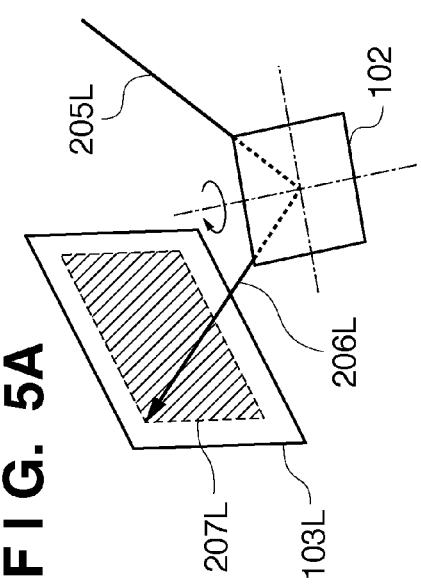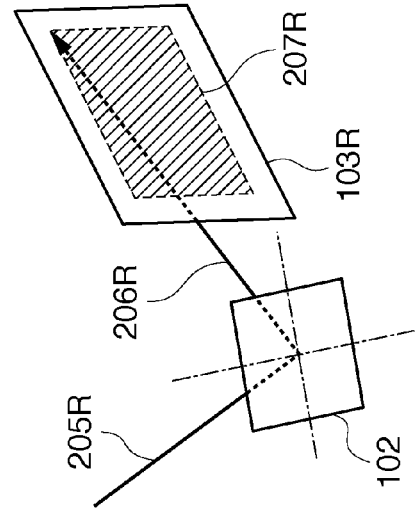

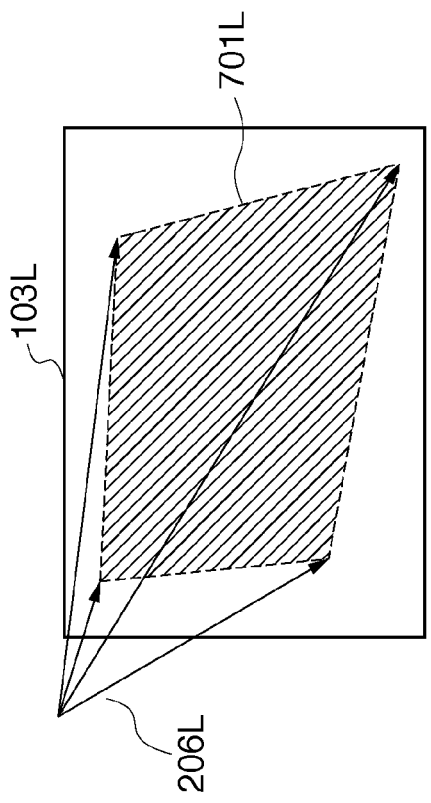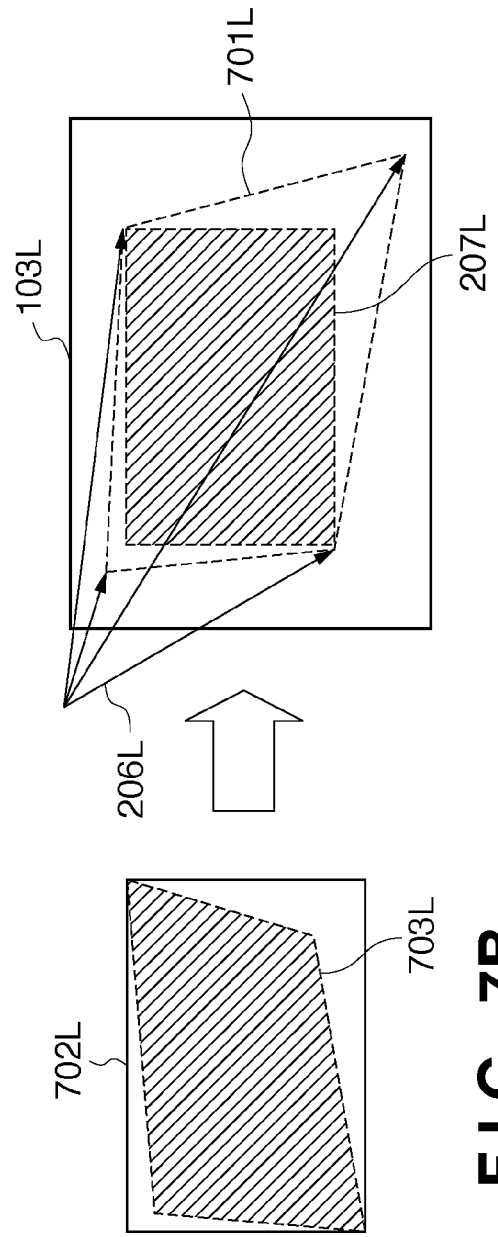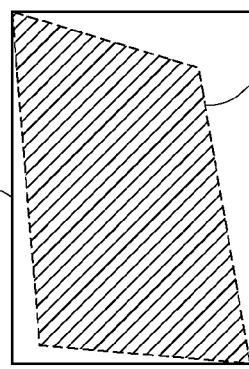

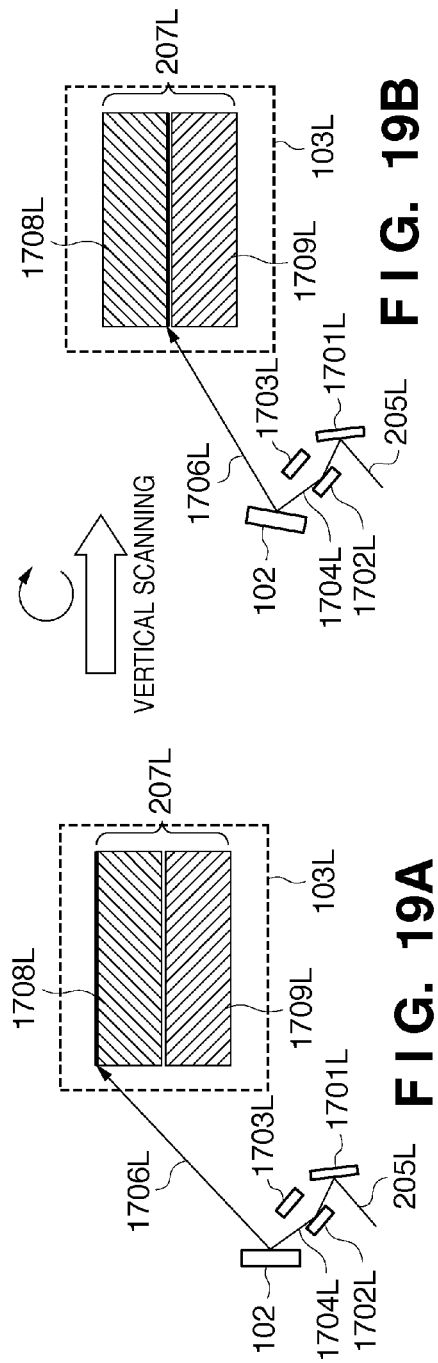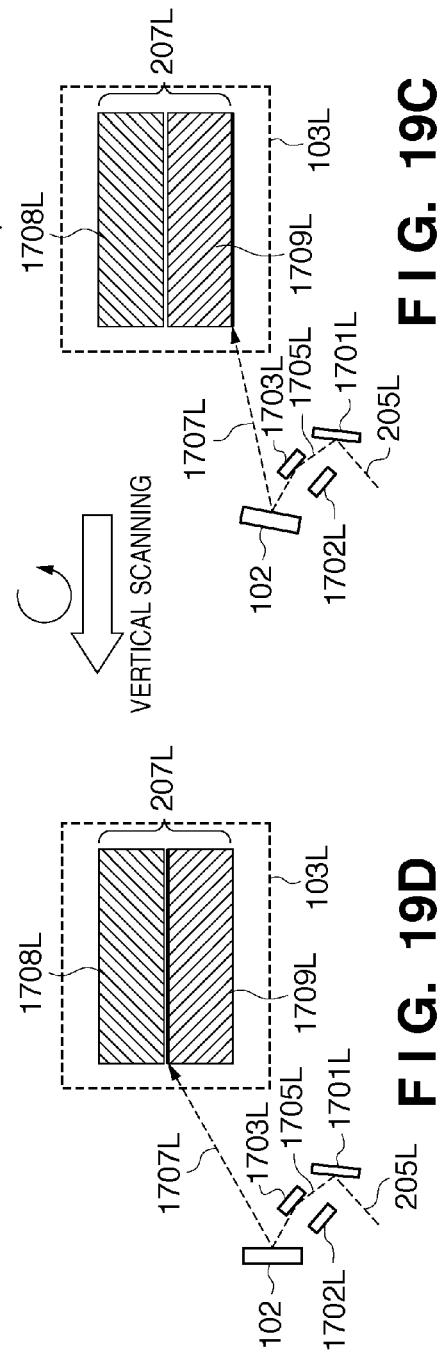

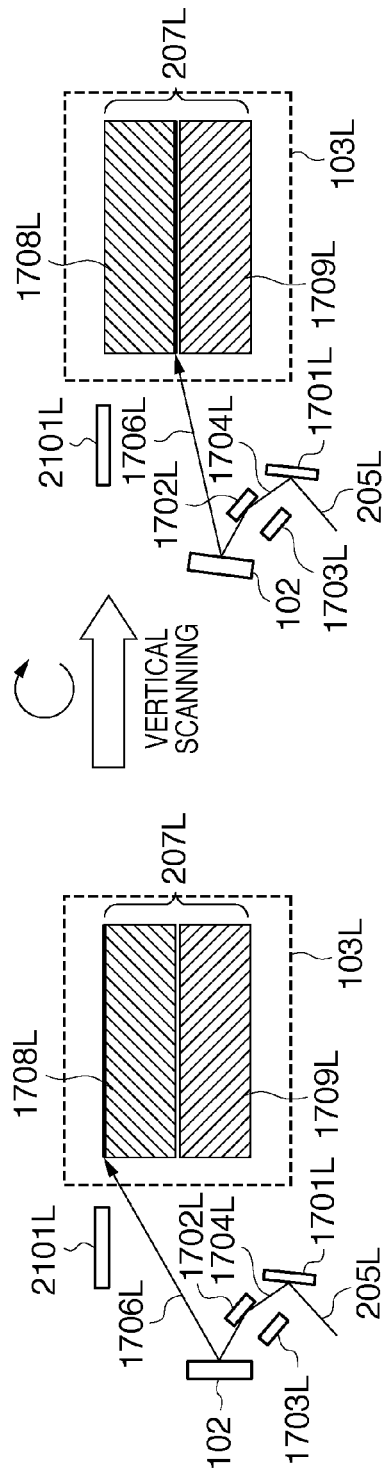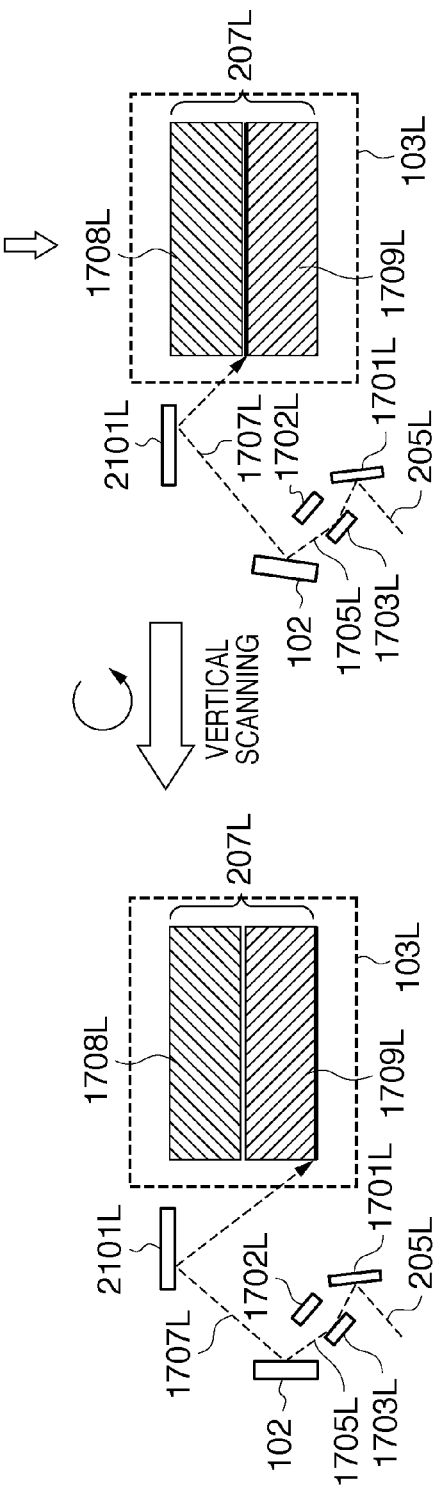
FIG. 23A  FIG. 23B  FIG. 23C  FIG. 23D

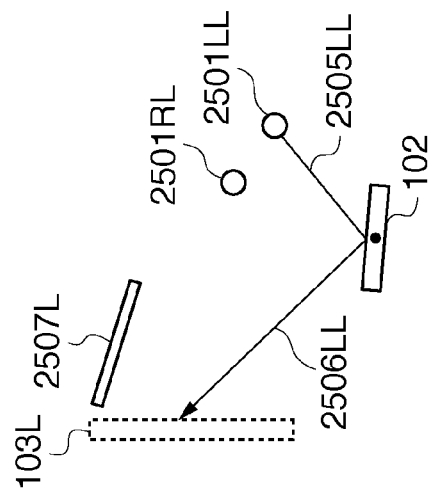
FIG. 28A
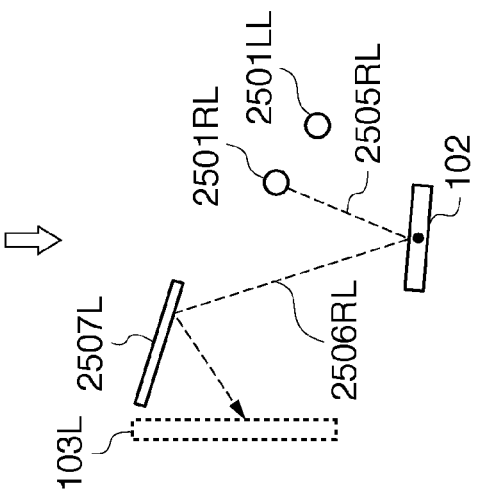
FIG. 28B
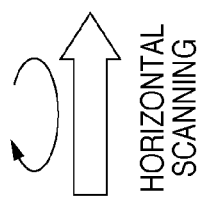
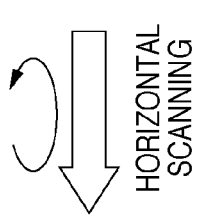
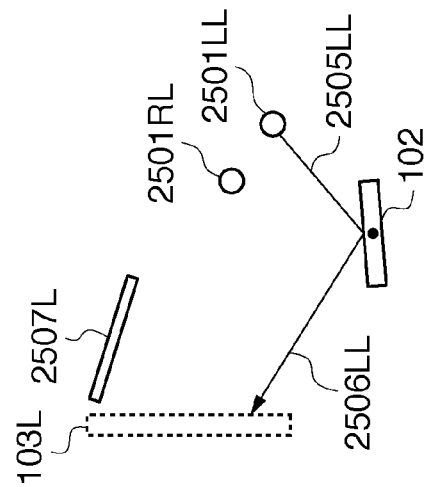
FIG. 28D
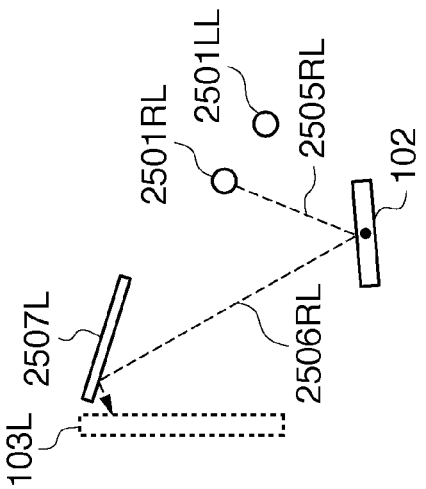
FIG. 28C

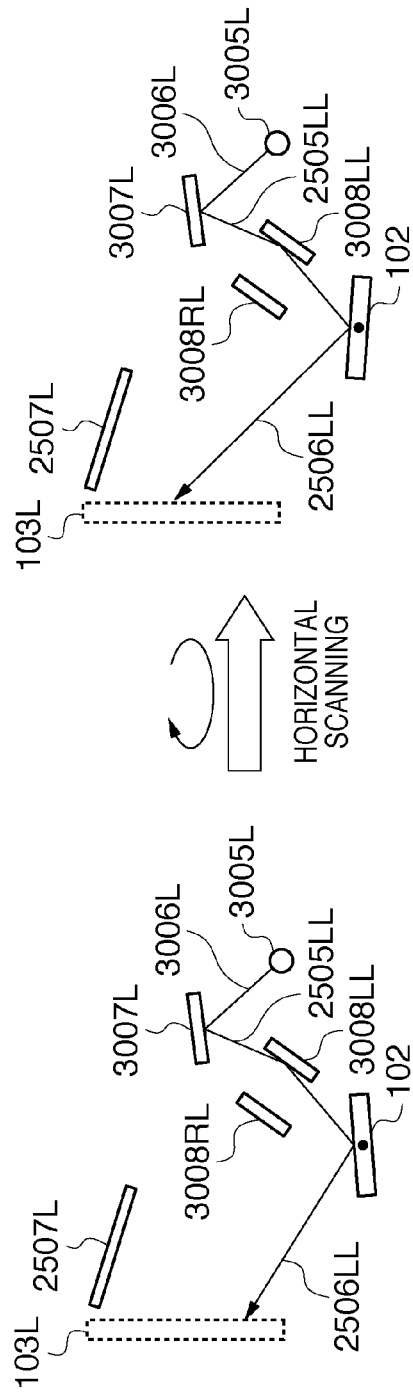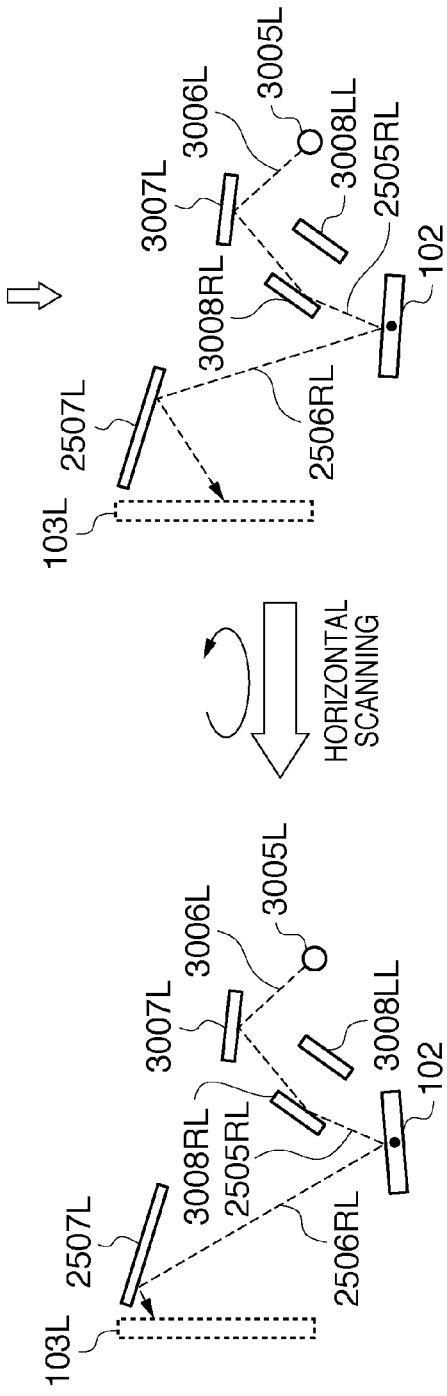

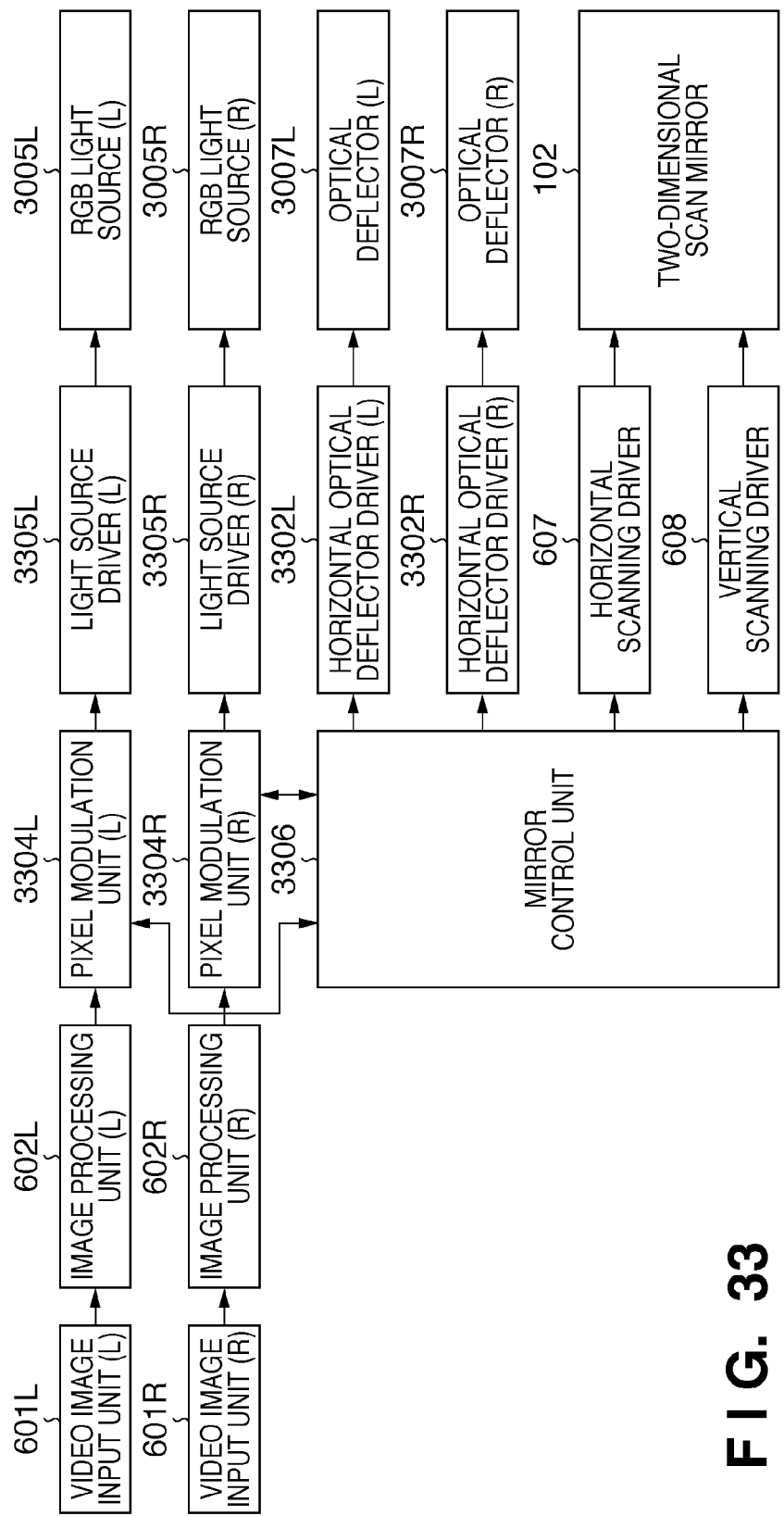
F I G. 33

IMAGE DISPLAY APPARATUS AND METHOD OF CONTROLLING THE SAME

BACKGROUND OF THE INVENTION

1. Field of the Invention

The present invention relates to an apparatus for displaying a video image and, more particularly, to a head-mounted image display apparatus (head-mounted display), a hand-held image display apparatus (hand-held display), and an image projecting apparatus.

2. Description of the Related Art

There have conventionally been proposed head-mounted image display apparatuses (head-mounted displays) and hand-held image display apparatuses (hand-held displays) which guide image light to the pupils of an observer and displays a virtual image. Japanese Patent Laid-Open No. 11-95144 proposes an image display apparatus for displaying an image based on a light beam reflected by a reflection surface that makes a reciprocating rotation.

The image display apparatus described in Japanese Patent Laid-Open No. 11-95144 includes one horizontal scanning unit (shared by left and right eyes) and two vertical scanning units. The horizontal scanning unit and the vertical scanning units scan, via a collimator lens, light beams from two left- and right-eye light sources. An optical system then guides the light to a user's eyes.

An image display apparatus described in Japanese Patent Laid-Open No. 2006-162780 uses a two-dimensional scan mirror, with the goal of optically reducing the apparatus size.

However, neither patent reference includes a detailed description of light source control. Japanese Patent Laid-Open No. 2004-517350 describes an image display apparatus which scans a plurality of light beams simultaneously and arranges images in tiling display.

Japanese Patent Laid-Open No. 2006-220745 presents a problem in a micromirror scanner using the resonance phenomenon of a silicon substrate. Young's modulus of a silicon substrate changes as temperature changes, and the resonance characteristic (maximum resonance frequency) also changes accordingly. At a constant oscillation frequency (when an applied AC voltage has a predetermined frequency), the oscillation angle of a micromirror varies as the temperature changes. For example, even when the temperature of the micromirror changes, the oscillation frequency does not change as long as the frequency of the applied AC voltage is constant. However, as the temperature of the micromirror rises, the oscillation angle of the micromirror decreases. The variations in the oscillation angle of the micromirror cause variations in the scan range of the reflected light of a laser beam emitted toward the micromirror. If there are periods when both the left- and right-eye laser beams irradiate the micromirror and periods when neither the left- nor right-eye laser beam irradiates it, the temperature of the micromirror scanner varies over time. The temperature unevenness appears as image distortion.

In the reciprocating scanning application method for a tiling display described in PCT(WO) 2004-517350, the scanning slope of the left video image and that of the right video image are different. The scan positions in the overlap portion of the left and right video images also shift almost by half of a line. This causes a scan shift at the overlap portion of the left and right video images and consequently makes the joint noticeable. Additionally, since scanning of the right video image is done in a direction opposite to the normal raster scanning direction, each light source requires a buffer.

SUMMARY OF THE INVENTION

The present invention has been made in consideration of the above-described problems. According to an aspect of the present invention, there is provided an image display apparatus which displays an image based on a light beam reflected by a reflection surface that makes a reciprocating rotation while reducing temperature unevenness on the reflection surface.

According to one aspect of the present invention, there is provided an image display apparatus comprising: a generation unit which generates a first light beam and a second light beam corresponding to image signals to eyes of an observer; a reflection unit which has a reflection surface to reflect the first light beam and the second light beam and causes the reflection surface to make a reciprocating rotation about a first axis, thereby converting the first light beam and the second light beam into a first scanning light beam and a second scanning light beam to scan in a lateral direction; a forming unit which forms images observable by the eyes of the observer based on the first scanning light beam and the second scanning light beam; and a control unit which controls said generation unit and said reflection unit to reflect the first light beam and generate the first scanning light beam while the reflection surface rotates in a first direction of the reciprocating rotation and reflect the second light beam and generate the second scanning light beam while the reflection surface rotates in a second direction opposite to the first direction.

According to another aspect of the present invention, there is provided an image display apparatus which divides one frame image represented by an image signal into a left image and a right image and displays the left image and the right image in tiling display, comprising: a generation unit which generates a first light beam corresponding to the left image and a second light beam corresponding to the right image for one scanning line of the image signal; a reflection unit which has a reflection surface to reflect the first light beam and the second light beam and causes the reflection surface to make a reciprocating rotation about a first axis, thereby converting the first light beam and the second light beam into a first scanning light beam and a second scanning light beam to scan in a lateral direction; a control unit which controls said generation unit and said reflection unit to reflect the first light beam and generate the first scanning light beam while the reflection surface rotates in a first direction of the reciprocating rotation and reflect the second light beam and generate the second scanning light beam while the reflection surface rotates in a second direction opposite to the first direction; and an optical unit which makes scanning directions of the first scanning light beam and the second scanning light beam generated during one reciprocation of the reflection surface coincide with a scanning direction of the image signal.

According to another aspect of the present invention, there is provided a method of controlling an image display apparatus including: a generation unit which generates a first light beam and a second light beam corresponding to video images for eyes of an observer; a reflection unit which has a reflection surface to reflect the first light beam and the second light beam and causes the reflection surface to make a reciprocating rotation about a first axis, thereby converting the first light beam and the second light beam into a first scanning light beam and a second scanning light beam to scan in a lateral direction; and a forming unit which forms images observable by the eyes of the observer based on the first scanning light beam and the second scanning light beam, the method comprising: controlling the generation unit and the reflection unit to reflect the first light beam and generate the first scanning light beam while the reflection surface rotates in a first direction of the reciprocating rotation and reflect the second light beam and generate the second scanning light beam while the reflection surface rotates in a second direction opposite to the first direction.

Furthermore, according to another aspect of the present invention, there is provided a method of controlling an image display apparatus including a generation unit which generates a first light beam corresponding to a left image and a second light beam corresponding to a right image for one scanning line of an image signal, and a reflection unit which has a reflection surface to reflect the first light beam and the second light beam and causes the reflection surface to make a reciprocating rotation about a first axis, thereby converting the first light beam and the second light beam into a first scanning light beam and a second scanning light beam to scan in a lateral direction, the apparatus dividing one frame image represented by the image signal into the left image and the right image and displaying the left image and the right image in tiling display, the method comprising the steps of: controlling the generation unit and the reflection unit to reflect the first light beam and generate the first scanning light beam while the reflection surface rotates in a first direction of the reciprocating rotation and reflect the second light beam and generate the second scanning light beam while the reflection surface rotates in a second direction opposite to the first direction; and making scanning directions of the first scanning light beam and the second scanning light beam generated during one reciprocation of the reflection surface coincide with a scanning direction of the image signal.

Further features of the present invention will become apparent from the following description of exemplary embodiments with reference to the attached drawings.

BRIEF DESCRIPTION OF THE DRAWINGS

FIGS. 5A to 5H are views showing scan positions at the respective scanning timings according to the first and second embodiments;

FIGS. 7A to 7C are views for explaining distortion correction according to the first embodiment;

FIGS. 19A to 19D are views showing vertical scan positions at the respective scanning timings in the image display apparatus according to the fifth embodiment;

FIGS. 23A to 23D are views showing vertical scan positions at the respective scanning timings according to the sixth embodiment;

FIGS. 28A to 28D are views showing horizontal scan positions at the respective scanning timings in the image display apparatus according to the seventh embodiment;

FIGS. 32A to 32D are views showing horizontal scan positions at the respective scanning timings in each of the image display apparatuses according to the eighth and ninth embodiments;

FIG. 33 is a block diagram showing an example of the arrangement of the image display apparatus according to the eighth embodiment;

DESCRIPTION OF THE EMBODIMENTS

Figure 1:
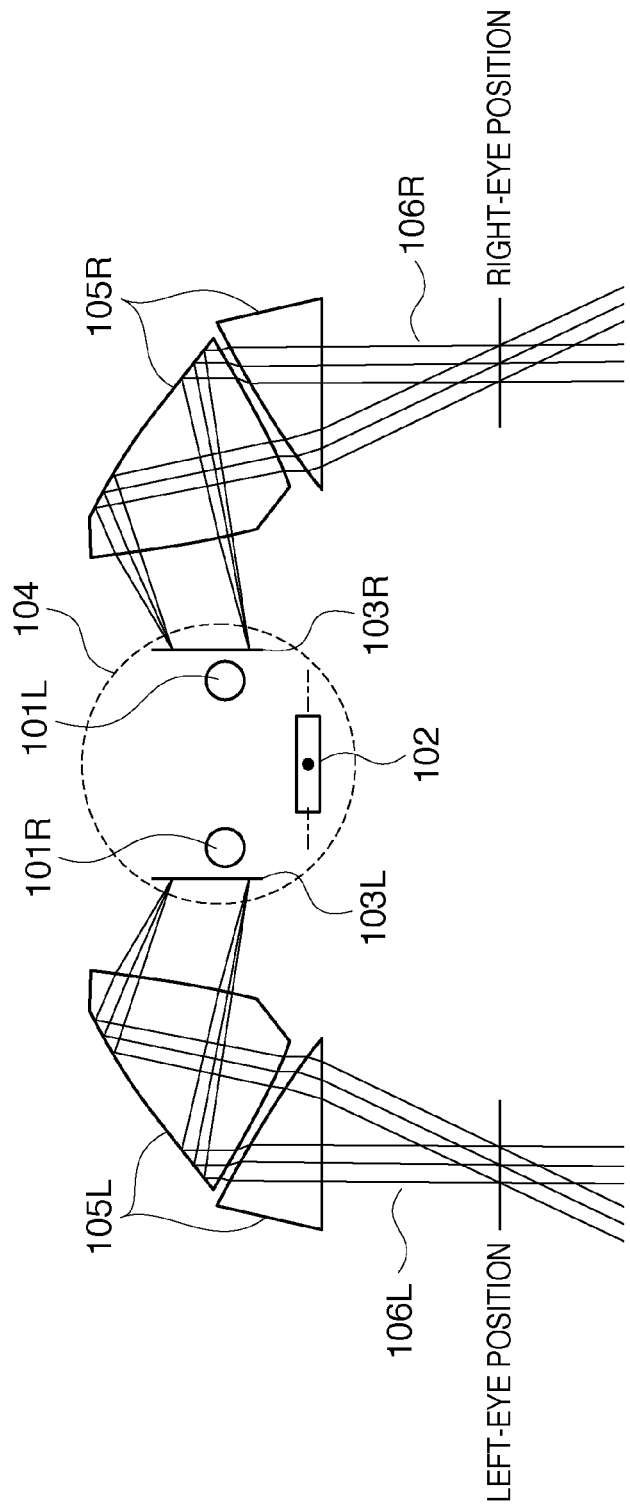
FIG. 1 is a view showing an example of the optical arrangement of an image display apparatus according to the first embodiment.

Preferred embodiments of the present invention will now be described with reference to the accompanying drawings.

The same reference numerals denote parts of the same functions to ensure consistency throughout the drawings. In each embodiment, the same components as those described in preceding embodiments are given the same reference numerals to avoid repetitive descriptions.

FIG. 1 is a view showing an example of the arrangement of the optical system of an image display apparatus according to the first embodiment. In FIG. 1, a left-eye three-color light source 101L includes three colors of red, green, and blue to display a left-eye video image. A right-eye three-color light source 101R includes three colors of red, green, and blue to display a right-eye video image. A two-dimensional scan mirror 102 has two axes to horizontally and vertically scan light beams from the left-eye three-color light source 101L and the right-eye three-color light source 101R. The two-dimensional scan mirror 102 is commonly used to form a left-eye image and a right-eye image. A left-eye diffusing plate 103L projects a light beam obtained by causing the two-dimensional scan mirror 102 to scan the light beam from the left-eye three-color light source 101L. A right-eye diffusing plate 103R projects a light beam obtained by causing the two-dimensional scan mirror 102 to scan the light beam from the right-eye three-color light source 101R. A video image generation unit 104 includes the left-eye three-color light source 101L, the right-eye three-color light source 101R, the two-dimensional scan mirror 102, the left-eye diffusing plate 103L, and the right-eye diffusing plate 103R described above.

A left-eye ocular optical system 105L enlarges the image light projected onto the left-eye diffusing plate 103L and guides it to the left eye of the observer as a virtual image. A right-eye ocular optical system 105R enlarges the image light projected onto the right-eye diffusing plate 103R and guides it to the right eye of the observer as a virtual image. Left-eye image light 106L is formed by guiding the video image projected onto the left-eye diffusing plate 103L to the left eye of the observer via the left-eye ocular optical system 105L. Right-eye image light 106R is formed by guiding the video image projected onto the right-eye diffusing plate 103R to the right eye of the observer via the right-eye ocular optical system 105R.

Figure 2:
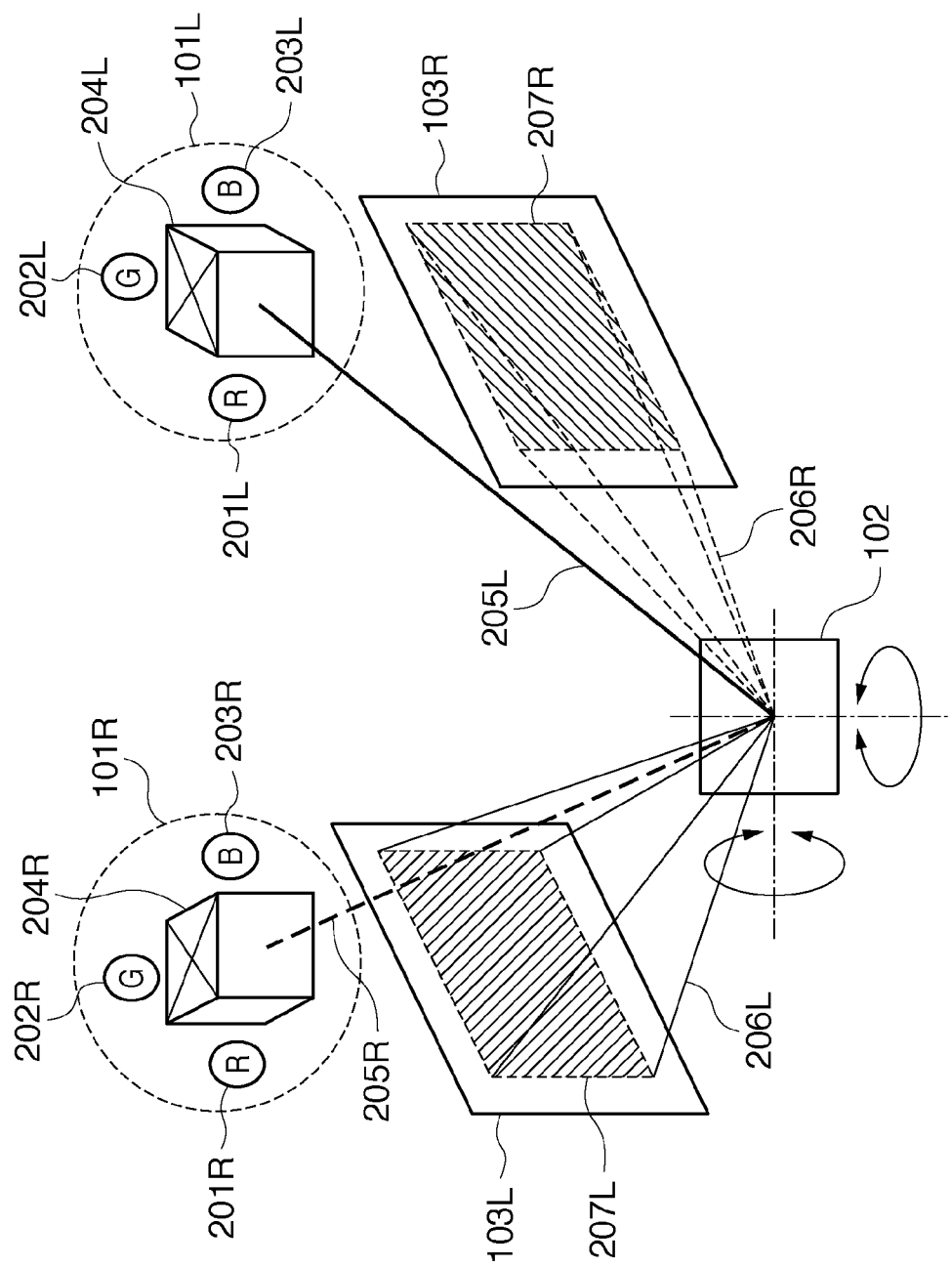
FIG. 2 is a view showing an example of the arrangement of the video image generation unit of the image display apparatus according to the first embodiment.

FIG. 2 is a view showing an example of the arrangement of the video image generation unit 104 of the image display apparatus according to the first embodiment. Referring to FIG. 2, reference numeral 201L denotes a left-eye red light source such as a red laser; 202L, a left-eye green light source such as a green laser; and 203L, a left-eye blue light source such as a blue laser. A left-eye dichroic prism 204L brings light beams from the left-eye red light source 201L, left-eye green light source 202L, and left-eye blue light source 203L together into one light beam. The left-eye three-color light source 101L includes the left-eye red light source 201L, the left-eye green light source 202L, the left-eye blue light source 203L, and the left-eye dichroic prism 204L.

A left-eye three-color light beam 205L includes the light beams emitted by the left-eye red light source 201L, the left-eye green light source 202L, and the left-eye blue light source 203L and put together by the left-eye dichroic prism 204L. The two-dimensional scan mirror 102 scans the left-eye three-color light beam 205L to form a left-eye two-dimensional scanning light beam 206L. The left-eye two-dimensional scanning light beam 206L generates a left-eye projection image 207L on the left-eye diffusing plate 103L.

The right-eye three-color light source 101R including a right-eye red light source 201R, a right-eye green light source 202R, a right-eye blue light source 203R, and a right-eye dichroic prism 204R forms a right-eye three-color light beam 205R, a right-eye two-dimensional scanning light beam 206R, and a right-eye projection image 207R by applying the same arrangement as that for the left eye described above.

Figure 3:
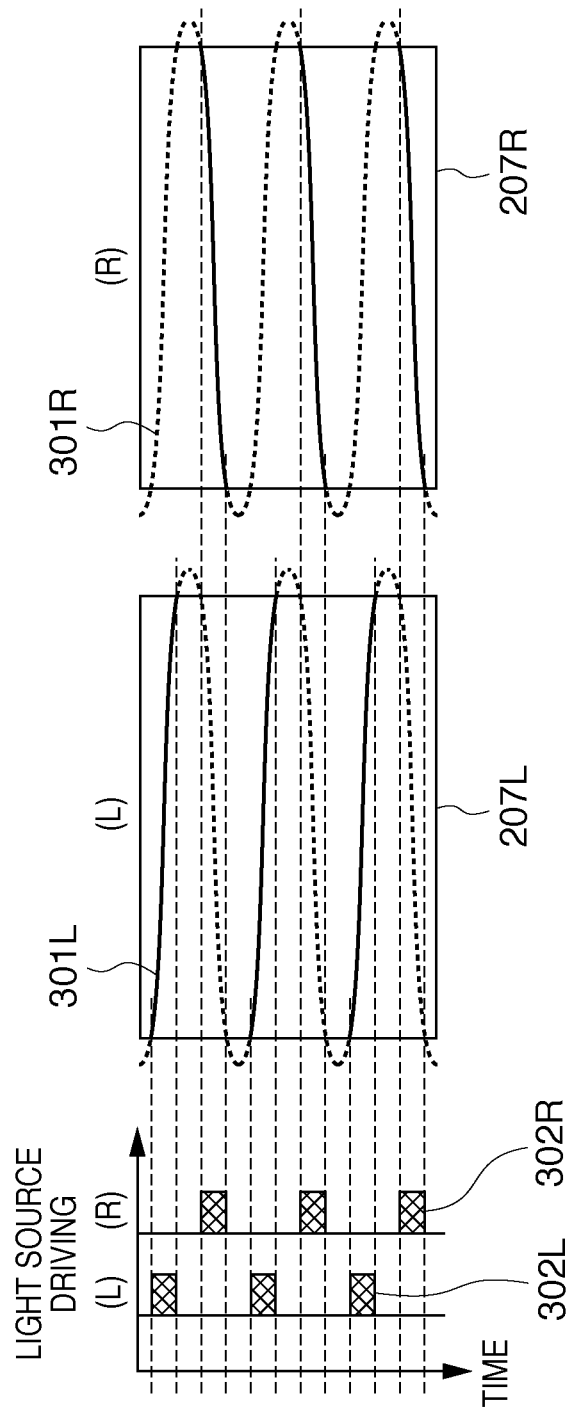
FIG. 3 is a timing chart showing the light source driving timing of horizontal scanning in the image display apparatus according to the first embodiment.

FIG. 3 is a timing chart showing the light source driving timing of horizontal scanning in the image display apparatus according to the first embodiment. Referring to FIG. 3, a left-eye scanning locus 301L represents the locus of the left-eye two-dimensional scanning light beam 206L in the left-eye projection image 207L generated on the left-eye diffusing plate 103L. A left-eye light source driving period 302L indicates the driving state of the left-eye three-color light source 101L during the horizontal scanning.

Referring to FIG. 3, a right-eye scanning locus 301R represents the locus of the right-eye two-dimensional scanning light beam 206R in the right-eye projection image 207R generated on the right-eye diffusing plate 103R. A right-eye light source driving period 302R indicates the driving state of the right-eye three-color light source 101R during the horizontal scanning.

As described above, the left-eye three-color light source 101L and the right-eye three-color light source 101R generate a first light beam (left-eye three-color light beam 205L) and a second light beam (right-eye three-color light beam 205R) corresponding to the image signals for the left and right eyes, respectively. The two-dimensional scan mirror 102 has a reflection surface which reflects the first light beam and the second light beam. The reflection surface makes a reciprocating rotation about a first axis parallel to the left-eye diffusing plate 103L and the right-eye diffusing plate 103R. The reciprocating rotation converts the first light beam and the second light beam into a first scanning light beam (left-eye two-dimensional scanning light beam 206L) and a second scanning light beam (right-eye two-dimensional scanning light beam 206R) which scan in the lateral direction. The two-dimensional scan mirror 102 further causes the reflection surface to make a reciprocating rotation about a second axis perpendicular to the first axis so that the first and second scanning light beams scan in the longitudinal direction perpendicular to the lateral direction. The first and second scanning light beams that two-dimensionally scan are thus generated.

The first and second scanning light beams irradiate the first diffusing plate (left-eye diffusing plate 103L) and the second diffusing plate (right-eye diffusing plate 103R) to form images observable by the left and right eyes of the observer.

The first image light (left-eye image light 106L) and the second image light (right-eye image light 106R) corresponding to the left and right eyes are thus generated. The first image light and the second image light are guided to the eyes of the observer via the left-eye ocular optical system 105L and the right-eye ocular optical system 105R and observed, as described with reference to FIG. 1.

Figure 4:
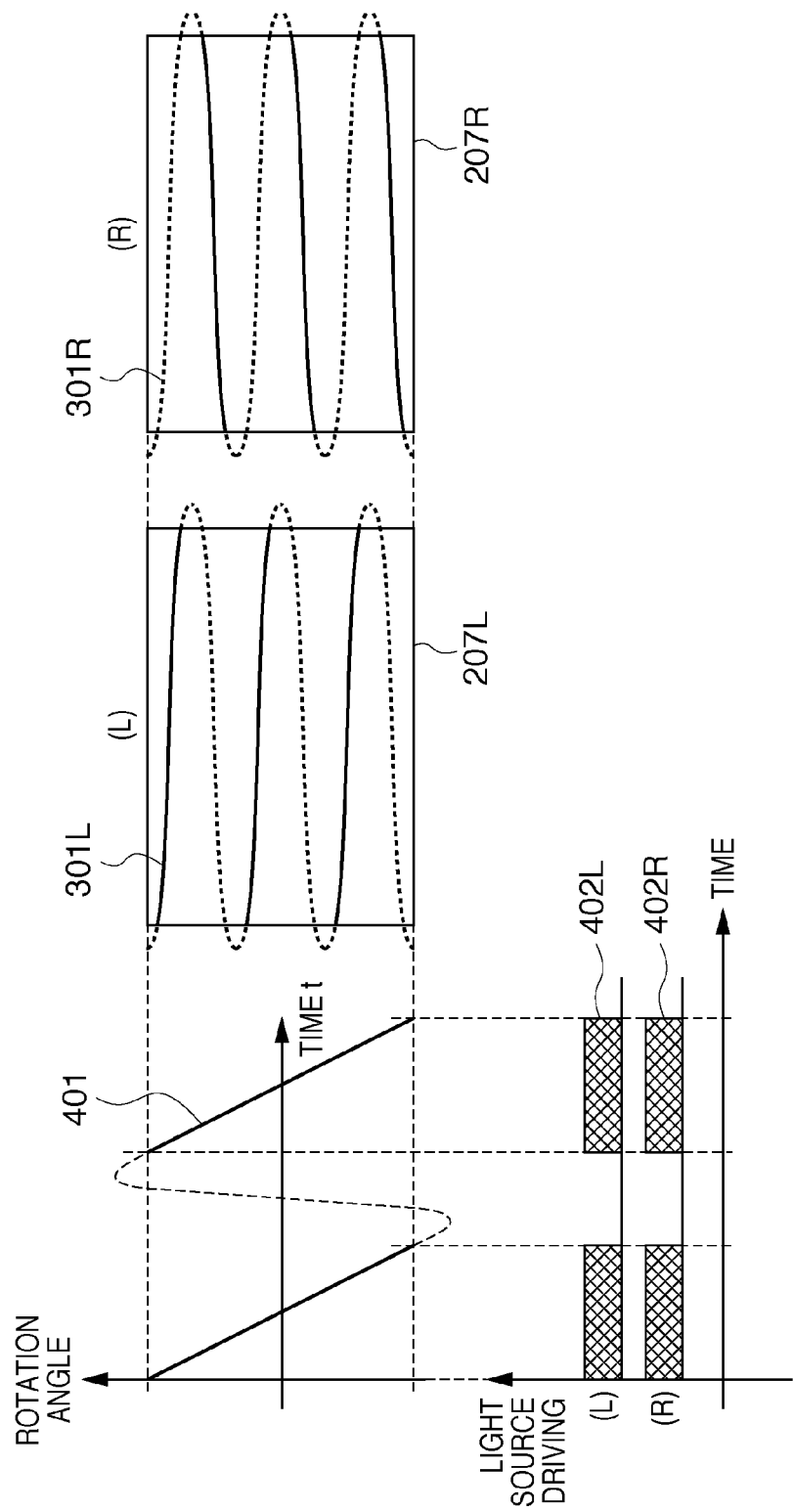
FIG. 4 is a timing chart showing the light source driving timing of vertical scanning in each of the image display apparatuses according to the first to third, seventh, and eighth embodiments.

FIG. 4 is a timing chart showing the light source driving timing of vertical scanning in the image display apparatus according to the first embodiment. Referring to FIG. 4, a mirror rotation locus 401 in the vertical direction represents the vertical time-rate change in the rotation angle of the two-dimensional scan mirror 102 during the vertical scanning. A left-eye light source driving period 402L indicates the driving state of the left-eye three-color light source 101L during the vertical scanning. A right-eye light source driving period 402R indicates the driving state of the right-eye three-color light source 101R during the vertical scanning. Each light source driving period 402L or 402R includes the plurality of driving periods 302L or 302R shown in FIG. 3.

Figure 5F:
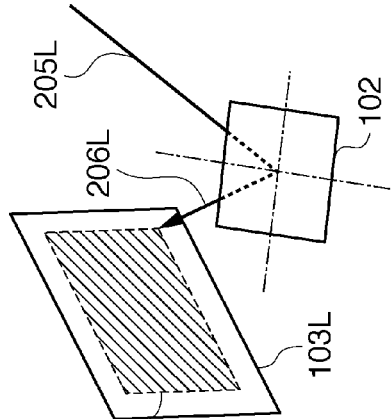

FIGS. 5A to 5H show scan positions at the respective scanning timings according to the first embodiment. FIG. 5A illustrates the position of the left-eye two-dimensional scanning light beam 206L when the two-dimensional scan mirror 102 turns to the upper limit of vertical scanning and the counterclockwise limit of horizontal scanning of the left-eye projection image 207L. FIG. 5B illustrates the position of the left-eye two-dimensional scanning light beam 206L when the two-dimensional scan mirror 102 turns to the upper limit of vertical scanning and the clockwise limit of horizontal scanning of the left-eye projection image 207L. FIG. 5C illustrates the position of the right-eye two-dimensional scanning light beam 206R when the two-dimensional scan mirror 102 turns to the upper limit of vertical scanning and the clockwise limit of horizontal scanning of the right-eye projection image 207R. FIG. 5D illustrates the position of the right-eye two-dimensional scanning light beam 206R when the two-dimensional scan mirror 102 turns to the upper limit of vertical scanning and the counterclockwise limit of horizontal scanning of the right-eye projection image 207R.

Figure 5G:
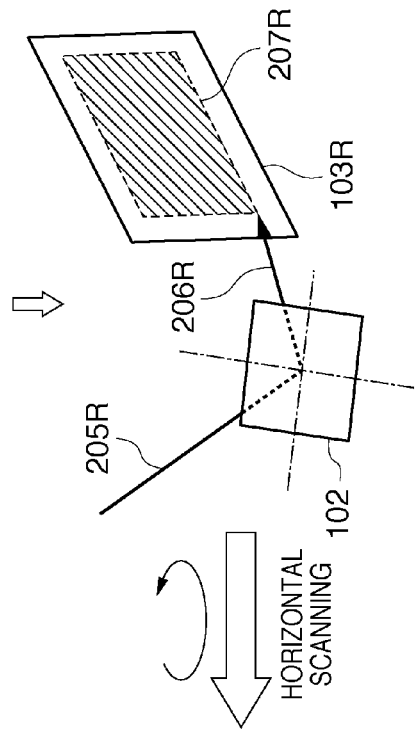
Figure 5E:
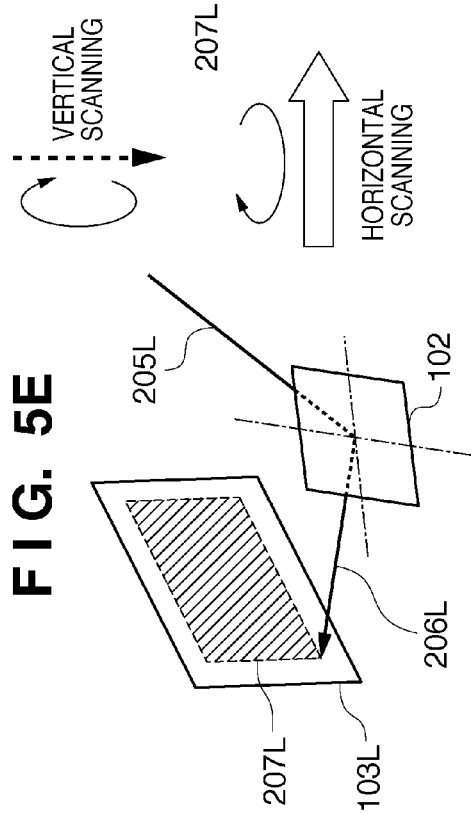
Figure 5H:
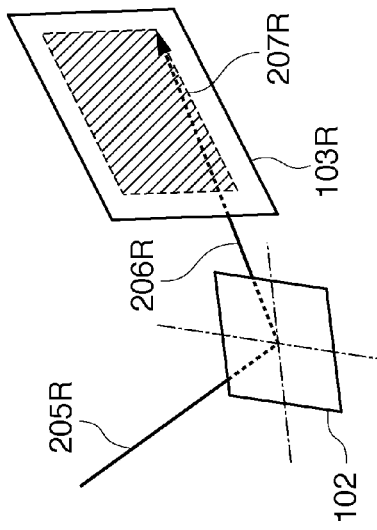

FIG. 5E illustrates the position of the left-eye two-dimensional scanning light beam 206L when the two-dimensional scan mirror 102 turns to the lower limit of vertical scanning and the counterclockwise limit of horizontal scanning of the left-eye projection image 207L. FIG. 5F illustrates the position of the left-eye two-dimensional scanning light beam 206L when the two-dimensional scan mirror 102 turns to the lower limit of vertical scanning and the clockwise limit of horizontal scanning of the left-eye projection image 207L. FIG. 5G illustrates the position of the right-eye two-dimensional scanning light beam 206R when the two-dimensional scan mirror 102 turns to the lower limit of vertical scanning and the clockwise limit of horizontal scanning of the right-eye projection image 207R. FIG. 5H illustrates the position of the right-eye two-dimensional scanning light beam 206R when the two-dimensional scan mirror 102 turns to the lower limit of vertical scanning and the counterclockwise limit of horizontal scanning of the right-eye projection image 207R.

Figure 6:
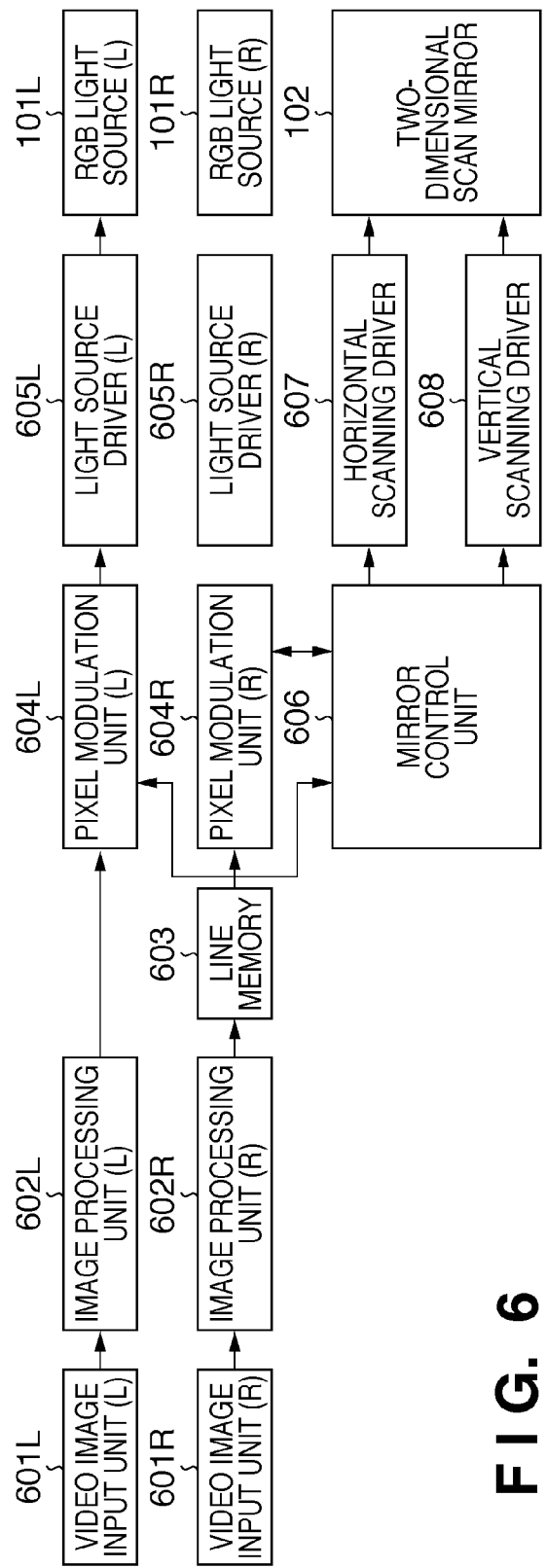
FIG. 6 is a block diagram showing an example of the arrangement of the image display apparatus according to the first embodiment.

FIG. 6 is a block diagram showing an example of the arrangement of the image display apparatus according to the first embodiment. Referring to FIG. 6, a left-eye video image input unit 601L receives a display video image for the left eye. A right-eye video image input unit 601R receives a display video image for the right eye. A left-eye image processing unit 602L performs distortion correction and various kinds of image quality adjustment for the left-eye video image received by the left-eye video image input unit 601L. A right-eye image processing unit 602R performs distortion correction and various kinds of image quality adjustment for the right-eye video image received by the right-eye video image input unit 601R. A line memory 603 temporarily stores image data of one line to horizontally invert the line data of the right-eye video image processed by the right-eye image processing unit 602R.

A left-eye pixel modulation unit 604L converts the value of the left-eye video image data processed by the left-eye image processing unit 602L into a level, thereby performing amplitude modulation. The line memory 603 horizontally inverts the right-eye video image data processed by the right-eye image processing unit 602R. Then, a right-eye pixel modulation unit 604R converts the value of the right-eye video image data into a level, thereby performing amplitude modulation. A left-eye light source driver 605L causes the left-eye three-color light source 101L to emit light of the respective colors in accordance with the level value obtained by amplitude modulation of the left-eye pixel modulation unit 604L. A right-eye light source driver 605R causes the right-eye three-color light source 101R to emit light of the respective colors in accordance with the level value obtained by amplitude modulation of the right-eye pixel modulation unit 604R. A mirror control unit 606 generates a control signal for the two-dimensional scan mirror 102 based on the timings of the left-eye image signal input to the left-eye pixel modulation unit 604L and the right-eye image signal input to the right-eye pixel modulation unit 604R. A horizontal scanning driver 607 causes the two-dimensional scan mirror 102 to horizontally scan based on a horizontal control signal generated by the mirror control unit 606. A vertical scanning driver 608 causes the two-dimensional scan mirror 102 to vertically scan based on a vertical control signal.

FIGS. 7A to 7C are views for explaining distortion correction in the image display apparatus according to the first embodiment. Note that the same distortion correction method applies to both the left- and right-eye video images, and FIGS. 7A to 7C illustrate only the procedure for the left-eye video image. Referring to FIGS. 7A to 7C, when displaying a normal rectangular image, a distorted actual left-eye projection region 701L is displayed due to the difference in the optical path length. The left-eye video image input unit 601L receives a left-eye input video image 702L. A left-eye distortion correction image 703L is obtained by distorting the left-eye input video image 702L in accordance with the inverse characteristic of the distortion characteristic of the left-eye actual projection region 701L.

The operation of the image display apparatus according to the first embodiment will be described below in detail with reference to FIGS. 1 to 7C.

FIG. 1 shows the optical arrangement of the image display apparatus of this embodiment. FIG. 2 shows details of the video image generation unit 104 in the optical arrangement shown in FIG. 1.

Left-eye video image display will be described first using FIGS. 1 and 2. The left-eye red light source 201L, the left-eye green light source 202L, and the left-eye blue light source 203L generate red, green, and blue light beams, respectively. The left-eye dichroic prism 204L brings them together and emits one light beam. The left-eye three-color light beam 205L emitted by the dichroic prism 204L irradiates the two-dimensional scan mirror 102 which makes a reciprocating rotation and oscillation in the horizontal and vertical directions. The left-eye two-dimensional scanning light beam 206L reflected by the two-dimensional scan mirror 102 forms the left-eye projection image 207L on the left-eye diffusing plate 103L. The left-eye projection image 207L formed on the left-eye diffusing plate 103L changes from a light beam to spread light due to the diffusing effect. The light beam forms an enlarged virtual image via the left-eye ocular optical system 105L, and the image is guided to the left eye as the left-eye image light 106L.

The right-eye video image display method is the same as that for the left eye except the right-eye arrangement is used.

The control method of the image display apparatus of this embodiment in horizontal scanning will be described next with reference to FIG. 3.

Horizontal scanning requires to oscillate the mirror at a high speed and generally adopts an oscillation method by resonance. The left-eye scanning locus 301L and the right-eye scanning locus 301R represent the loci of the left-eye two-dimensional scanning light beam 206L and the right-eye two-dimensional scanning light beam 206R at that time. Since vertical scanning is performed at a constant velocity, the left-eye scanning locus 301L and the right-eye scanning locus 301R draw curves like sine curves in the left-eye projection image 207L and the right-eye projection image 207R, as shown in FIG. 3. In each locus, a video image is displayed at each solid line portion, whereas no image is displayed at each dotted line portion. The solid line portions correspond to hatched regions indicated by the left-eye light source driving periods 302L and the right-eye light source driving periods 302R along the time axis. Actually, such uniform outputs are rarely obtained because the light emission intensity of a light source changes depending on the value of input video image data. FIG. 3 shows uniform outputs for descriptive convenience. For the sake of simplicity, FIG. 3 illustrates scanning in three reciprocations. The actual number of times of scanning is normally much larger. In FIG. 3, the left-eye light source is lit on the forward path of horizontal scanning, and the right-eye light source is lit on the backward path. However, this may be reversed.

The control method of the image display apparatus of this embodiment in vertical scanning will be described next with reference to FIG. 4.

Vertical scanning requires no high-speed mirror oscillation. It is therefore possible to apply various methods and also relatively arbitrarily control the rotation angle. The control is often done in a saw tooth pattern. The mirror rotation locus 401 in FIG. 4 also exhibits such a control pattern. In the vertical mirror rotation locus 401, a video image is displayed at each solid line portion, whereas no image is displayed at each dotted line portion. The solid line portions correspond to hatched regions indicated by the left-eye light source driving periods 402L and the right-eye light source driving periods 402R along the time axis. Actually, such uniform outputs are rarely obtained because the light emission intensity of a light source changes depending on the value of input video image data. FIG. 4 shows uniform outputs for descriptive convenience.

The scan positions at the respective scanning timings will be described next with reference to FIGS. 5A to 5H.

First, in the state shown in FIG. 5A, that is, when the two-dimensional scan mirror 102 turns to the upper limit of vertical scanning and the counterclockwise limit of horizontal scanning of the left-eye projection image 207L, the left-eye two-dimensional scanning light beam 206L is located at the upper left corner of the left-eye projection image 207L. When horizontal scanning is performed, that is, the two-dimensional scan mirror 102 rotates clockwise in this state, the state changes to that shown in FIG. 5B, that is, the left-eye two-dimensional scanning light beam 206L is located at the upper right corner of the left-eye projection image 207L. When the light source switches to that for the right eye, the state changes to that shown in FIG. 5C, that is, the right-eye two-dimensional scanning light beam 206R is located at the upper right corner of the right-eye projection image 207R. When horizontal scanning is performed in the reverse direction, that is, the two-dimensional scan mirror 102 rotates counterclockwise in this state, the state changes to that shown in FIG. 5D, that is, the right-eye two-dimensional scanning light beam 206R is located at the upper left corner of the right-eye projection image 207R.

After that, the two-dimensional scan mirror 102 rotates downward in the vertical direction and turns to the lower limit of vertical scanning and the counterclockwise limit of horizontal scanning of the left-eye projection image 207L, the state shown in FIG. 5E is obtained. That is, the left-eye two-dimensional scanning light beam 206L is located at the lower left corner of the left-eye projection image 207L. When horizontal scanning is performed, that is, the two-dimensional scan mirror 102 rotates clockwise in this state, the state changes to that shown in FIG. 5F, that is, the left-eye two-dimensional scanning light beam 206L is located at the lower right corner of the left-eye projection image 207L. When the light source switches to that for the right eye, the state changes to that shown in FIG. 5G, that is, the right-eye two-dimensional scanning light beam 206R is located at the lower right corner of the right-eye projection image 207R. When horizontal scanning is performed in the reverse direction, that is, the two-dimensional scan mirror 102 rotates counterclockwise in this state, the state changes to that shown in FIG. 5H, that is, the right-eye two-dimensional scanning light beam 206R is located at the lower left corner of the right-eye projection image 207R.

The internal blocks will be described next with reference to FIG. 6.

Referring to FIG. 6, first, the left-eye video image input unit 601L receives a display video image for the left eye. The right-eye video image input unit 601R receives a display video image for the right eye. The left-eye image processing unit 602L performs distortion correction (to be described later) and various kinds of image quality adjustment for the left-eye video image received by the left-eye video image input unit 601L. Similarly, the right-eye image processing unit 602R performs distortion correction (to be described later) and various kinds of image quality adjustment for the right-eye video image received by the right-eye video image input unit 601R. The right-eye video image that has undergone image processing of the right-eye image processing unit 602R is inverted in the horizontal direction and then displayed. To do this, the line memory 603 temporarily stores image data of one line, thereby horizontally inverting the line data. More specifically, the horizontal scanning direction of the first scanning light beam (left-eye two-dimensional scanning light beam 206L in the embodiment) coincides with the scanning direction of the image signal. However, the scanning direction of the second scanning light beam (right-eye two-dimensional scanning light beam 206R in the embodiment) is reverse to the scanning direction of the image signal. The line memory 603 is provided to hold the image signal of at least one scanning line of the image signal corresponding to the second scanning light beam.

The left-eye pixel modulation unit 604L converts the value of the left-eye video image data processed by the left-eye image processing unit 602L into a level, thereby performing amplitude modulation. The left-eye light source driver 605L causes the left-eye three-color light source 101L to emit light of the respective colors in accordance with the level value obtained by amplitude modulation of the left-eye pixel modulation unit 604L. The right-eye pixel modulation unit 604R converts the value of the right-eye video image data inverted horizontally in the line memory 603 into a level, thereby performing amplitude modulation. The right-eye light source driver 605R causes the right-eye three-color light source 101R to emit light of the respective colors in accordance with the level value obtained by amplitude modulation of the right-eye pixel modulation unit 604R. The right-eye pixel modulation unit 604R thus reads out the image signal of one scanning line from the line memory 603 in a reverse direction, thereby generating the second light beam.

The mirror control unit 606 generates a control signal of the two-dimensional scan mirror 102 based on the timings of the left-eye image signal input to the left-eye pixel modulation unit 604L and the right-eye image signal input to the right-eye pixel modulation unit 604R. The horizontal scanning driver 607 causes the two-dimensional scan mirror 102 to horizontally scan based on a horizontal control signal generated by the mirror control unit 606. The vertical scanning driver 608 causes the two-dimensional scan mirror 102 to vertically scan based on a vertical control signal generated by the mirror control unit 606.

As described above, according to the first embodiment, the control unit including the pixel modulation units 604L and 604R and the mirror control unit 606 controls driving of the light sources and rotation of the two-dimensional scan mirror in the following way. The two-dimensional scan mirror 102 reflects the first light beam (e.g., left-eye three-color light beam 205L) during the period when the reflection surface rotates in the first direction, that is, one direction of the reciprocating rotation. This generates the first scanning light beam (e.g., left-eye two-dimensional scanning light beam 206L). The two-dimensional scan mirror 102 reflects the second light beam (e.g., right-eye three-color light beam 205R) during the period when the reflection surface rotates in the second direction reverse to the first direction. This generates the second scanning light beam (e.g., right-eye two-dimensional scanning light beam 206R). The time when both the laser beams for the left and right eyes irradiate the mirror is thus eliminated. Additionally, the single reflection surface is used to form the left- and right-eye video images. This makes it possible to reduce the temporal temperature unevenness of the scan mirror (micromirror scanner) and suppress image distortion. Reducing temporal temperature unevenness enables to omit or simplify the temperature compensation circuit of the scan mirror.

The distortion correction method will be described next with reference to FIGS. 7A to 7C.

FIGS. 7A to 7C explain processing concerning the left-eye video image and illustrate an example in which the left-eye two-dimensional scanning light beam 206L strikes the left-eye diffusing plate 103L from the upper left near side. FIG. 7A shows the left-eye actual projection region 701L which is actually displayed upon projecting a normal rectangular image onto the left-eye diffusing plate 103L. The left-eye two-dimensional scanning light beam 206L comes from the upper left side. Relative to the upper left corner where the optical path length is shortest, the lower left corner with the second shortest optical path length shifts to the lower right in a minimum amount. The upper right corner with the third shortest optical path length further shifts to the lower right in a larger amount. The lower right corner having the longest optical path length shifts to the lower right in the largest amount so that the projection region has a distorted rectangular shape. In this case, the left-eye input video image 702L the left-eye video image input unit 601L has received is distorted in accordance with the inverse characteristic of the distortion characteristic of the left-eye actual projection region 701L, thereby displaying the left-eye distortion correction image 703L, as shown in FIG. 7B. The left-eye projection image 207L projected onto the left-eye diffusing plate 103L can thus get a proper rectangular shape, as shown in FIG. 7C. Almost the same processing is applicable to correct distortion of the right-eye video image.

FIGS. 7A to 7C show an example in which the left-eye two-dimensional scanning light beam 206L strikes the left-eye diffusing plate 103L from the upper left near side. However, the processing can be executed regardless of the incident direction of the light beam.

FIGS. 7A to 7C concern only distortion caused by the difference in the optical path length from the two-dimensional scan mirror to the diffusing plate. Adding an inverse characteristic associated distortion in the left-eye ocular optical system 105L or the right-eye ocular optical system 105R enables to correct the optical distortion of the entire apparatus.

In the above description, a light source of three colors, that is, red, green, and blue is used. However, the present invention is not limited to this and can also be practiced using monochromatic light or a combination of other colors.

The left-eye ocular optical system 105L and the right-eye ocular optical system 105R are not limited to those shown in FIG. 1. Any other optical arrangement having the same function is usable.

In the above explanation, a two-dimensional scan mirror which scans in the horizontal and vertical directions is used. However, different elements may do horizontal scanning and vertical scanning.

In the above description, distortion correction is performed by image processing. However, the present invention is also practicable using an optical member for distortion correction inserted between each diffusing plate and the two-dimensional scan mirror. In this case, each image processing unit need not have the distortion correction function.

In the above description, a light beam is projected onto each diffusing plate. However, the present invention is also practicable without diffusing plates.

The second embodiment will be explained next. In the first embodiment, separate light sources (left-eye three-color light source 101L and right-eye three-color light source 101R) are used to generate the first and second light beams. In the second embodiment, an optical deflector 807 (FIG. 8) is used to generate first and second light beams from a common light source. Note that the light source driving timing of vertical scanning, scan positions at the respective scanning timings, and distortion correction of the second embodiment are the same as in the drawings (FIGS. 4, 5A to 5H, and 7A to 7C) used in the first embodiment. The light source arrangement is applicable to all the following embodiments.

Figure 8:
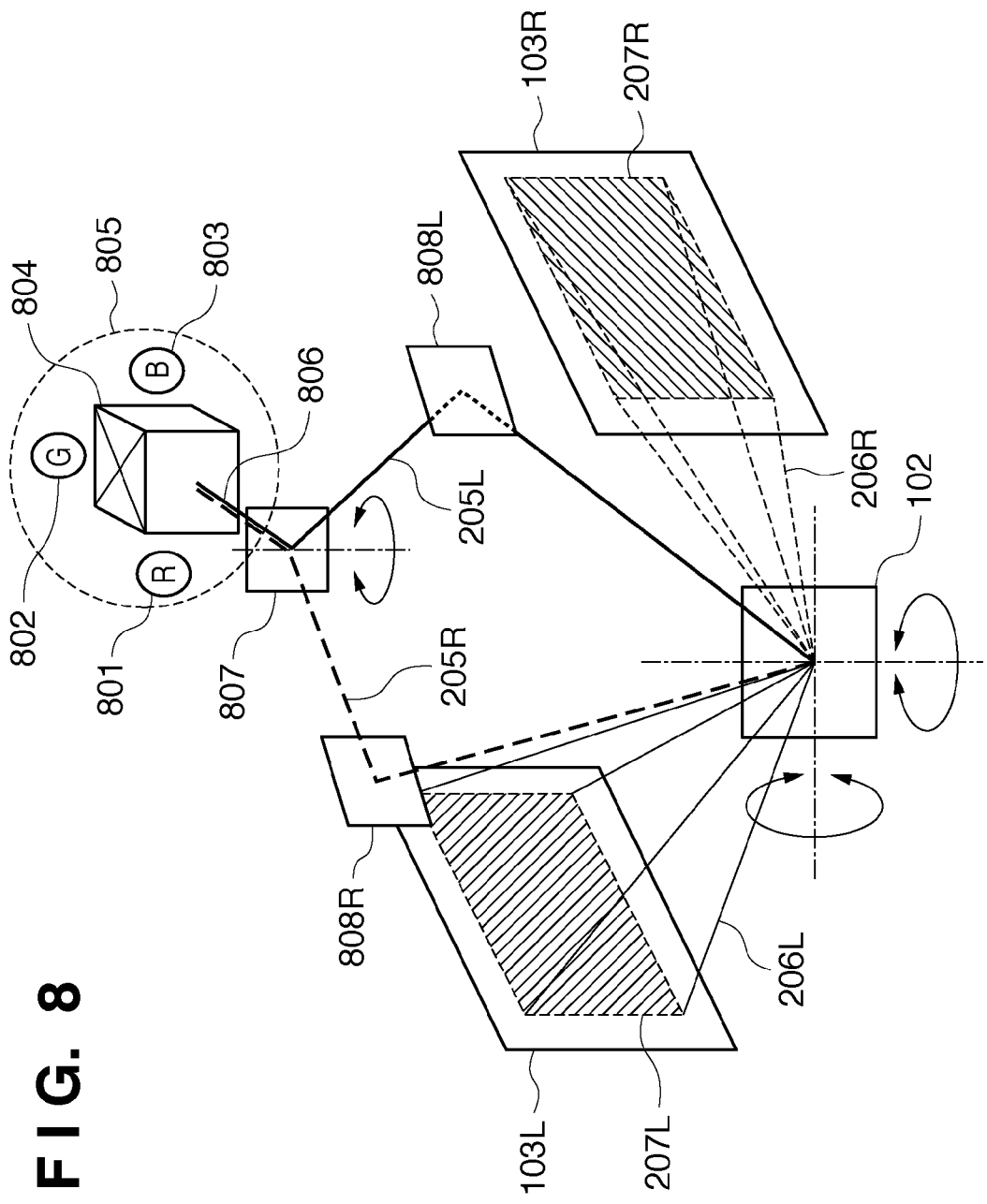
FIG. 8 is a view showing the arrangement of the video image generation unit of the image display apparatus according to the second embodiment.

FIG. 8 is a view showing an example of the arrangement of a video image generation unit 104 of an image display apparatus according to the second embodiment. Referring to FIG. 8, reference numeral 801 denotes a red light source such as a red laser; 802, a green light source such as a green laser; and 803, a blue light source such as a blue laser. A dichroic prism 804 brings light beams from the red light source 801, the green light source 802, and the blue light source 803 together into one light beam. A three-color light source 805 includes the red light source 801, the green light source 802, the blue light source 803, and the dichroic prism 804. A three-color light beam 806 includes the light beams emitted by the red light source 801, the green light source 802, and the blue light source 803 and put together by the dichroic prism 804. The optical deflector 807 switches the direction of the three-color light beam 806 between two directions for the left and right eyes and generates a left-eye three-color light beam 205L and a right-eye three-color light beam 205R. The optical deflector 807 is formed from, for example, a digital micromirror device (to be referred to as a DMD hereinafter) or an acousto-optic element (to be referred to as an AOE hereinafter). A left-eye light beam reflecting mirror 808L reflects the left-eye three-color light beam 205L toward a two-dimensional scan mirror 102. A right-eye light beam reflecting mirror 808R reflects the right-eye three-color light beam 205R toward the two-dimensional scan mirror 102.

Figure 9:
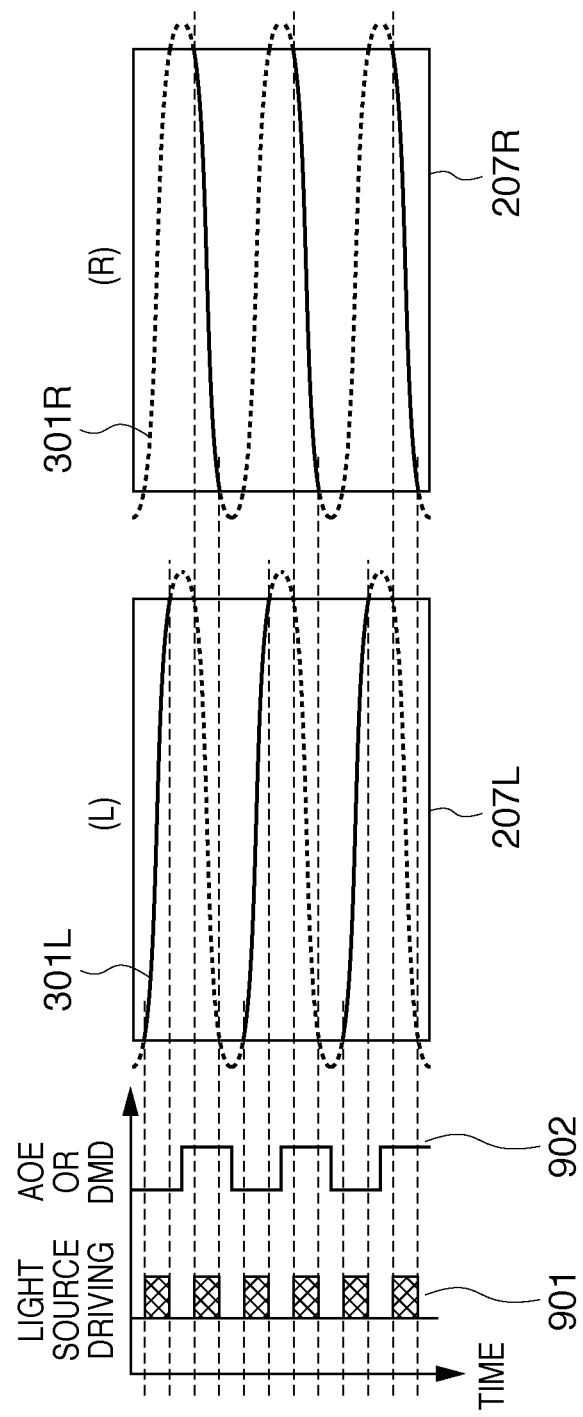
FIG. 9 is a timing chart showing the light source driving timing of horizontal scanning in the image display apparatus according to the second embodiment.

FIG. 9 shows the light source driving timing of horizontal scanning in the image display apparatus according to the second embodiment. Referring to FIG. 9, a light source driving period 901 indicates the driving state of the three-color light source 805 during the horizontal scanning. A deflection direction switching signal 902 indicates the deflection direction of the optical deflector 807.

Figure 10:
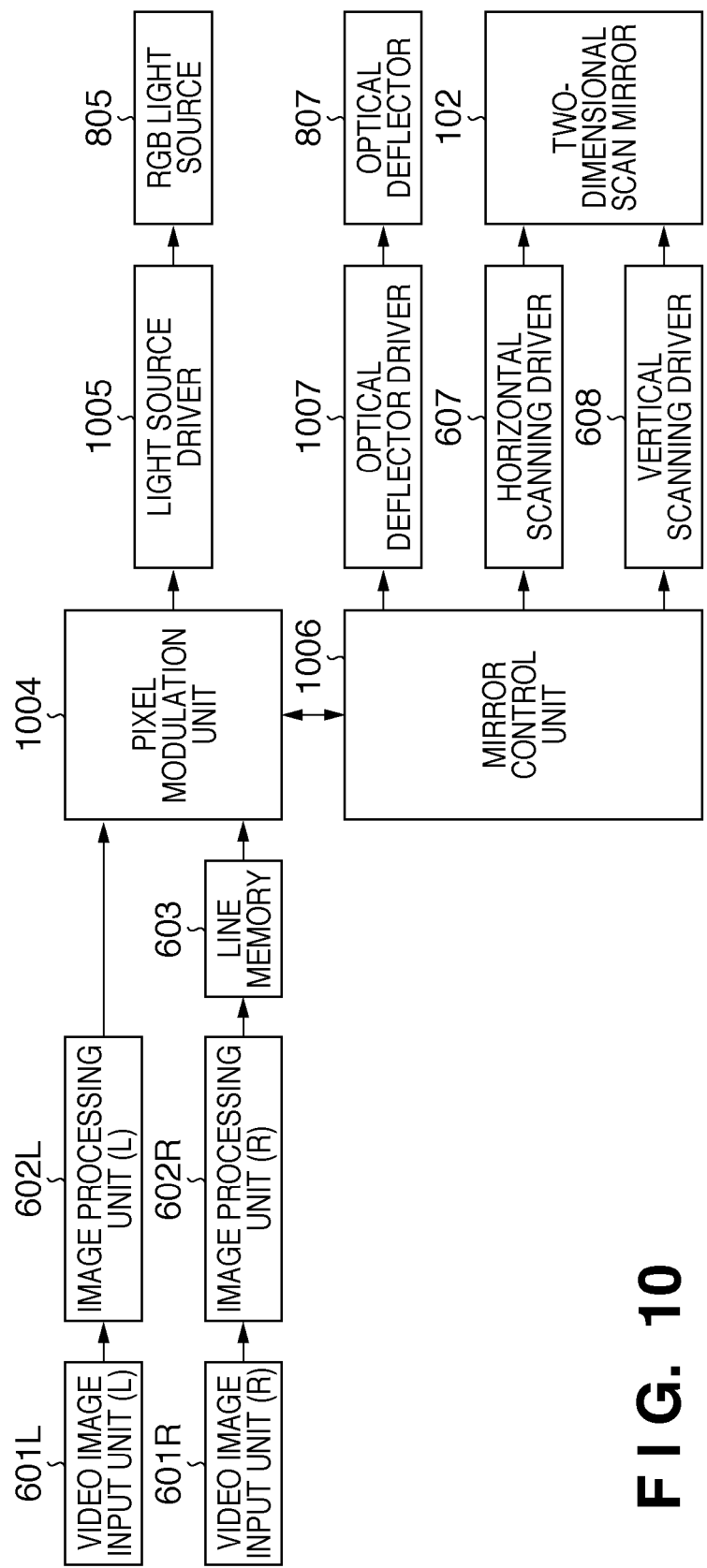
FIG. 10 is a block diagram showing an example of the arrangement of the image display apparatus according to the second embodiment.

FIG. 10 is a block diagram showing an example of the arrangement of the image display apparatus according to the second embodiment. Referring to FIG. 10, a pixel modulation unit 1004 converts the value of left-eye video image data processed by a left-eye image processing unit 602L and the value of right-eye video image data temporarily stored and inverted horizontally in a line memory 603 into levels, thereby performing amplitude modulation. A light source driver 1005 causes the three-color light source 805 to emit light of the respective colors in accordance with the level value obtained by amplitude modulation of the pixel modulation unit 1004. An optical deflector driver 1007 switches the deflection direction of the optical deflector 807 for the left or right eye.

The remaining components are the same as in the first embodiment, and a description thereof will not be repeated. Note that the arrangement of the optical system is slightly different from that of the first embodiment. However, the components are the same as in the first embodiment except the video image generation unit 104, and a description thereof will not be repeated.

The second embodiment will now be described with reference to FIGS. 8 to 10.

The second embodiment is different from the first embodiment in that the left- and right-eye arrangements share the light source (three-color light source 805), and the optical deflector 807 generates the left-eye three-color light beam 205L and the right-eye three-color light beam 205R. In FIG. 8, the red light source 801, the green light source 802, and the blue light source 803 generate red, green, and blue light beams, respectively. The dichroic prism 804 brings them together and emits one light beam (three-color light beam 806). The optical deflector 807 switches the emitted three-color light beam 806 to the left-eye three-color light beam 205L or the right-eye three-color light beam 205R. Then, the left-eye light beam reflecting mirror 808L and the right-eye light beam reflecting mirror 808R reflect the left-eye three-color light beam 205L and the right-eye three-color light beam 205R, respectively, toward the two-dimensional scan mirror 102. The succeeding operation is the same as in the first embodiment, and a description thereof will not be repeated.

In the second embodiment shown in FIG. 9, since the left- and right-eye arrangements share the light source (three-color light source 805), the light source driving periods are unified into the light source driving period 901, and switching between the left and right eyes is done by adding the deflection direction switching signal 902, unlike the first embodiment. Note that the deflection direction switching signal 902 indicates that the deflection direction is switched to the left-eye direction on the left side and to the right-eye direction on the right side.

Referring to FIG. 10, the left- and right-eye arrangements share the pixel modulation unit 1004, the light source driver 1005, and the three-color light source 805, unlike the first embodiment (FIG. 6). The optical deflector driver 1007 for controlling switching of the optical deflector 807 based on the deflection direction switching signal 902 is added to switch between the left-eye light beam and the right-eye light beam.

As described above, in the second embodiment, the additional optical deflector 807 allows the left- and right-eye arrangements to share a single light source and omit the circuits corresponding to one light source system, unlike the first embodiment.

In the above description, a light source of three colors, that is, red, green, and blue is used. However, the present invention is not limited to this and can also be practiced using monochromatic light or a combination of other colors.

The third embodiment will be described next. Note that the light source driving timing of vertical scanning and distortion correction of the third embodiment are the same as those described in the first embodiment (FIGS. 4 and 7A to 7C).

Figure 11:
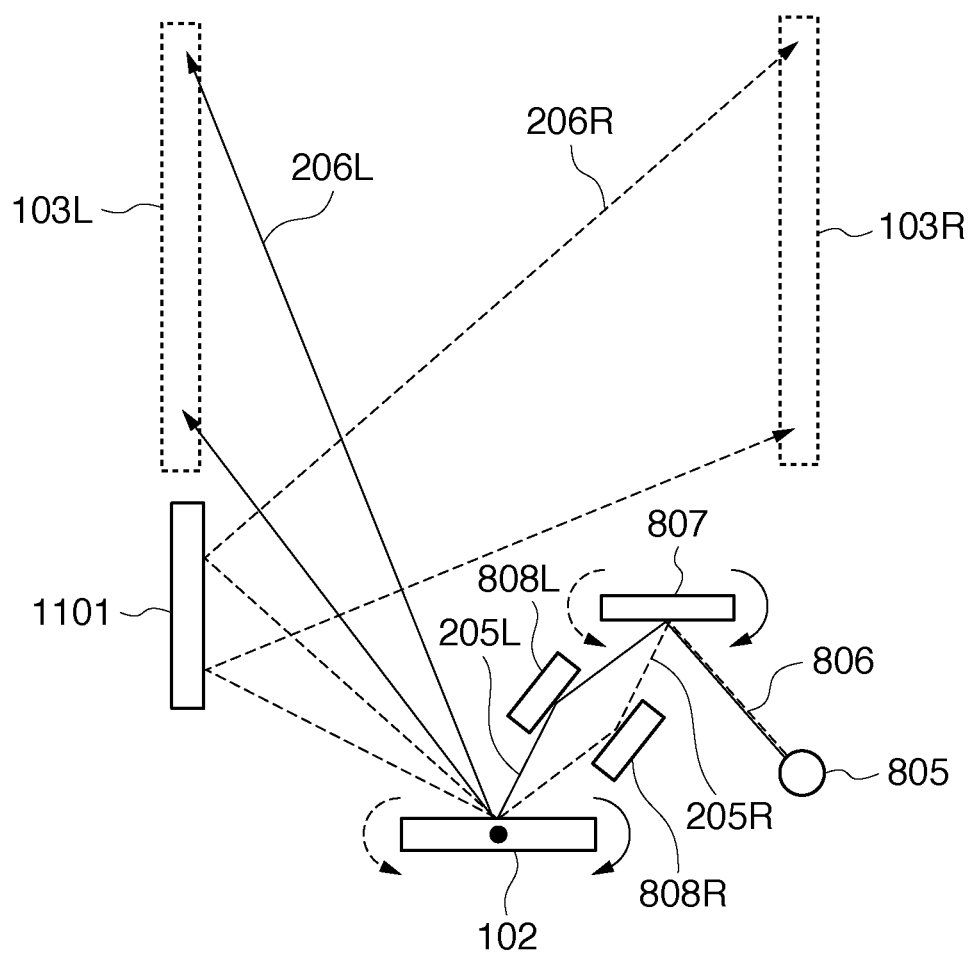
FIG. 11 is a view showing the arrangement of the video image generation unit of each of the image display apparatuses according to the third and fourth embodiments viewed from the upper side (vertical scanning direction)

Referring to FIG. 11, a two-dimensional scanning light beam horizontal reflecting mirror 1101 horizontally reflects a right-eye two-dimensional scanning light beam 206R horizontally and vertically scanned by a two-dimensional scan mirror 102.

Figure 13:
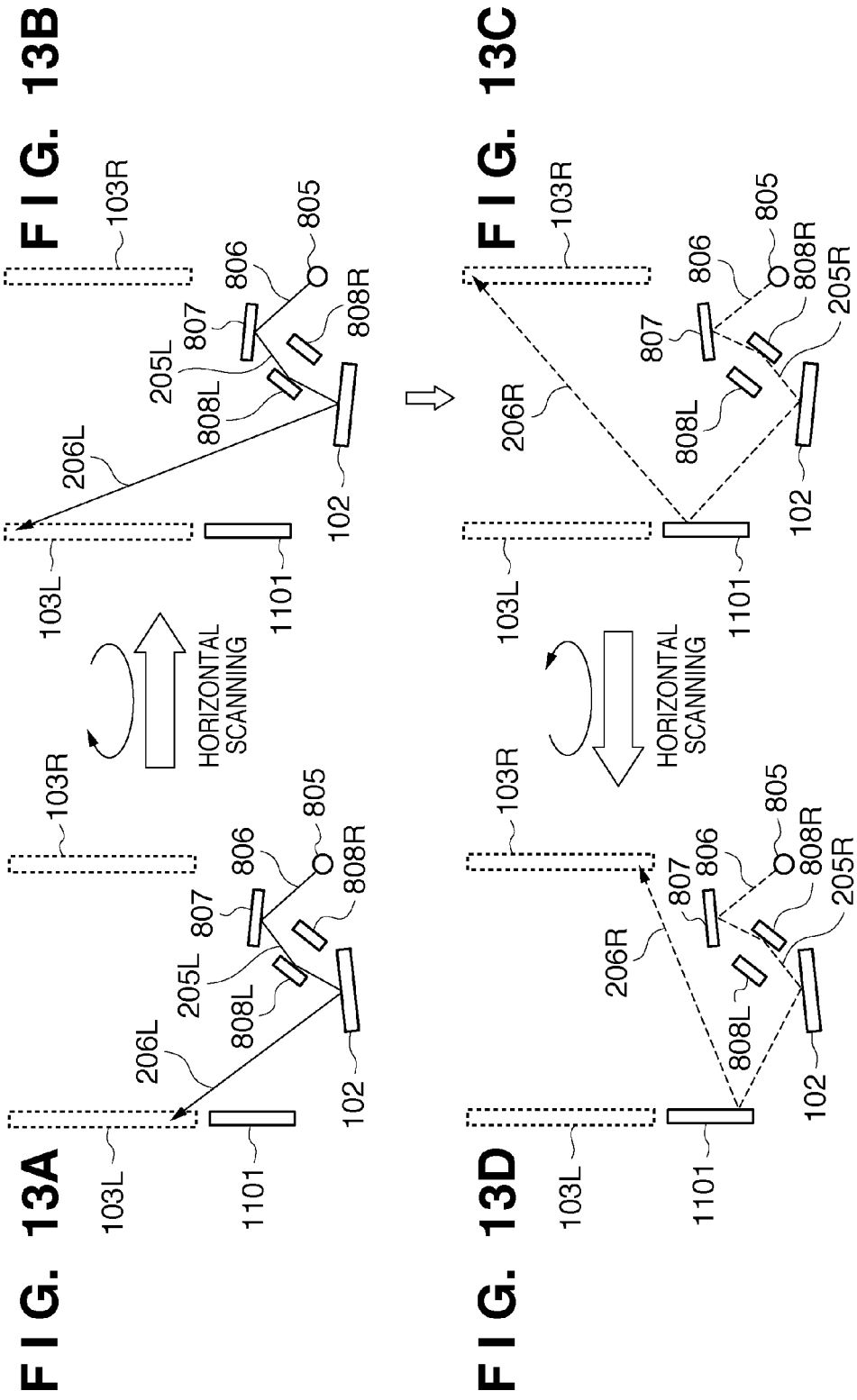
FIGS. 13A to 13D are views showing horizontal scan positions at the respective scanning timings in each of the image display apparatuses according to the third and fourth embodiments.
Figure 14:
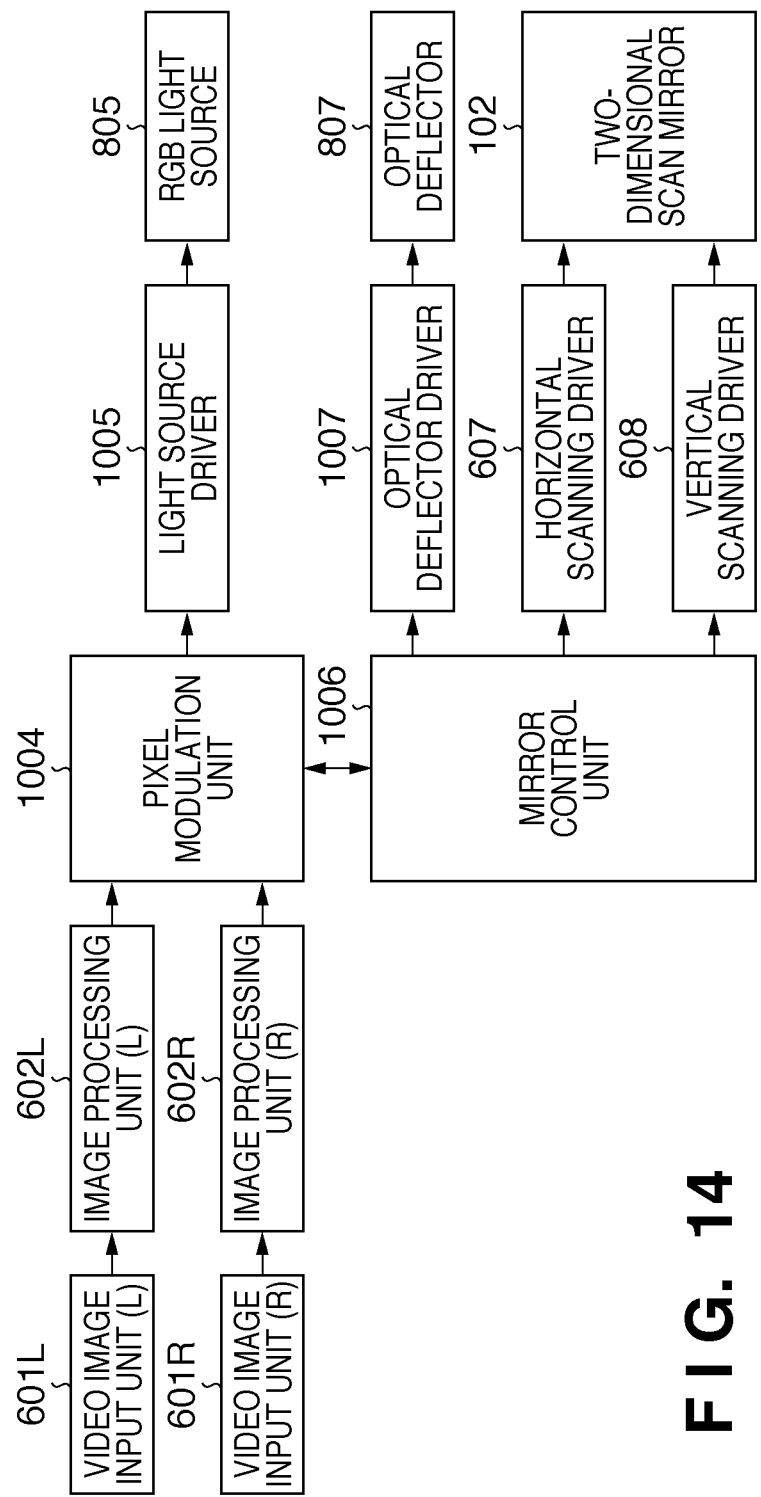
FIG. 14 is a block diagram showing an example of the arrangement of the image display apparatus according to the third embodiment.

FIGS. 13A to 13D are views for explaining beam scan positions at the respective scanning timings. The vertical positions are the same as in the first and second embodiments. FIGS. 13A to 13D therefore show only the apparatus viewed from the upper side for descriptive convenience. FIG. 13A illustrates the position of a left-eye two-dimensional scanning light beam 206L when the two-dimensional scan mirror 102 turns to the counterclockwise limit of horizontal scanning. FIG. 13B illustrates the position of the left-eye two-dimensional scanning light beam 206L when the two-dimensional scan mirror 102 turns to the clockwise limit of horizontal scanning. FIG. 13C illustrates the position of the right-eye two-dimensional scanning light beam 206R when the two-dimensional scan mirror 102 turns to the clockwise limit of horizontal scanning. FIG. 13D illustrates the position of the right-eye two-dimensional scanning light beam 206R when the two-dimensional scan mirror 102 turns to the counterclockwise limit of horizontal scanning.

The remaining drawings are the same as in the first and second embodiments, and a description thereof will not be repeated. Note that the arrangement of the optical system is slightly different from that of the first embodiment. However, the components are the same as in the first embodiment except a video image generation unit 104, and a description thereof will not be repeated.

The difference from the second embodiment will be explained below with reference to FIGS. 11 to 14.

The third embodiment is different from the second embodiment in that the apparatus further includes the two-dimensional scanning light beam horizontal reflecting mirror 1101 which horizontally reflects the right-eye two-dimensional scanning light beam 206R horizontally and vertically scanned by the two-dimensional scan mirror 102. The remaining components are the same as in the second embodiment.

Figure 12:
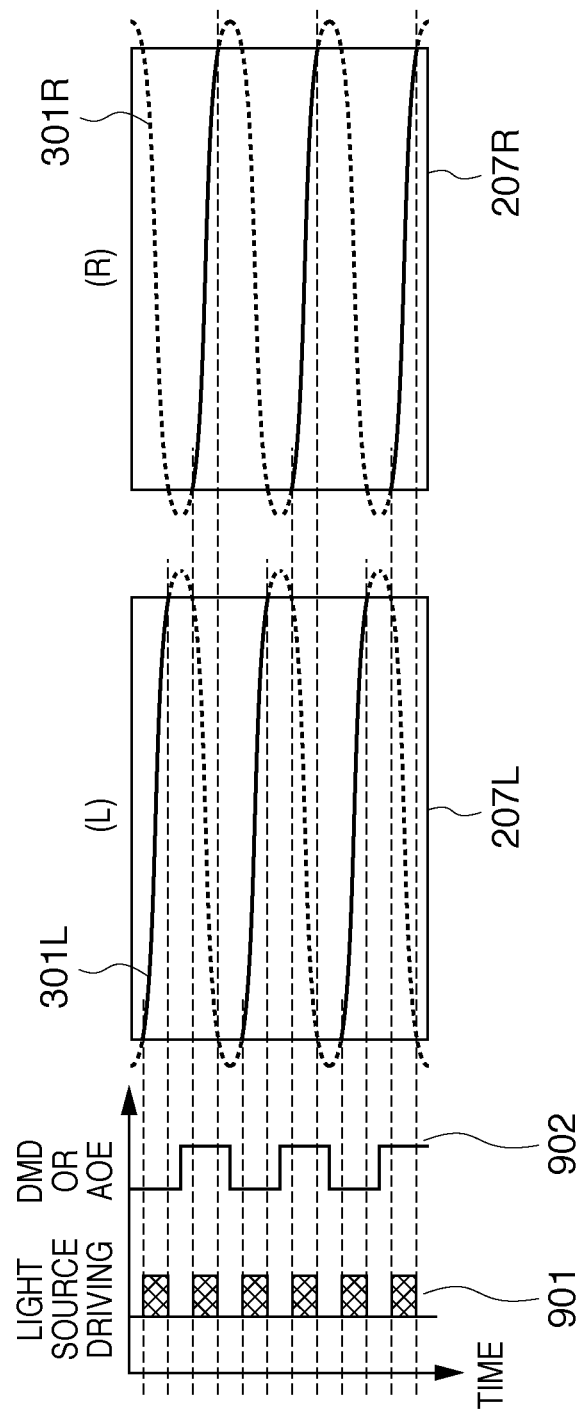
FIG. 12 is a timing chart showing the light source driving timing of horizontal scanning in each of the image display apparatuses according to the third to sixth embodiments.

Since the two-dimensional scanning light beam horizontal reflecting mirror 1101 horizontally reflects the right-eye two-dimensional scanning light beam 206R, a right-eye scanning locus 301R is horizontally inverted in FIG. 12. FIGS. 13A to 13D show details of this operation. First, in the state shown in FIG. 13A, that is, when the two-dimensional scan mirror 102 turns to the counterclockwise limit of horizontal scanning, the left-eye two-dimensional scanning light beam 206L is located on the left edge of a left-eye projection image 207L. When horizontal scanning is performed, that is, the two-dimensional scan mirror 102 rotates clockwise in this state, the state changes to that shown in FIG. 13B, that is, the left-eye two-dimensional scanning light beam 206L is located on the right edge of the left-eye projection image 207L. The operation up to this point is the same as in the second embodiment. When the light source switches to the right eye, the state changes to that shown in FIG. 13C, that is, the right-eye two-dimensional scanning light beam 206R is located on the left edge of a right-eye projection image 207R. When horizontal scanning is performed in the reverse direction, that is, the two-dimensional scan mirror 102 rotates counterclockwise in this state, the state changes to that shown in FIG. 13D, that is, the right-eye two-dimensional scanning light beam 206R is located on the right edge of the right-eye projection image 207R. That is, the projection positions of the right-eye two-dimensional scanning light beam 206R in FIGS. 13C and 13D are reverse to those in the second embodiment.

Since the two-dimensional scanning light beam horizontal reflecting mirror 1101 horizontally reflects the right-eye two-dimensional scanning light beam 206R, a line memory 603 to be used to horizontally invert data is unnecessary. Hence, the line memory 603 is removed from the arrangement shown in FIG. 10.

As described above, in the third embodiment, an optical member (two-dimensional scanning light beam horizontal reflecting mirror 1101) for horizontally inverting the right-eye two-dimensional scanning light beam 206R is provided. This makes the horizontal scanning direction of the first and second scanning light beams coincide with the scanning direction of the image signal and obviates the line memory 603. A pixel modulation unit 1004 can generate first and second light beams in accordance with the input order of left- and right-eye image signals. It is therefore possible to more simplify the arrangement.

The fourth embodiment will be explained next. Note that the arrangement of a video image generation unit 104, the light source driving timing of horizontal scanning, and scan positions at the respective scanning timings of the fourth embodiment are the same as in the third embodiment (FIGS. 11, 12, and 13A to 13D). Distortion correction is the same as in the first embodiment (FIGS. 7A to 7C).

Figure 15:
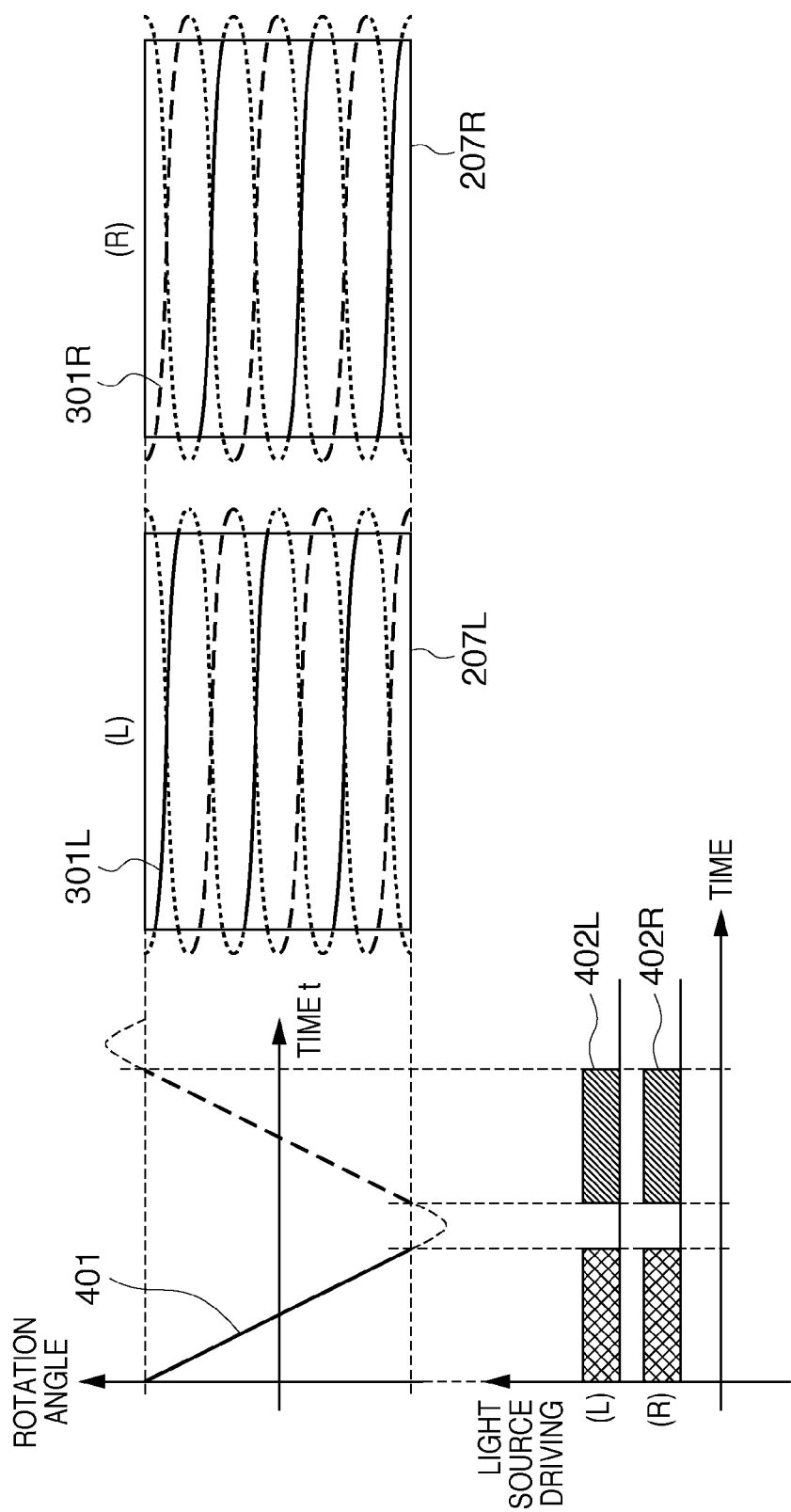
FIG. 15 is a timing chart showing the light source driving timing of vertical scanning in the image display apparatus according to the fourth embodiment.

Referring to FIG. 15, the solid line portions of a vertical mirror rotation locus 401, a left-eye scanning locus 301L, and a right-eye scanning locus 301R indicate loci during forward vertical scanning, as in the third embodiment. Bold broken line portions indicate loci during backward vertical scanning. The loci in backward vertical scanning are not used in the first to third embodiments.

Figure 16:
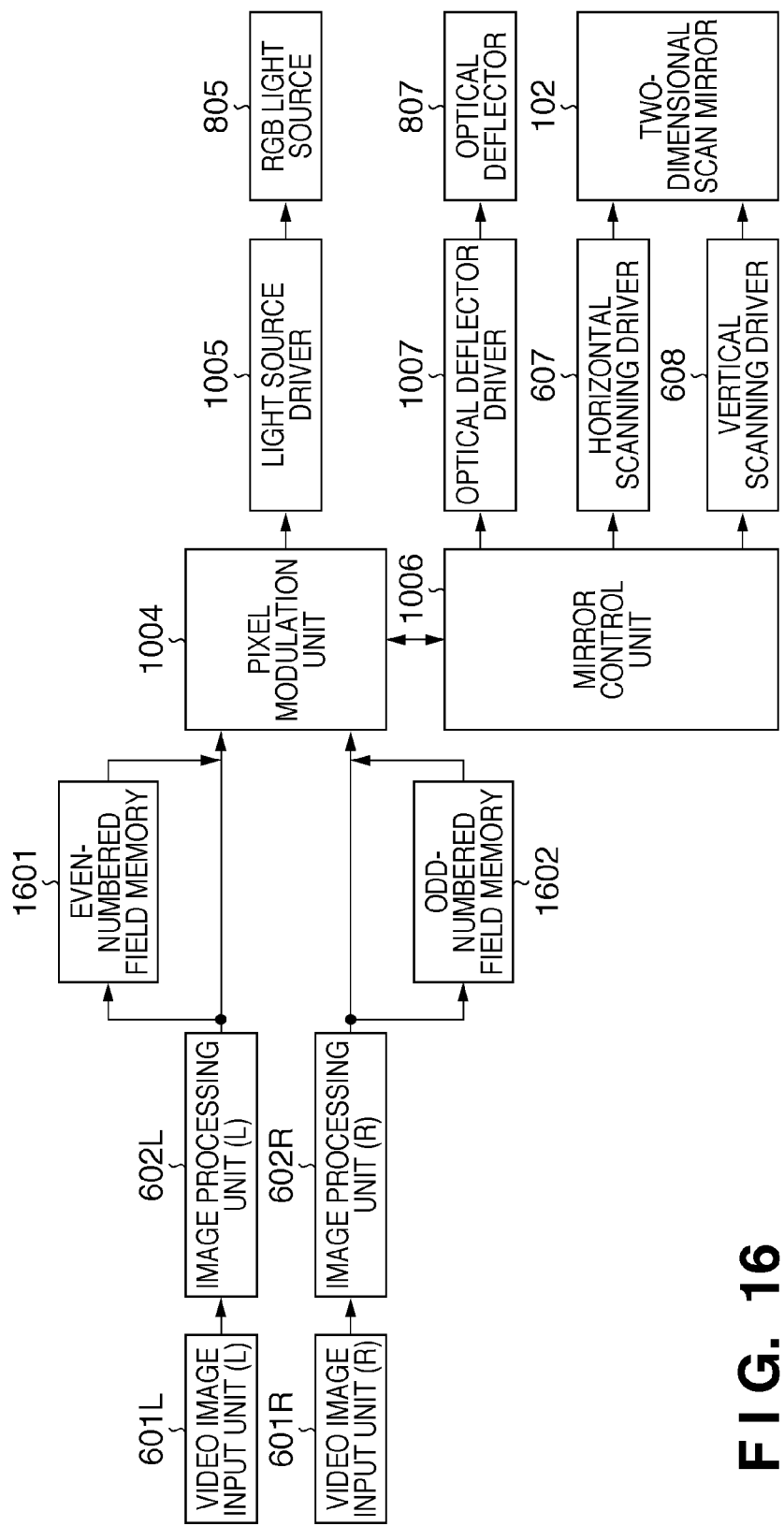
FIG. 16 is a block diagram showing an example of the arrangement of the image display apparatus according to the fourth embodiment.

Referring to FIG. 16, an even-numbered field memory 1601 temporarily stores the even-numbered field data of left-eye video image data that has undergone image processing of a left-eye image processing unit 602L. An odd-numbered field memory 1602 temporarily stores the odd-numbered field data of right-eye video image data that has undergone image processing of a right-eye image processing unit 602R.

The remaining components are the same as in the first to third embodiments, and a description thereof will not be repeated. Note that the arrangement of the optical system is slightly different from that of the first embodiment. However, the components are the same as in the first embodiment except the video image generation unit 104, and a description thereof will not be repeated.

The difference between the fourth embodiment and the third embodiment will mainly be explained below with reference to FIGS. 15 and 16.

The fourth embodiment is different from the third embodiment in that the apparatus performs reciprocating drawing and scanning even in the vertical direction. The remaining portions are the same as in the third embodiment, and a description thereof will not be repeated.

Referring to FIG. 15, since both the forward path and the backward path are used, the angular velocity of the vertical mirror rotation locus on the backward path side indicated by the bold broken lines has the same slope as on the forward path indicated by the solid lines. On the left eye side represented by a left-eye projection image 207L, odd-numbered lines are displayed on the forward path in the vertical direction indicated by the solid lines, and even-numbered lines are displayed on the backward path in the vertical direction indicated by the bold broken lines. Conversely, on the right eye side represented by a right-eye projection image 207R, even-numbered lines are displayed on the forward path in the vertical direction indicated by the solid lines, and odd-numbered lines are displayed on the backward path in the vertical direction indicated by the bold broken lines.

To do this, the even-numbered field memory 1601 for the left eye and the odd-numbered field memory 1602 for the right eye are necessary in FIG. 16. That is, the data held in the even-numbered field memory 1601 and the odd-numbered field memory 1602 are read out for display on the backward path.

In the above description, the odd-numbered lines are displayed on the forward path, and the even-numbered lines are displayed on the backward path for the left eye. The even-numbered lines are displayed on the forward path, and the odd-numbered lines are displayed on the backward path for the right eye. However, the present invention is practicable even if the whole procedure is reversed. Giving an overview of the operation of the fourth embodiment, the drive of a three-color light source 805 is controlled in the following way. While the reflection surface rotates in the first direction about the first axis during the reciprocating rotation in the third direction (e.g., downward from the upper side) about the second axis, the light source generates, as the first light beam, a light beam corresponding to an odd-numbered line of an image signal for one eye. While the reflection surface rotates in the second direction about the first axis during the rotation in the third direction, the light source generates, as the second light beam, a light beam corresponding to an even-numbered line of an image signal for the other eye. While the reflection surface rotates in the first direction during the rotation in the fourth direction (e.g., upward from the lower side) opposite to the third direction, the light source generates, as the first light beam, a light beam corresponding to an even-numbered line of the image signal for one eye. While the reflection surface rotates in the second direction during the rotation in the fourth direction, the light source generates, as the second light beam, a light beam corresponding to an odd-numbered line of the image signal for the other eye.

As described above, according to the fourth embodiment, both the forward path and the backward path are used even in the vertical direction. This shortens the time without light beam irradiation on a two-dimensional scan mirror 102 and more effectively eliminates the temperature unevenness.

The fifth embodiment will be described next. In the fifth embodiment, an image display apparatus for performing tiling display will be explained. Note that the light source driving timing of horizontal scanning of the image display apparatus according to the fifth embodiment is the same as in the third embodiment (FIG. 12), and distortion correction is the same as in the first embodiment (FIGS. 7A to 7C).

In this embodiment, only the left eye side will be described. Control on the right eye side is the same as that on the left eye side.

Figure 17:
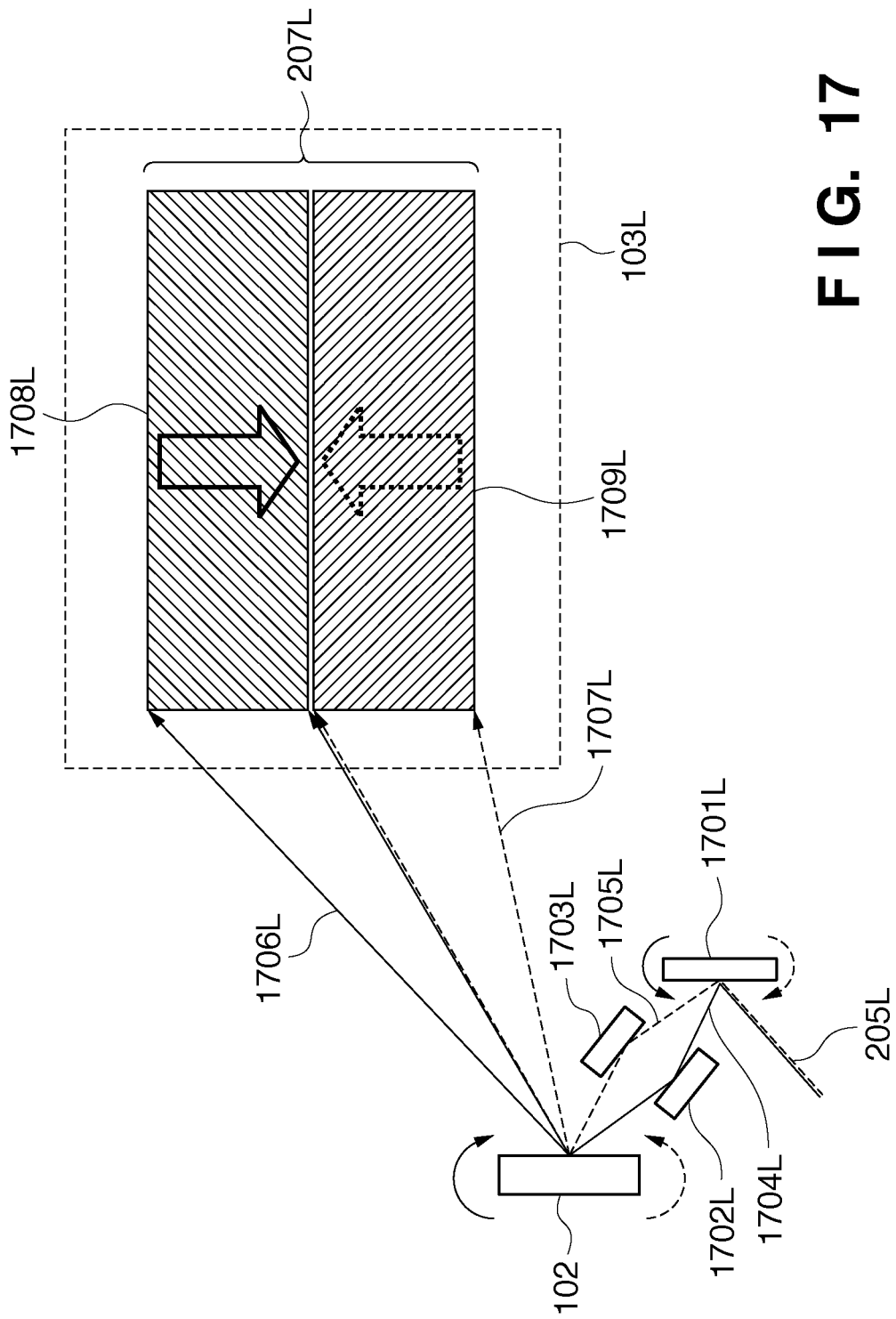
FIG. 17 is a view showing the left-eye arrangement of the video image generation unit of the image display apparatus according to the fifth embodiment viewed from the right eye side.

Referring to FIG. 17, a left-eye optical deflector 1701L deflects a left-eye three-color light beam 205L in the vertical direction of a video image. A DMD or an AOE is usable as the left-eye optical deflector 1701L. A left-eye upper light beam reflecting mirror 1702L reflects the light beam to a two-dimensional scan mirror 102 when the left-eye optical deflector 1701L switches to the upper side of the video image. A left-eye lower light beam reflecting mirror 1703L reflects the light beam to the two-dimensional scan mirror 102 when the left-eye optical deflector 1701L switches to the lower side of the video image. A left-eye upper three-color light beam 1704L is the light beam when the left-eye optical deflector 1701L switches to the upper side of the video image. A left-eye lower three-color light beam 1705L is the light beam when the left-eye optical deflector 1701L switches to the lower side of the video image. A left-eye upper two-dimensional scanning light beam 1706L is generated by causing the two-dimensional scan mirror 102 to horizontally and vertically scan the left-eye upper three-color light beam 1704L. A left-eye lower two-dimensional scanning light beam 1707L is generated by causing the two-dimensional scan mirror 102 to horizontally and vertically scan the left-eye lower three-color light beam 1705L. A left-eye upper projection image 1708L is the upper video image formed by projecting the left-eye upper two-dimensional scanning light beam 1706L onto a left-eye diffusing plate 103L. A left-eye lower projection image 1709L is the lower video image formed by projecting the left-eye lower two-dimensional scanning light beam 1707L onto the left-eye diffusing plate 103L.

Figure 18:
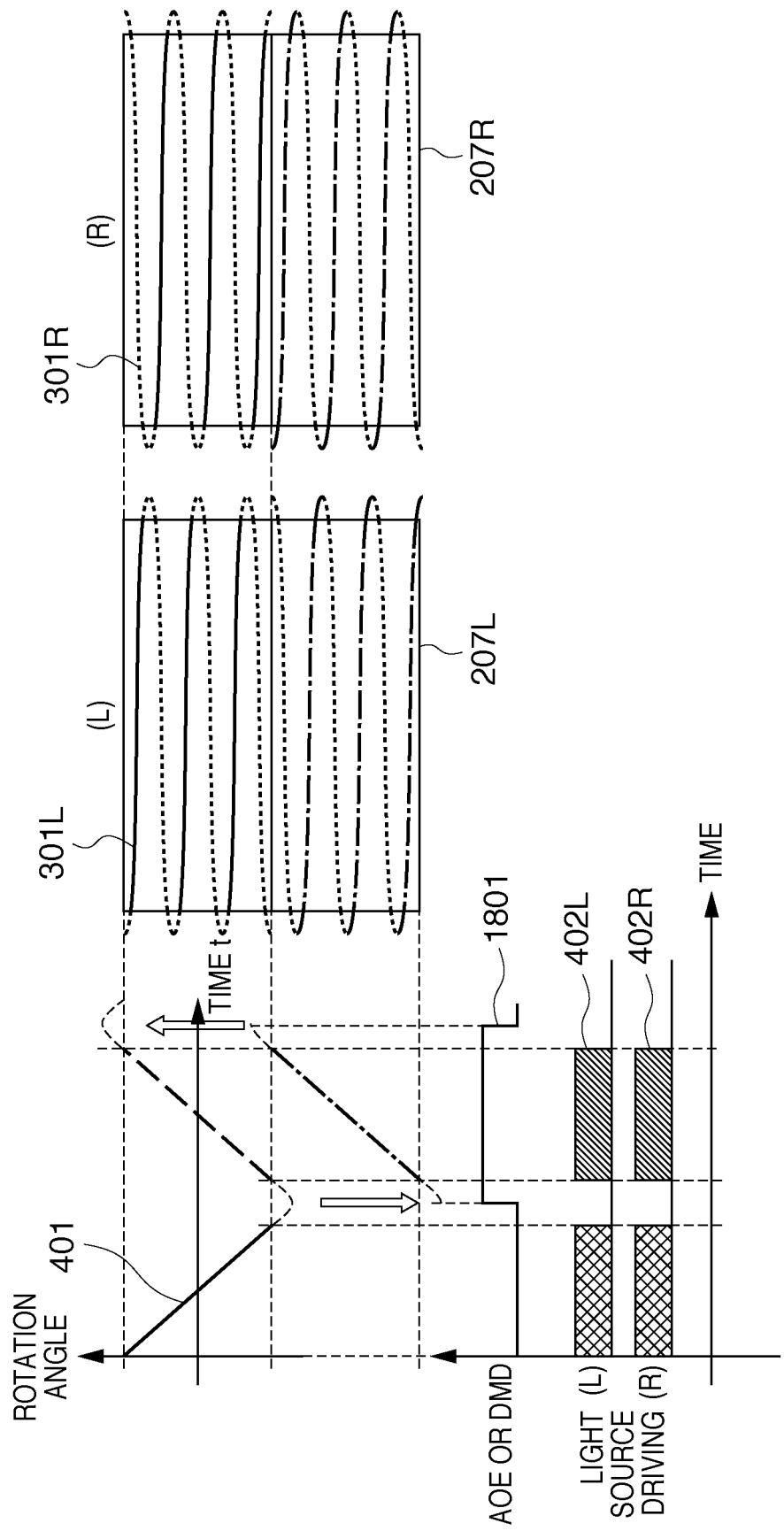
FIG. 18 is a timing chart showing the light source driving timing of vertical scanning in each of the image display apparatuses according to the fifth and ninth embodiments.

Referring to FIG. 18, a vertical deflection direction switching signal 1801 switches the left-eye optical deflector 1701L to the upper side or the lower side. The optical path switching operation described with reference to FIG. 17 yields vertical scanning loci represented by 401 and 1802.

FIG. 19A illustrates the position of the left-eye upper two-dimensional scanning light beam 1706L when the two-dimensional scan mirror 102 turns to the upper limit on the forward path of vertical scanning. FIG. 19B illustrates the position of the left-eye upper two-dimensional scanning light beam 1706L when the two-dimensional scan mirror 102 turns to the lower limit on the forward path of vertical scanning. FIG. 19C illustrates the position of the left-eye lower two-dimensional scanning light beam 1707L when the two-dimensional scan mirror 102 turns to the lower limit on the backward path of vertical scanning. FIG. 19D illustrates the position of the left-eye lower two-dimensional scanning light beam 1707L when the two-dimensional scan mirror 102 turns to the upper limit on the backward path of vertical scanning.

Figure 20:
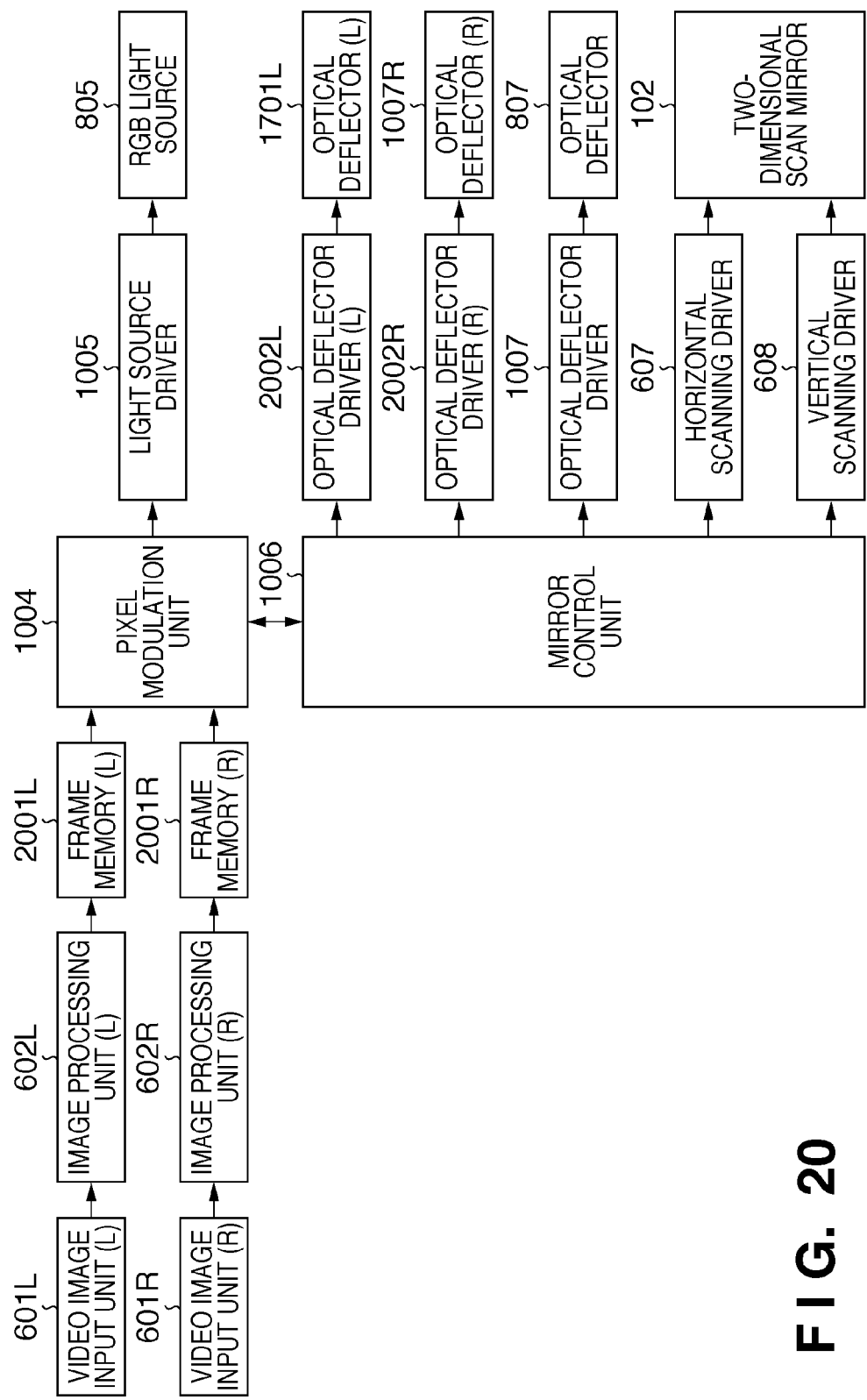
FIG. 20 is a block diagram showing an example of the arrangement of the image display apparatus according to the fifth embodiment.

Referring to FIG. 20, a right-eye optical deflector 1701R deflects a right-eye three-color light beam 205R in the vertical direction of a video image. In the right-eye system, the right-eye optical deflector 1701R plays the same role as the above-described left-eye optical deflector 1701L. A left-eye frame memory 2001L temporarily stores the left-eye video image. A right-eye frame memory 2001R temporarily stores the right-eye video image. A left-eye optical deflector driver 2002L switches the left-eye optical deflector 1701L to the upper side or the lower side. A right-eye optical deflector driver 2002R switches the right-eye optical deflector 1701R to the upper side or the lower side.

The remaining components can use those described in the first to fourth embodiments. Note that the arrangement of the optical system is slightly different from that of the first embodiment. However, the components are the same as in the first embodiment except a video image generation unit 104, and a description thereof will not be repeated.

The difference between the fifth embodiment and the fourth embodiment will mainly be explained below with reference to FIGS. 17 to 20.

The fifth embodiment is different from the fourth embodiment in that the apparatus displays the upper video image on the forward path and the lower video image on the backward path of reciprocating vertical scanning. The remaining portions are the same as in the fourth embodiment.

In FIG. 17, the left-eye optical deflector 1701L switches the left-eye three-color light beam 205L to the left-eye upper three-color light beam 1704L or the right-eye lower three-color light beam 1705L. The left-eye upper light beam reflecting mirror 1702L reflects the left-eye upper three-color light beam 1704L to the two-dimensional scan mirror 102 to generate the left-eye upper two-dimensional scanning light beam 1706L. The left-eye upper two-dimensional scanning light beam 1706L horizontally and vertically scanned by the two-dimensional scan mirror 102 is projected onto the left-eye diffusing plate 103L to form the left-eye upper projection image 1708L. On the other hand, the left-eye lower light beam reflecting mirror 1703L reflects the left-eye lower three-color light beam 1705L to the two-dimensional scan mirror 102 to generate the left-eye lower two-dimensional scanning light beam 1707L. The left-eye lower two-dimensional scanning light beam 1707L horizontally and vertically scanned by the two-dimensional scan mirror 102 is projected onto the left-eye diffusing plate 103L to form the left-eye lower projection image 1709L.

Referring to FIG. 18, since both the forward path and the backward path are used, the angular velocities of the vertical mirror rotation loci on the backward path indicated by the alternate long and short dashed line and the broken line are the same as those on the forward path indicated by the solid line and the broken line. On the left eye side represented by a left-eye projection image 207L, the upper video image is displayed on the forward path in the vertical direction indicated by the solid line and the broken line (only the solid line portion is displayed). The lower video image is displayed on the backward path in the vertical direction indicated by the alternate long and short dashed line and the broken line (only the alternate long and short dashed line portion is displayed). On the right eye side represented by a right-eye projection image 207R, the left-eye upper projection image 1708L is displayed on the forward path in the vertical direction indicated by the solid line and the broken line (only the solid line portion is displayed). The left-eye lower projection image 1709L is displayed on the backward path in the vertical direction indicated by the alternate long and short dashed line and the broken line (only the alternate long and short dashed line portion is displayed). Note that the vertical resolution of each display is twice that in the fourth embodiment.

First, in the state shown in FIG. 19A, that is, when the two-dimensional scan mirror 102 turns to the upper limit on the forward path of vertical scanning, the left-eye upper two-dimensional scanning light beam 1706L is located on the upper edge of the left-eye upper projection image 1708L. When vertical scanning is performed, that is, the two-dimensional scan mirror 102 rotates downward in this state, the state changes to that shown in FIG. 19B, that is, the left-eye upper two-dimensional scanning light beam 1706L is located on the lower edge of the left-eye upper projection image 1708L. When the left-eye optical deflector 1701L switches to the left-eye lower three-color light beam 1705L, the state changes to that shown in FIG. 19C, that is, the left-eye lower two-dimensional scanning light beam 1707L is located on the lower edge of the left-eye lower projection image 1709L. When vertical scanning is performed in the reverse direction, that is, the two-dimensional scan mirror 102 rotates upward in this state, the state changes to that shown in FIG. 19D, that is, the left-eye lower two-dimensional scanning light beam 1707L is located on the upper edge of the left-eye lower projection image 1709L.

FIG. 20 is a block diagram of the image display apparatus according to the fifth embodiment. The image display apparatus of the fifth embodiment includes the optical deflector drivers 2002L and 2002R which drive the left-eye optical deflector 1701L and the right-eye optical deflector 1701R to divide one frame into upper and lower video images for tiling display. Since the lower video image in tiling display is inverted vertically, the left-eye frame memory 2001L and the right-eye frame memory 2001R are provided.

As described above, in the fifth embodiment, optical members (left-eye optical deflector 1701L, left-eye upper light beam reflecting mirror 1702L, and left-eye lower light beam reflecting mirror 1703L) for changing the optical path of a light beam from the light source are provided. The optical members are provided for each of the first and second light beams to make each light beam incident on the reflection surface of the scan mirror 102 via one of the first and second optical paths.

A control unit including a pixel modulation unit 1004 and a mirror control unit 1006 controls the units to make a light beam incident on the reflection surface via the first optical path and generate a scanning light beam to form the upper portion of the image based on the image signal during rotation of the reflection surface in the third direction. The control unit controls the units to make a light beam incident on the reflection surface via the second optical path and generate a scanning light beam to form the lower portion of the image based on the image signal during rotation of the reflection surface in the fourth direction.

According to the above-described embodiment, it is possible to provide an image display apparatus capable of tiling display while exploiting the advantages of the first to fourth embodiments. In the above-described fifth embodiment, the left-eye upper projection image 1708L and the left-eye lower projection image 1709L do not overlap. However, they may overlap as will be described later in the ninth embodiment.

The sixth embodiment will be explained next. In the sixth embodiment as well, tiling display of two images divided on the upper and lower sides will be described. The light source driving timing of horizontal scanning of the sixth embodiment is the same as in the third embodiment (FIG. 12), and distortion correction of the sixth embodiment is the same as described in the first embodiment (FIGS. 7A to 7C).

Figure 21:
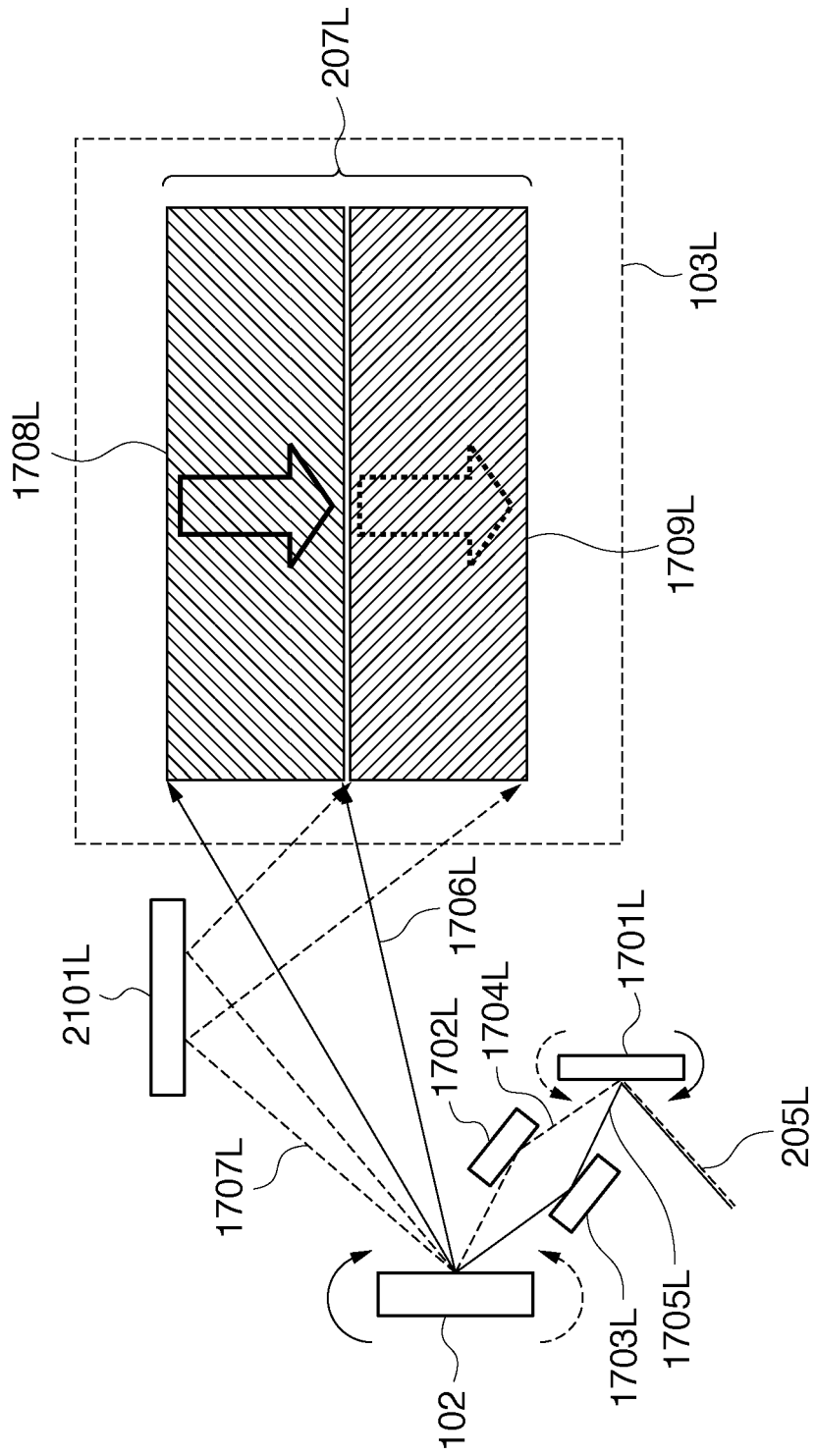
FIG. 21 is a view showing the left-eye arrangement of the video image generation unit of the image display apparatus according to the sixth embodiment viewed from the right eye side.

Referring to FIG. 21, a left-eye two-dimensional scanning light beam vertical reflecting mirror 2101L vertically reflects a left-eye lower two-dimensional scanning light beam 1707L.

The remaining components in FIG. 21 are the same as those of the first to fifth embodiments, and a description thereof will not be repeated. Note that the arrangement of the optical system is slightly different from that of the first embodiment. However, the components are the same as in the first embodiment except a video image generation unit 104, and a description thereof will not be repeated.

FIG. 23A illustrates the position of a left-eye upper two-dimensional scanning light beam 1706L when a two-dimensional scan mirror 102 turns to the upper limit on the forward path of vertical scanning. FIG. 23B illustrates the position of the left-eye upper two-dimensional scanning light beam 1706L when the two-dimensional scan mirror 102 turns to the lower limit on the forward path of vertical scanning. FIG. 23C illustrates the position of the left-eye lower two-dimensional scanning light beam 1707L when the two-dimensional scan mirror 102 turns to the lower limit on the backward path of vertical scanning. FIG. 23D illustrates the position of the left-eye lower two-dimensional scanning light beam 1707L when the two-dimensional scan mirror 102 turns to the upper limit on the backward path of vertical scanning.

The difference between the sixth embodiment and the fifth embodiment will mainly be explained below with reference to FIGS. 21 to 24.

The sixth embodiment is different from the fifth embodiment in that the apparatus includes the left-eye two-dimensional scanning light beam vertical reflecting mirror 2101L for vertically reflecting the left-eye lower two-dimensional scanning light beam 1707L. The remaining portions are the same as in the fifth embodiment.

Figure 22:
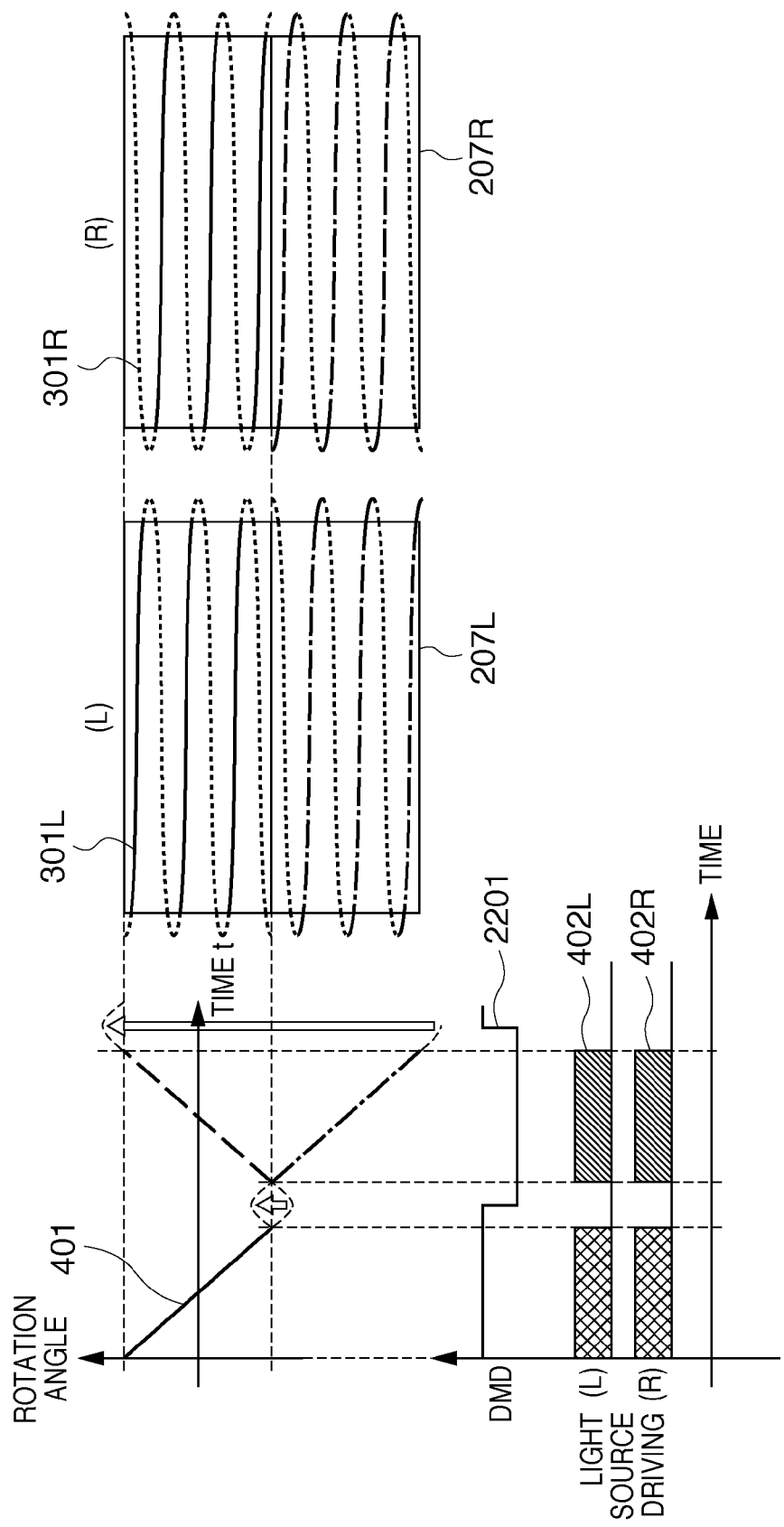
FIG. 22 is a timing chart showing the light source driving timing of vertical scanning in the image display apparatus according to the sixth embodiment.

Referring to FIG. 21, the left-eye two-dimensional scanning light beam vertical reflecting mirror 2101L vertically inverts a left-eye lower projection image 1709L. FIG. 22 shows this state. A vertical deflection direction switching signal 2201 switches a left-eye optical deflector 1701L to the lower side or the upper side. The optical path switching operation described with reference to FIG. 21 yields vertical scanning loci represented by 401 and 2202.

First, in the state shown in FIG. 23A, that is, when the two-dimensional scan mirror 102 turns to the upper limit on the forward path of vertical scanning, the left-eye upper two-dimensional scanning light beam 1706L is located on the upper edge of a left-eye upper projection image 1708L. When vertical scanning is performed, that is, the two-dimensional scan mirror 102 rotates downward in this state, the state changes to that shown in FIG. 23B, that is, the left-eye upper two-dimensional scanning light beam 1706L is located on the lower edge of the left-eye upper projection image 1708L. When the left-eye optical deflector 1701L switches to a left-eye lower three-color light beam 1705L, the state changes to that shown in FIG. 23C, that is, the left-eye lower two-dimensional scanning light beam 1707L is located on the upper edge of the left-eye lower projection image 1709L. When vertical scanning is performed in the reverse direction, that is, the two-dimensional scan mirror 102 rotates upward in this state, the state changes to that shown in FIG. 23D, that is, the left-eye lower two-dimensional scanning light beam 1707L is located on the lower edge of the left-eye lower projection image 1709L. That is, the projection positions of the left-eye lower two-dimensional scanning light beam 1707L in FIGS. 23C and 23D are vertically reverse to those in the fifth embodiment.

Figure 24:
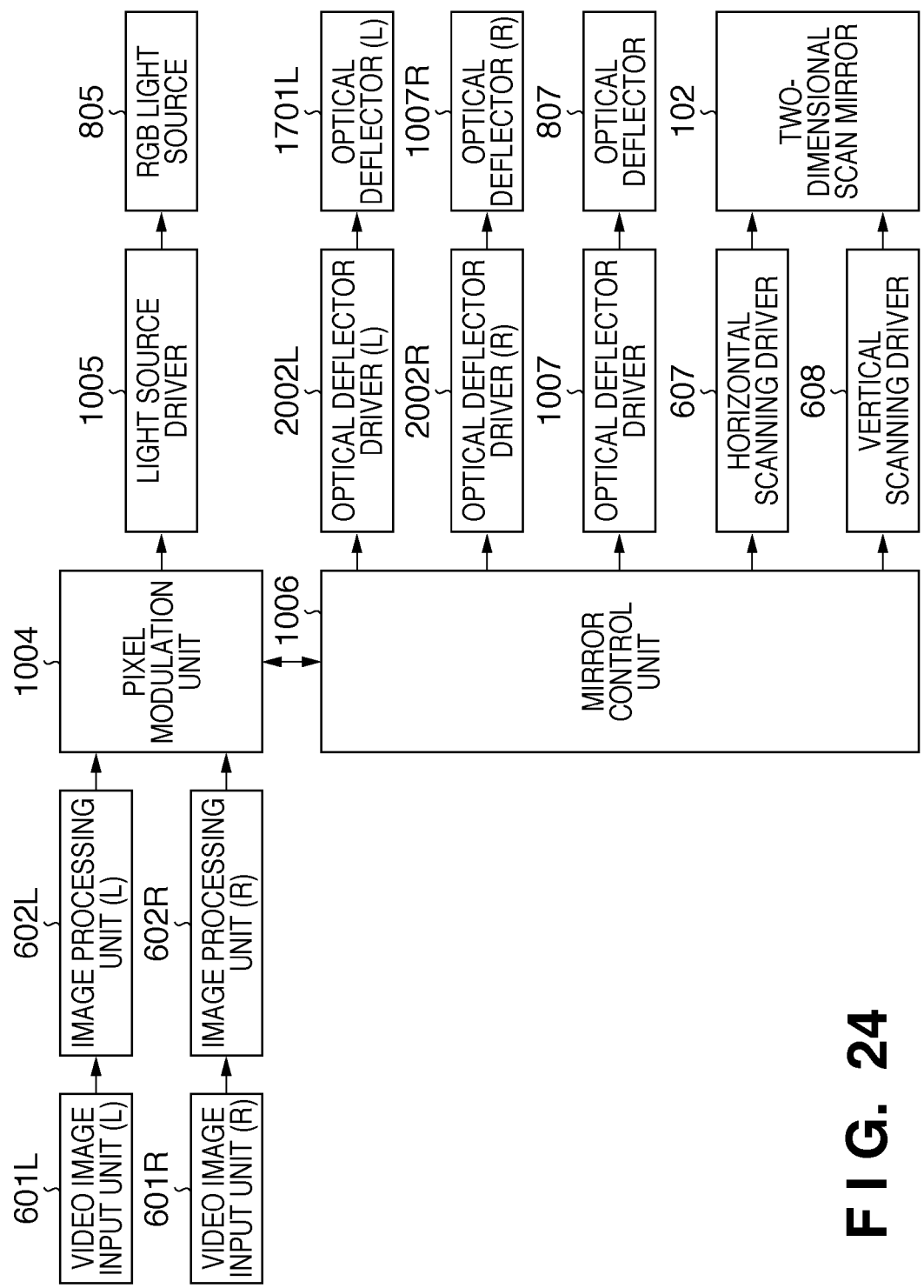
FIG. 24 is a block diagram showing an example of the arrangement of the image display apparatus according to the sixth embodiment.

As described above, in the sixth embodiment, there is provided an optical path control unit (left-eye two-dimensional scanning light beam vertical reflecting mirror 2101L) which controls the optical path of the scanning light beam to make the scan position of the scanning light beam for forming the upper and lower images coincide with the image signal scanning order. In the sixth embodiment, this makes it possible to process the lower image in accordance with the image data input order as well and, as shown in FIG. 24, obviate the left-eye frame memory 2001L and the right-eye frame memory 2001R that are necessary in the fifth embodiment.

In the above-described embodiment, the left-eye upper projection image 1708L and the left-eye lower projection image 1709L do not overlap. However, they may overlap as will be described later in the ninth embodiment.

The seventh embodiment will be described next. In the seventh embodiment, an image display apparatus which divides one frame image represented by an image signal into left and right images for tiling display will be explained. The light source driving timing of vertical scanning and distortion correction of the seventh embodiment are the same as in the first embodiment (FIGS. 4 and 7A to 7C).

Figure 25:
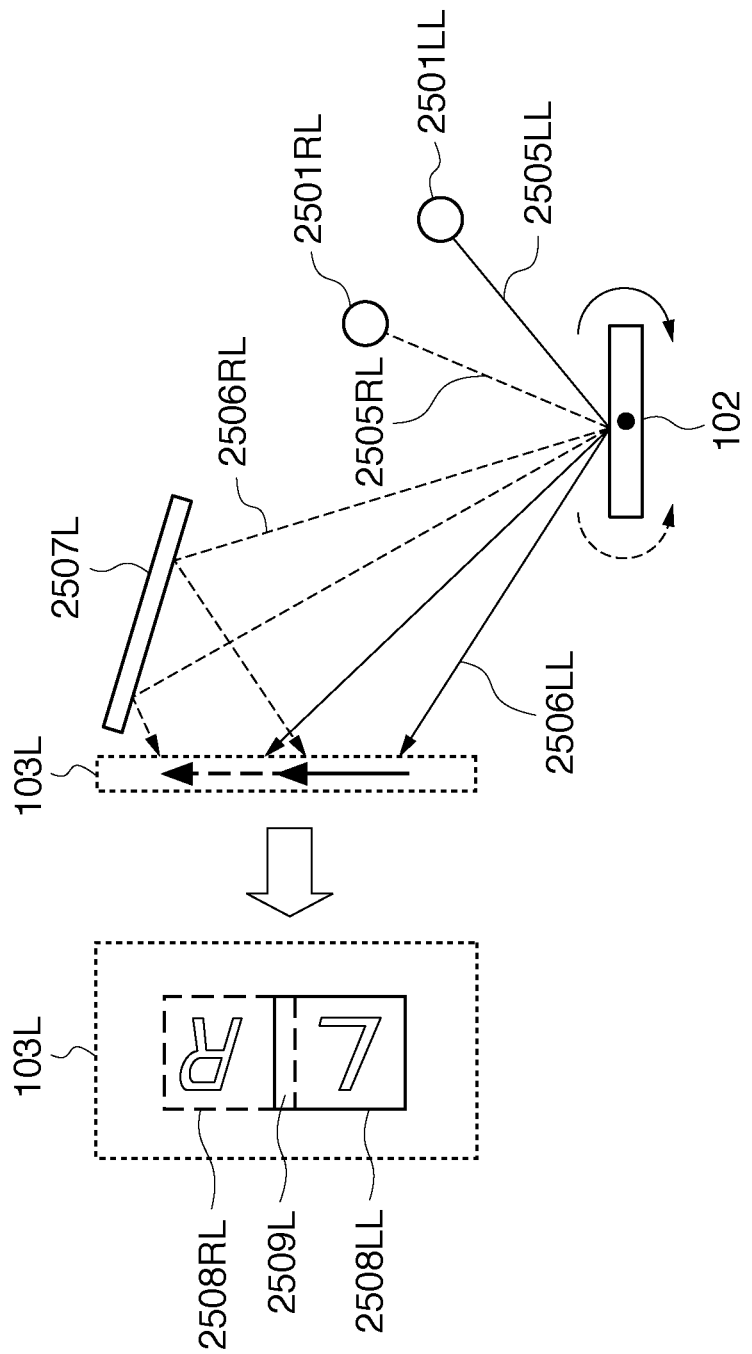
FIG. 25 is a schematic view showing the arrangement of the video image generation unit of the image display apparatus according to the seventh embodiment viewed from the upper side (vertical scanning direction)

FIG. 25 is a view showing the arrangement of a video image generation unit 104 of the image display apparatus according to the seventh embodiment. The vertical positions are the same as in the first second embodiment. FIG. 25 therefore illustrates only the apparatus viewed from the upper side for descriptive convenience. Referring to FIG. 25, a left-eye left three-color light source 2501LL includes a left-eye left red light source, a left-eye left green light source, a left-eye left blue light source, and a left-eye left dichroic prism. A left-eye right three-color light source 2501RL includes a left-eye right red light source, a left-eye right green light source, a left-eye right blue light source, and a left-eye right dichroic prism.

A left-eye left three-color light beam 2505LL includes the light beams emitted by the left-eye left red light source, the left-eye left green light source, and the left-eye left blue light source and put together by the left-eye left dichroic prism. A two-dimensional scan mirror 102 scans the left-eye left three-color light beam 2505LL to form a left-eye left two-dimensional scanning light beam 2506LL.

A left-eye right three-color light beam 2505RL includes the light beams emitted by the left-eye right red light source, the left-eye right green light source, and the left-eye right blue light source and put together by the left-eye right dichroic prism. The two-dimensional scan mirror 102 scans the left-eye right three-color light beam 2505RL to form a left-eye right two-dimensional scanning light beam 2506RL. A left-eye two-dimensional scanning light beam horizontal reflecting mirror 2507L horizontally reflects the left-eye right two-dimensional scanning light beam 2506RL.

The left-eye left two-dimensional scanning light beam 2506LL generates a left-eye left projection image 2508LL on a left-eye diffusing plate 103L. The left-eye right two-dimensional scanning light beam 2506RL horizontally reflected by the left-eye two-dimensional scanning light beam horizontal reflecting mirror 2507L generates a left-eye right projection image 2508RL on the left-eye diffusing plate 103L. The left-eye left projection image 2508LL overlaps the left-eye right projection image 2508RL at a left-eye left/right projection image overlap portion 2509L.

Note that the control is common to the left and right eyes in this embodiment, and only the left eye side will be described.

Figure 26:
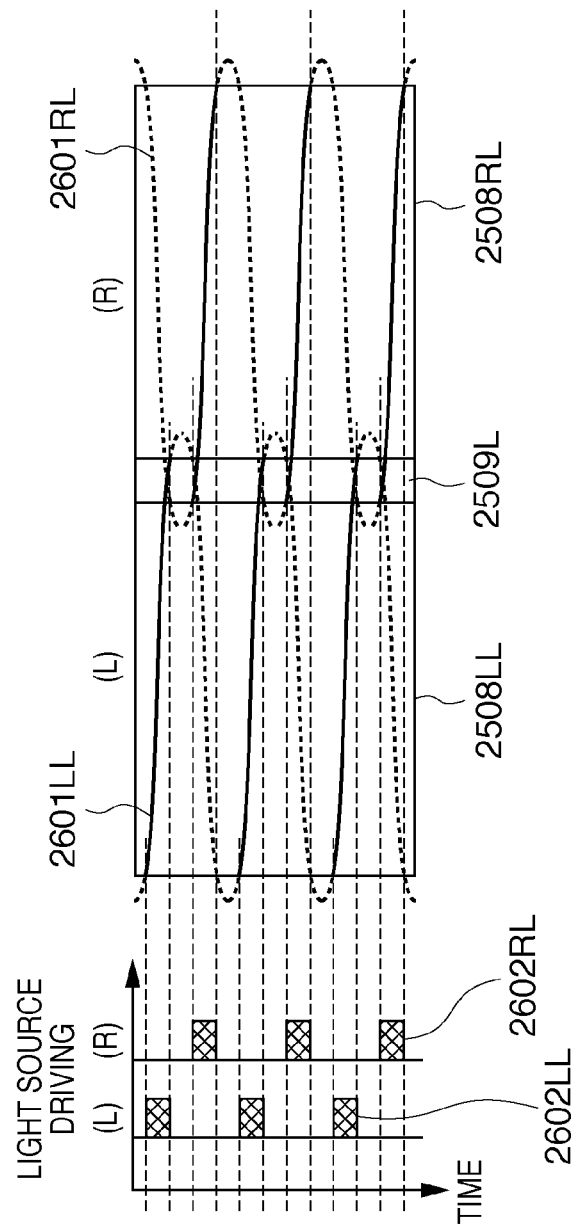
FIG. 26 is a timing chart showing the light source driving timing of horizontal scanning in the image display apparatus according to the seventh embodiment.

FIG. 26 shows the light source driving timing of horizontal scanning in the image display apparatus according to the seventh embodiment. Referring to FIG. 26, a left-eye left scanning locus 2601LL represents the locus of the left-eye left two-dimensional scanning light beam 2506LL in the left-eye left projection image 2508LL generated on the left-eye diffusing plate 103L. A left-eye left light source driving period 2602LL indicates the driving state of the left-eye left three-color light source 2501LL during the horizontal scanning.

A left-eye right scanning locus 2601RL represents the locus of the left-eye right two-dimensional scanning light beam 2506RL in the left-eye right projection image 2508RL generated on the left-eye diffusing plate 103L. A left-eye right light source driving period 2602RL indicates the driving state of the left-eye right three-color light source 2501RL during the horizontal scanning.

Figure 27:
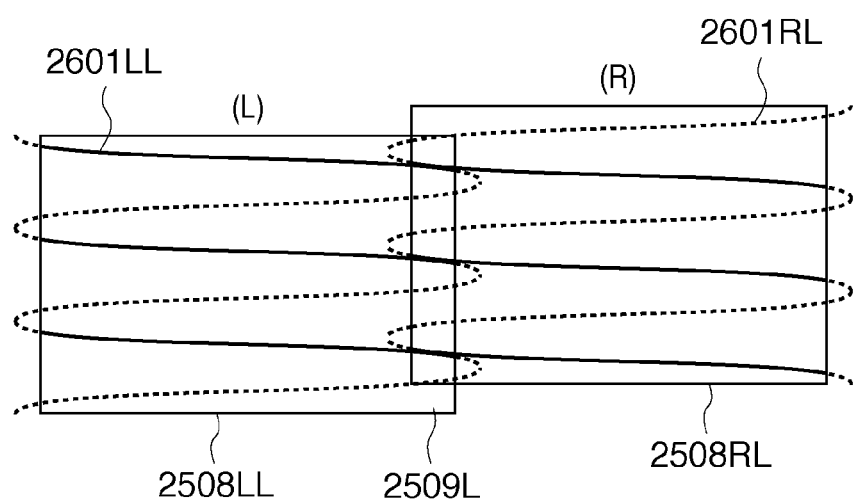
FIG. 27 is a view showing an example of tiling display in each of the image display apparatuses according to the seventh and eighth embodiments.

FIG. 27 shows an example of tiling display according to the seventh embodiment. In FIG. 27, the left-eye right projection image 2508RL in FIG. 26 is slightly shifted upward to make the scan positions of the left-eye left scanning locus 2601LL and the left-eye right scanning locus 2601RL at the left-eye left/right projection image overlap portion 2509L almost coincide with each other. Note that slightly shifting the left-eye right projection image 2508RL upward is done by, for example, slightly shifting the position of the left-eye right three-color light source 2501RL.

FIGS. 28A to 28D are views showing scan positions at the respective scanning timings in the video image generation unit 104 of the image display apparatus according to the seventh embodiment. The vertical positions are the same as in the first embodiment. FIGS. 28A to 28D therefore show only the apparatus viewed from the upper side for descriptive convenience. FIG. 28A illustrates the position of the left-eye left two-dimensional scanning light beam 2506LL when the two-dimensional scan mirror 102 turns to the counterclockwise limit of horizontal scanning. FIG. 28B illustrates the position of the left-eye left two-dimensional scanning light beam 2506LL when the two-dimensional scan mirror 102 turns to the clockwise limit of horizontal scanning. FIG. 28C illustrates the position of the left-eye right two-dimensional scanning light beam 2506RL when the two-dimensional scan mirror 102 turns to the clockwise limit of horizontal scanning. FIG. 28D illustrates the position of the left-eye right two-dimensional scanning light beam 2506RL when the two-dimensional scan mirror 102 turns to the counterclockwise limit of horizontal scanning.

Figure 29:
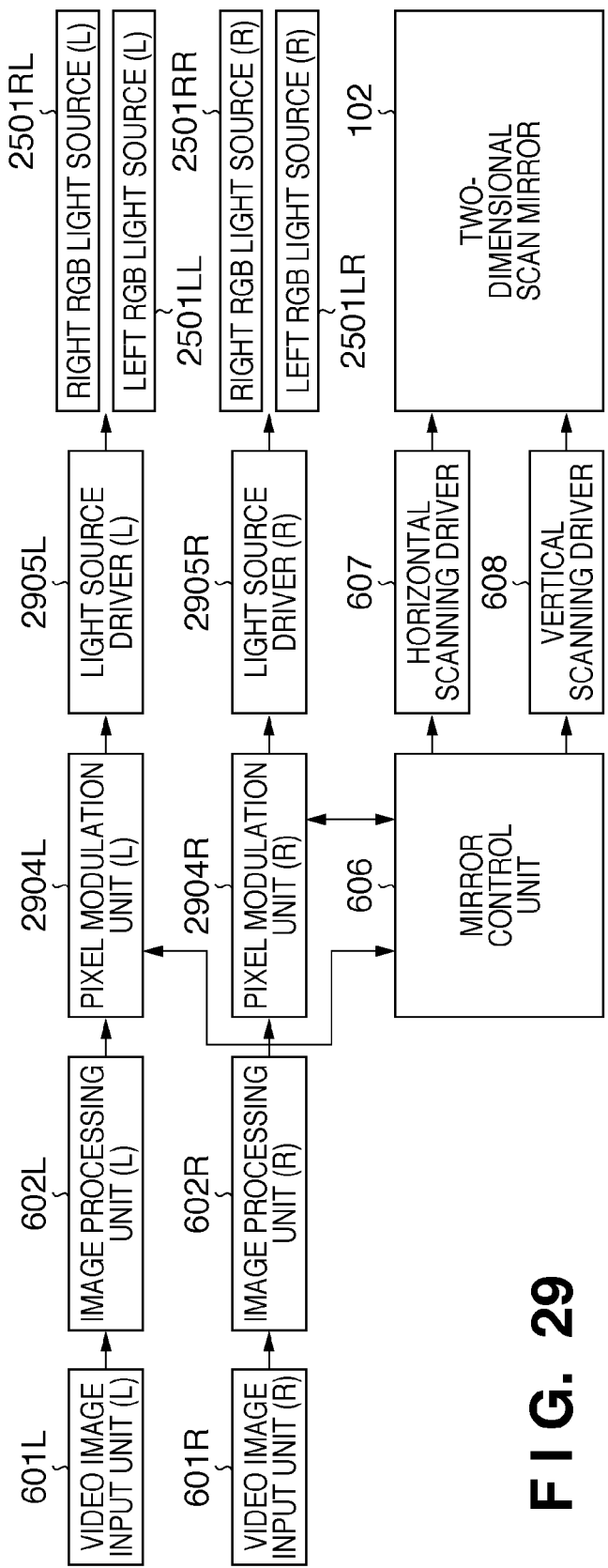
FIG. 29 is a block diagram showing an example of the arrangement of the image display apparatus according to the seventh embodiment.

FIG. 29 is a block diagram showing an example of the arrangement of the image display apparatus according to the seventh embodiment. A left-eye pixel modulation unit 2904L converts the value of the left-eye video image data processed by a left-eye image processing unit 602L into a level, thereby performing amplitude modulation. A right-eye pixel modulation unit 2904R converts the value of the right-eye video image data processed by a right-eye image processing unit 602R into a level, thereby performing amplitude modulation. A left-eye light source driver 2905L causes the left-eye left three-color light source 2501LL and the left-eye right three-color light source 2501RL to emit light of the respective colors in accordance with the level value obtained by amplitude modulation of the left-eye pixel modulation unit 2904L. A right-eye light source driver 2905R causes a right-eye left three-color light source 2501LR and a right-eye right three-color light source 2501RR to emit light of the respective colors in accordance with the level value obtained by amplitude modulation of the right-eye pixel modulation unit 2904R. A mirror control unit 606 generates a control signal of the two-dimensional scan mirror 102 based on the timings of the left-eye image signal input to the left-eye pixel modulation unit 2904L and the right-eye image signal input to the right-eye pixel modulation unit 2904R. A horizontal scanning driver 607 causes the two-dimensional scan mirror 102 to horizontally scan based on a horizontal control signal generated by the mirror control unit 606. A vertical scanning driver 608 causes the two-dimensional scan mirror 102 to vertically scan based on a vertical control signal.

The remaining components are the same as in the first embodiment, and a description thereof will not be repeated. Note that the arrangement of the optical system is slightly different from that of the first embodiment. However, the components are the same as in the first embodiment except the video image generation unit 104, and a description thereof will not be repeated.

The difference between the seventh embodiment and the first embodiment will mainly be explained below with reference to FIGS. 25 to 29.

The optical arrangement of the image display apparatus according to the seventh embodiment is the same as in FIG. 1. FIG. 25 shows details of the video image generation unit 104 in the optical arrangement.

Left-eye video image display will be described first using FIGS. 1 and 25. The left-eye left three-color light source 2501LL including the left-eye left red light source, the left-eye left green light source, the left-eye left blue light source, and the left-eye left dichroic prism emits the left-eye left three-color light beam 2505LL. The emitted left-eye left three-color light beam 2505LL irradiates the two-dimensional scan mirror 102 which makes a reciprocating rotation and oscillation in the horizontal and vertical directions. The left-eye left two-dimensional scanning light beam 2506LL reflected by the two-dimensional scan mirror 102 forms the left-eye left projection image 2508LL on the left-eye diffusing plate 103L. The left-eye right three-color light source 2501RL including the left-eye right red light source, the left-eye right green light source, the left-eye right blue light source, and the left-eye right dichroic prism emits the left-eye right three-color light beam 2505RL. The emitted left-eye right three-color light beam 2505RL irradiates the two-dimensional scan mirror 102 which makes a reciprocating rotation and oscillation in the horizontal and vertical directions. The left-eye right two-dimensional scanning light beam 2506RL reflected by the two-dimensional scan mirror 102 is further reflected by the left-eye two-dimensional scanning light beam horizontal reflecting mirror 2507L to form the left-eye right projection image 2508RL on the left-eye diffusing plate 103L.

The left-eye left projection image 2508LL and the left-eye right projection image 2508RL formed on the left-eye diffusing plate 103L change from light beams to spread light due to the diffusing effect. The light beams form an enlarged virtual image via a left-eye ocular optical system 105L, and the image is guided to the left eye as a left-eye image light 106L.

The control method in horizontal scanning according to the seventh embodiment will be described next with reference to FIG. 26.

Horizontal scanning requires to oscillate the mirror at a high speed. In this embodiment, the mirror is oscillated by resonance. The left-eye left scanning locus 2601LL and the left-eye right scanning locus 2601RL in FIG. 26 represent the loci of the left-eye left two-dimensional scanning light beam 2506LL and the left-eye right two-dimensional scanning light beam 2506RL at that time. Since vertical scanning is performed at a constant velocity, the left-eye left scanning locus 2601LL and the left-eye right scanning locus 2601RL draw curves like sine curves in the left-eye left projection image 2508LL and the left-eye right projection image 2508RL, as shown in FIG. 26. In each locus, a video image is displayed at each solid line portion, whereas no image is displayed at each dotted line portion. The solid line portions correspond to hatched regions indicated by the left-eye left light source driving period 2602LL and the left-eye right light source driving period 2602RL along the time axis. Actually, uniform outputs are rarely obtained because the light emission intensity of a light source changes depending on the value of input video image data. FIG. 26 shows uniform outputs for descriptive convenience. For the sake of simplicity, FIG. 26 illustrates scanning in three reciprocations. The actual number of times of scanning is normally much larger. In FIG. 26, the left light source is lit on the forward path of horizontal scanning, and the right light source is lit on the backward path. However, this may be reversed.

Combining the left video image and the right video image will be explained next with reference to FIG. 27.

The arrangement shown in FIG. 26 enables tiling display of left and right video images. However, the scanning loci of the left-eye left projection image 2508LL and the left-eye right projection image 2508RL have a slight shift in the vertical direction at the left-eye left/right projection image overlap portion 2509L. Directly observing this display, the user perceives the slight shift in the video image at the left-eye left/right projection image overlap portion 2509L, resulting in sense of incongruity. To prevent this, the position of the left-eye right three-color light source 2501RL is adjusted to shift the left-eye right scanning locus 2601RL upward in the vertical direction, thereby eliminating the shift between the scanning loci, as shown in FIG. 27.

If the left and right projection images directly overlap, the brightness of the left-eye left/right projection image overlap portion 2509L becomes higher than that in other regions. This problem can generally be solved by gradually changing the brightness of the projection image at the left-eye left/right projection image overlap portion 2509L. More specifically, the brightness of the left-eye left projection image 2508LL is gradually lowered rightward in the left-eye left/right projection image overlap portion 2509L. On the other hand, the brightness of the left-eye right projection image 2508RL is gradually lowered leftward in the left-eye left/right projection image overlap portion 2509L. In this way, the brightness is changed so that the sum of the maximum brightness of the left-eye left projection image 2508LL and that of the left-eye right projection image 2508RL equals the maximum brightness of other regions. This solves the problem that the brightness of the left-eye left/right projection image overlap portion 2509L becomes higher than that in other regions. Note that the brightness change processing can be done using the left-eye image processing unit 602L and the right-eye image processing unit 602R.

Scan positions at the respective scanning timings will be described next with reference to FIGS. 28A to 28D.

The vertical positions are the same as in the first embodiment. FIGS. 28A to 28D therefore show only the apparatus viewed from the upper side for descriptive convenience. FIG. 28A illustrates the position of the left-eye left two-dimensional scanning light beam 2506LL when the two-dimensional scan mirror 102 turns to the counterclockwise limit of horizontal scanning. FIG. 28B illustrates the position of the left-eye left two-dimensional scanning light beam 2506LL when the two-dimensional scan mirror 102 turns to the clockwise limit of horizontal scanning. FIG. 28C illustrates the position of the left-eye right two-dimensional scanning light beam 2506RL when the two-dimensional scan mirror 102 turns to the clockwise limit of horizontal scanning. FIG. 28D illustrates the position of the left-eye right two-dimensional scanning light beam 2506RL when the two-dimensional scan mirror 102 turns to the counterclockwise limit of horizontal scanning.

The internal blocks will be described next with reference to FIG. 29.

Referring to FIG. 29, first, a left-eye video image input unit 601L receives a display video image for the left eye. A right-eye video image input unit 601R receives a display video image for the right eye. The left-eye image processing unit 602L performs distortion correction (to be described later) and various kinds of image quality adjustment for the left-eye video image received by the left-eye video image input unit 601L. Similarly, the right-eye image processing unit 602R performs distortion correction (to be described later) and various kinds of image quality adjustment for the right-eye video image received by the light-eye video image input unit 601R. The left-eye pixel modulation unit 2904L converts the value of the left-eye video image data processed by the left-eye image processing unit 602L into a level, thereby performing amplitude modulation. The left-eye light source driver 2905L causes the left-eye left three-color light source 2501LL and the left-eye right three-color light source 2501RL to emit light of the respective colors in accordance with the level value obtained by amplitude modulation of the left-eye pixel modulation unit 2904L. The right-eye pixel modulation unit 2904R converts the value of the right-eye video image data processed by the right-eye image processing unit 602R into a level, thereby performing amplitude modulation. The right-eye light source driver 2905R causes the right-eye left three-color light source 2501LR and the right-eye right three-color light source 2501RR to emit light of the respective colors in accordance with the level value obtained by amplitude modulation of the right-eye pixel modulation unit 2904R.

The mirror control unit 606 generates a control signal of the two-dimensional scan mirror 102 based on the timings of the left-eye image signal input to the left-eye pixel modulation unit 2904L and the right-eye image signal input to the right-eye pixel modulation unit 2904R. The horizontal scanning driver 607 causes the two-dimensional scan mirror 102 to horizontally scan based on a horizontal control signal generated by the mirror control unit 606. The vertical scanning driver 608 causes the two-dimensional scan mirror 102 to vertically scan based on a vertical control signal generated by the mirror control unit 606.

As described above, the control unit including the pixel modulation units 2904L and 2904R and the mirror control unit 606 according to the seventh embodiment controls the display operation in the following way. While rotating in the first direction of the reciprocating rotation, the reflection surface of the two-dimensional scan mirror 102 reflects the first light beam and generates the first scanning light beam (e.g., left-eye left two-dimensional scanning light beam 2506LL). While rotating in the second direction opposite to the first direction, the reflection surface reflects the second light beam and generates the second scanning light beam (e.g., left-eye right two-dimensional scanning light beam 2506RL). The left-eye two-dimensional scanning light beam horizontal reflecting mirror 2507L makes the scanning directions of the first and second scanning light beams generated during the reciprocating rotation of the reflection surface coincide with the scanning direction of the image signal.

This arrangement enables tiling display of images on the diffusing plates corresponding to the left and right eyes during the reciprocating rotation of the two-dimensional scan mirror in the lateral direction. In the tiling display, the left video image and the right video image have the same scanning slope. Additionally, the scan positions can coincide with each other at the overlap portion of the left and right video images. This eliminates the scan shift at the overlap portion of the left and right video images and consequently makes the joint unnoticeable. Additionally, since scanning of the right video image is done in the same direction as the normal raster scanning direction, the buffer for each light source can be omitted.

The distortion correction method is the same as that described in the first embodiment with reference to FIGS. 7A to 7C.

In the above description, the two-dimensional scanning light beam reflected by the left-eye two-dimensional scanning light beam horizontal reflecting mirror 2507L is the beam on the right side. The present invention is practicable even when the arrangement reflects the light beam on the left side.

The left-eye ocular optical system 105L and a right-eye ocular optical system 105R are not limited to those shown in FIG. 1. Any other optical arrangement having the same function is usable.

In the above explanation, a two-dimensional scan mirror which scans in the horizontal and vertical directions is used. However, different elements may do horizontal scanning and vertical scanning.

In the above description, distortion correction is performed by image processing. However, the present invention is also practicable using an optical member for distortion correction inserted between each diffusing plate and the two-dimensional scan mirror. In this case, each image processing unit need not have the distortion correction function.

In the above description, a light beam is projected onto each diffusing plate. However, the present invention is also practicable without diffusing plates.

Tiling display of video images arranged on the left and right sides has been described above. However, the present invention is not limited to this and is also practicable by tiling display with video images arranged on the upper and lower sides or simple multi display of a plurality of video images.

The above-described apparatus is a binocular apparatus using the left-eye ocular optical system 105L and the right-eye ocular optical system 105R. However, it may be a monocular apparatus using only the left-eye or right-eye system.

In the above explanation, the left and right video images overlap. However, the present invention is practicable even without overlap. In this case, the position accuracy in the horizontal direction needs to be high.

The above-described apparatus is a viewfinder-type apparatus using ocular optical systems. However, it may be a projection-type apparatus such as a projector. In this case, the diffusing plate in the above description corresponds to the projection screen.

The eighth embodiment will be described next. In the seventh embodiment, two light sources are used for tiling display of images for one eye. In the eighth embodiment, this is implemented by one light source. Note that the tiling display example of the eighth embodiment is the same as in the seventh embodiment (FIG. 27). The light source driving timing of vertical scanning and distortion correction of the eighth embodiment are the same as in the first embodiment (FIGS. 4 and 7A to 7C).

Figure 30:
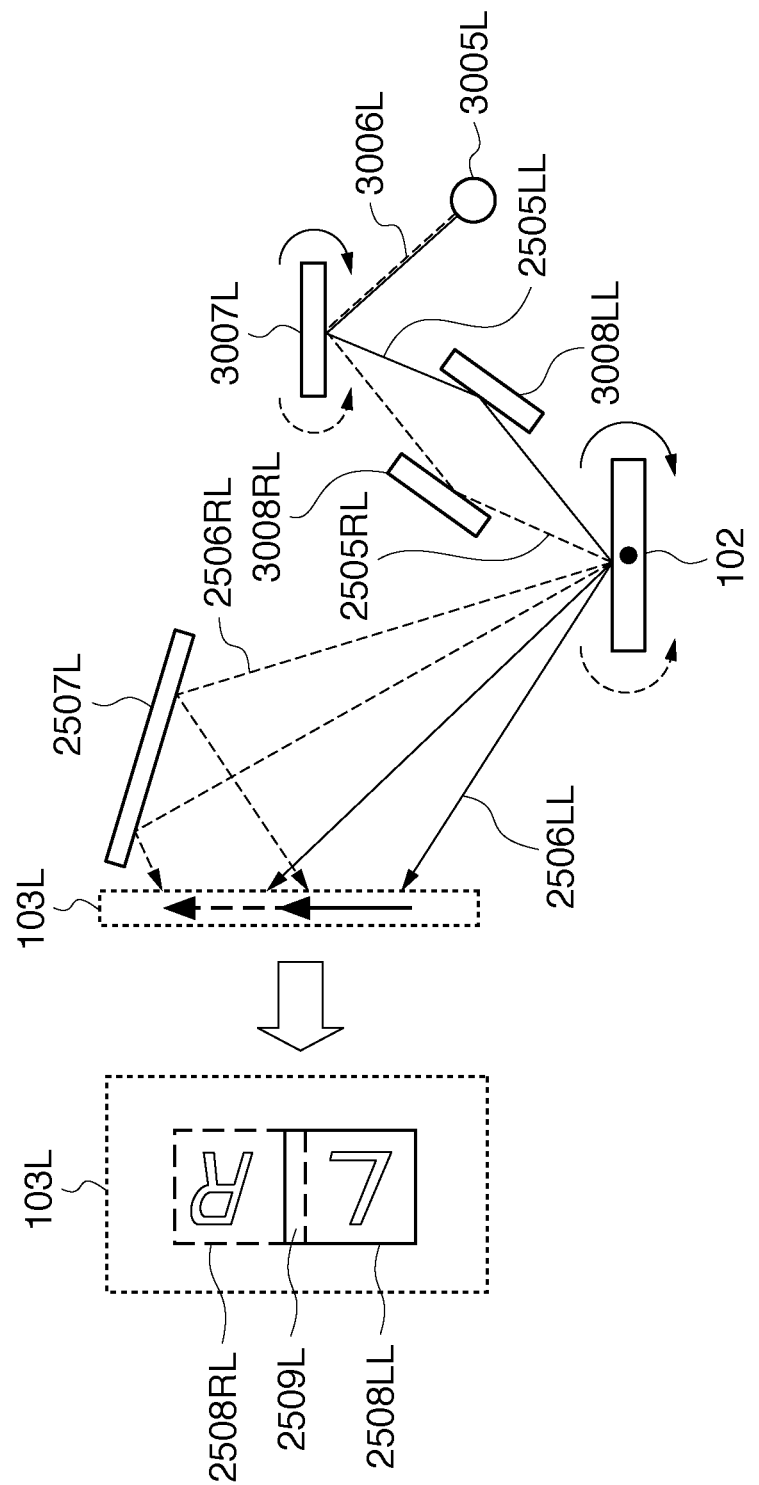
FIG. 30 is a view showing the arrangement of the video image generation unit of each of the image display apparatuses according to the eighth and ninth embodiments viewed from the upper side (vertical scanning direction)

FIG. 30 is a view showing the arrangement of a video image generation unit 104 of an image display apparatus according to the eighth embodiment of the present invention. Referring to FIG. 30, a left-eye three-color light source 3005L includes a left-eye red light source, a left-eye green light source, a left-eye blue light source, and a left-eye dichroic prism.

A left-eye three-color light beam 3006L includes light beams emitted by the left-eye red light source, the left-eye green light source, and the left-eye blue light source and put together by the left-eye dichroic prism. A left-eye horizontal optical deflector 3007L switches the direction of the left-eye three-color light beam 3006L between a right-eye video image and a left-eye video image. The left-eye horizontal optical deflector 3007L is formed from, for example, a digital micromirror device (to be referred to as a DMD hereinafter) or an acousto-optic element (to be referred to as an AOE hereinafter).

A left-eye left light beam reflecting mirror 3008LL reflects a left-eye left three-color light beam 2505LL toward a two-dimensional scan mirror 102. A left-eye right light beam reflecting mirror 3008RL reflects the left-eye right three-color light beam 2505RL toward the two-dimensional scan mirror 102.

Figure 31:
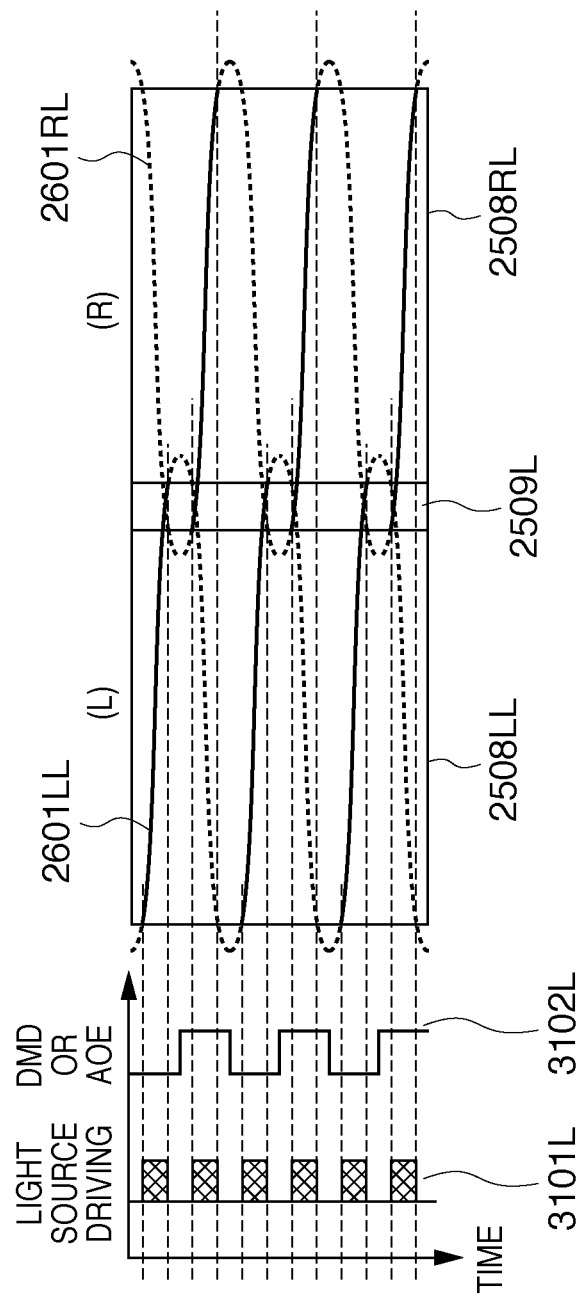
FIG. 31 is a timing chart showing the light source driving timing of horizontal scanning in each of the image display apparatuses according to the eighth and ninth embodiments.

FIG. 31 shows the light source driving timing of horizontal scanning in the image display apparatus according to the eighth embodiment. Referring to FIG. 31, a left-eye light source driving period 3101L indicates the driving state of the left-eye three-color light source 3005L during the horizontal scanning. A left-eye deflection direction switching signal 3102L indicates the deflection direction of the left-eye horizontal optical deflector 3007L.

FIGS. 32A to 32D are views showing scan positions at the respective scanning timings. The vertical positions are the same as in the seventh embodiment. FIGS. 32A to 32D therefore show only the apparatus viewed from the upper side for descriptive convenience. FIG. 32A illustrates the position of a left-eye left two-dimensional scanning light beam 2506LL when the two-dimensional scan mirror 102 turns to the counterclockwise limit of horizontal scanning. FIG. 32B illustrates the position of the left-eye left two-dimensional scanning light beam 2506LL when the two-dimensional scan mirror 102 turns to the clockwise limit of horizontal scanning. FIG. 32C illustrates the position of a left-eye right two-dimensional scanning light beam 2506RL when the two-dimensional scan mirror 102 turns to the clockwise limit of horizontal scanning. FIG. 32D illustrates the position of the left-eye right two-dimensional scanning light beam 2506RL when the two-dimensional scan mirror 102 turns to the counterclockwise limit of horizontal scanning.

FIG. 33 is a block diagram showing an example of the arrangement of the image display apparatus according to the eighth embodiment. Referring to FIG. 33, a left-eye pixel modulation unit 3304L converts the value of left-eye video image data processed by a left-eye image processing unit 602L into a level, thereby performing amplitude modulation. A right-eye pixel modulation unit 3304R converts the value of right-eye video image data processed by a right-eye image processing unit 602R into a level, thereby performing amplitude modulation. A left-eye light source driver 3305L causes the left-eye three-color light source 3005L to emit light of the respective colors in accordance with the level value obtained by amplitude modulation of the left-eye pixel modulation unit 3304L. A right-eye light source driver 3305R causes the right-eye three-color light source 3005R to emit light of the respective colors in accordance with the level value obtained by amplitude modulation of the right-eye pixel modulation unit 3304R. A mirror control unit 3306 generates control signals for the two-dimensional scan mirror 102 and the optical deflectors 3007L and 3007R based on the timings of the left-eye image signal input to the left-eye pixel modulation unit 3304L and the right-eye image signal input to the right-eye pixel modulation unit 3304R. A left-eye horizontal optical deflector driver 3302L drives the left-eye horizontal optical deflector 3007L to switch the left-eye three-color light beam between the right-eye video image and the left-eye video image. A right-eye horizontal optical deflector driver 3302R drives the right-eye horizontal optical deflector 3007R to switch the right-eye three-color light beam between the right-eye video image and the left-eye video image.

The remaining components are the same as in the seventh embodiment, and a description thereof will not be repeated.

Note that the arrangement of the optical system is slightly different from that of the first embodiment. However, the components are the same as in the first embodiment except the video image generation unit 104, and a description thereof will not be repeated.

In this embodiment, only the left eye side will be described because control is common to the right and left eye sides.

The difference between the eighth embodiment and the seventh embodiment will mainly be explained below with reference to FIGS. 30 to 33.

The eighth embodiment is different from the seventh embodiment in that the left-eye light source is commonly used to form the left and right video images, and the left-eye horizontal optical deflector 3007L generates the left-eye left three-color light beam 2505LL and the left-eye right three-color light beam 2505RL. Referring to FIG. 30, the red, green, and blue light sources generate red, green, and blue light beams, respectively. The left-eye dichroic prism brings them together into one light beam and emits the left-eye three-color light beam 3006L. The left-eye horizontal optical deflector 3007L switches the emitted left-eye three-color light beam 3006L to the left-eye left three-color light beam 2505LL or the left-eye right three-color light beam 2505RL. Then, the left-eye left light beam reflecting mirror 3008LL and the left-eye right light beam reflecting mirror 3008RL reflect the left-eye left three-color light beam 2505LL and the left-eye right three-color light beam 2505RL, respectively, toward the two-dimensional scan mirror 102. The succeeding operation is the same as in the seventh embodiment, and a description thereof will not be repeated.

Referring to FIG. 31, the eighth embodiment is different from the seventh embodiment in that
the light source driving periods are unified into the left-eye light source driving period 3101L because the left-eye light source is common to the left and right video images, and
switching between the left and right video images is done by adding the left-eye deflection direction switching signal 3102L.

Note that the left-eye deflection direction switching signal 3102L indicates that the deflection direction of the left-eye three-color light beam 3006L is switched to the left video image direction on the left side in FIG. 31 and to the right video image direction on the right side.

FIGS. 32A to 32D are the same as in FIGS. 28A to 28D except that they incorporate the contents of the description of FIG. 30.

Referring to FIG. 33, each of the three-color light sources 3005L and 3005R is commonly used to form left and right video images, unlike the seventh embodiment (FIG. 28A to 28D). Furthermore, the horizontal optical deflector drivers 3302L and 3302R and the horizontal optical deflectors 3007L and 3007R are added to switch between the left and right video images.

As described above, in the eighth embodiment, the additional horizontal optical deflectors 3007L and 3007R allow to commonly use a single light source for left and right video images and omit the circuits corresponding to one light source system, unlike the seventh embodiment.

In the above description, a light source of three colors, that is, red, green, and blue is used. However, the present invention is not limited to this and can also be practiced using monochromatic light or a combination of other colors. In the eighth embodiment, since the single three-color light source 3005L is used for display, it is impossible to avoid the shift of the display position at a left-eye left/right projection image overlap portion 2509L shown in FIG. 31 by adjusting the position of the light source. That is, the method described in the seventh embodiment is not applicable to avoid the positional shift in tiling display. In the eighth embodiment, the positional shift in tiling display is avoided by adjusting the positions and orientations of the left-eye horizontal optical deflector 3007L and the left-eye left light beam reflecting mirror 3008LL or the left-eye right light beam reflecting mirror 3008RL. That is, adjusting the relationship in the position and orientation among the element and mirrors enables to change the incident angle of the left-eye left three-color light beam 2505LL or the left-eye right three-color light beam 2505RL on the two-dimensional scan mirror 102. The video image on one side can thus shift in the vertical direction.

In the above description, the two-dimensional scanning light beam reflected by the left-eye two-dimensional scanning light beam horizontal reflecting mirror 2507L is the beam on the right side. The present invention is practicable even when the arrangement reflects the light beam on the left side.

A left-eye ocular optical system 105L and a right-eye ocular optical system 105R are not limited to those shown in FIG. 1. Any other optical arrangement having the same function is usable.

In the above explanation, a two-dimensional scan mirror which scans in the horizontal and vertical directions is used. However, different elements may do horizontal scanning and vertical scanning.

In the above description, distortion correction is performed by image processing. However, the present invention is also practicable using an optical member for distortion correction inserted between each diffusing plate and the two-dimensional scan mirror. In this case, each image processing unit need not have the distortion correction function.

In the above description, a light beam is projected onto each diffusing plate. However, the present invention is also practicable without diffusing plates.

The above-described apparatus is a binocular apparatus using the left-eye ocular optical system 105L and the right-eye ocular optical system 105R. However, it may be a monocular apparatus using only the left-eye or right-eye system.

In the above explanation, the left and right video images overlap. However, the present invention is practicable even without overlap. In this case, the position accuracy in the horizontal direction needs to be high.

The above-described apparatus is a viewfinder-type apparatus using ocular optical systems. However, it may be a projection-type apparatus such as a projector. In this case, the diffusing plate in the above description corresponds to the projection screen.

Ninth Embodiment

The ninth embodiment will be described next. In the ninth embodiment, an arrangement that combines the display form using division in the vertical direction described in the sixth embodiment with the display form using division in the horizontal direction described in the eighth embodiment will be explained. Hence, a video image generation unit according to the ninth embodiment has an arrangement formed by combining the eighth embodiment (FIG. 30) and the sixth embodiment (FIG. 21). The light source driving timing of horizontal scanning of the ninth embodiment is the same as in the eighth embodiment (FIG. 31). The light source driving timing of vertical scanning of the ninth embodiment uses the processing of the sixth embodiment (FIG. 22). Scan positions at the respective horizontal scanning timings of the ninth embodiment are the same as in the eighth embodiment (FIG. 32). Scan positions at the respective vertical scanning timings are the same as in the sixth embodiment (FIG. 23). Distortion correction is the same as in the first embodiment.

Figure 34:
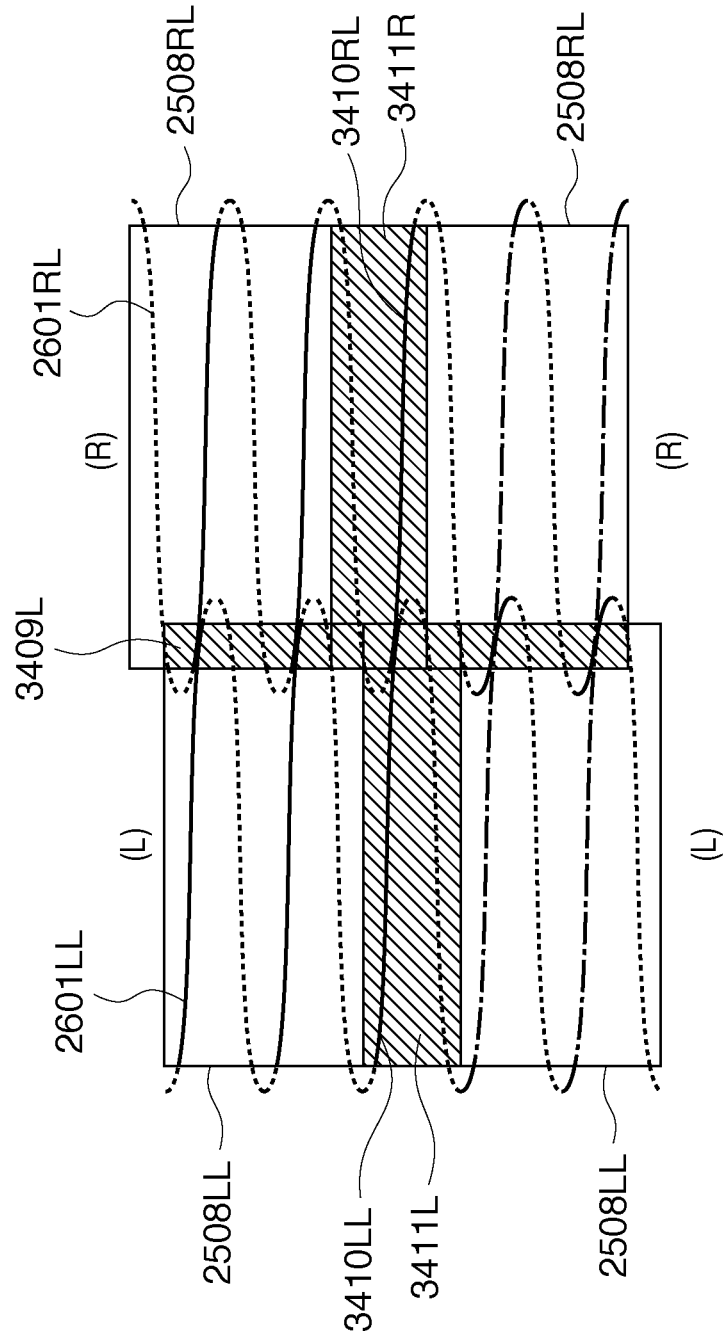
FIG. 34 is a view showing an example of tiling display in the image display apparatus according to the ninth embodiment.

FIG. 34 is a view showing an example of tiling display according to the ninth embodiment. Referring to FIG. 34, a left-eye left/right/upper/lower projection image overlap portion 3409L indicates the overlap of four left-eye left, right, upper, and lower video images of tiling display. Overlap portions 3410LL and 3410RL indicate the overlap portions of upper and lower display images (scanning lines).

Figure 35:
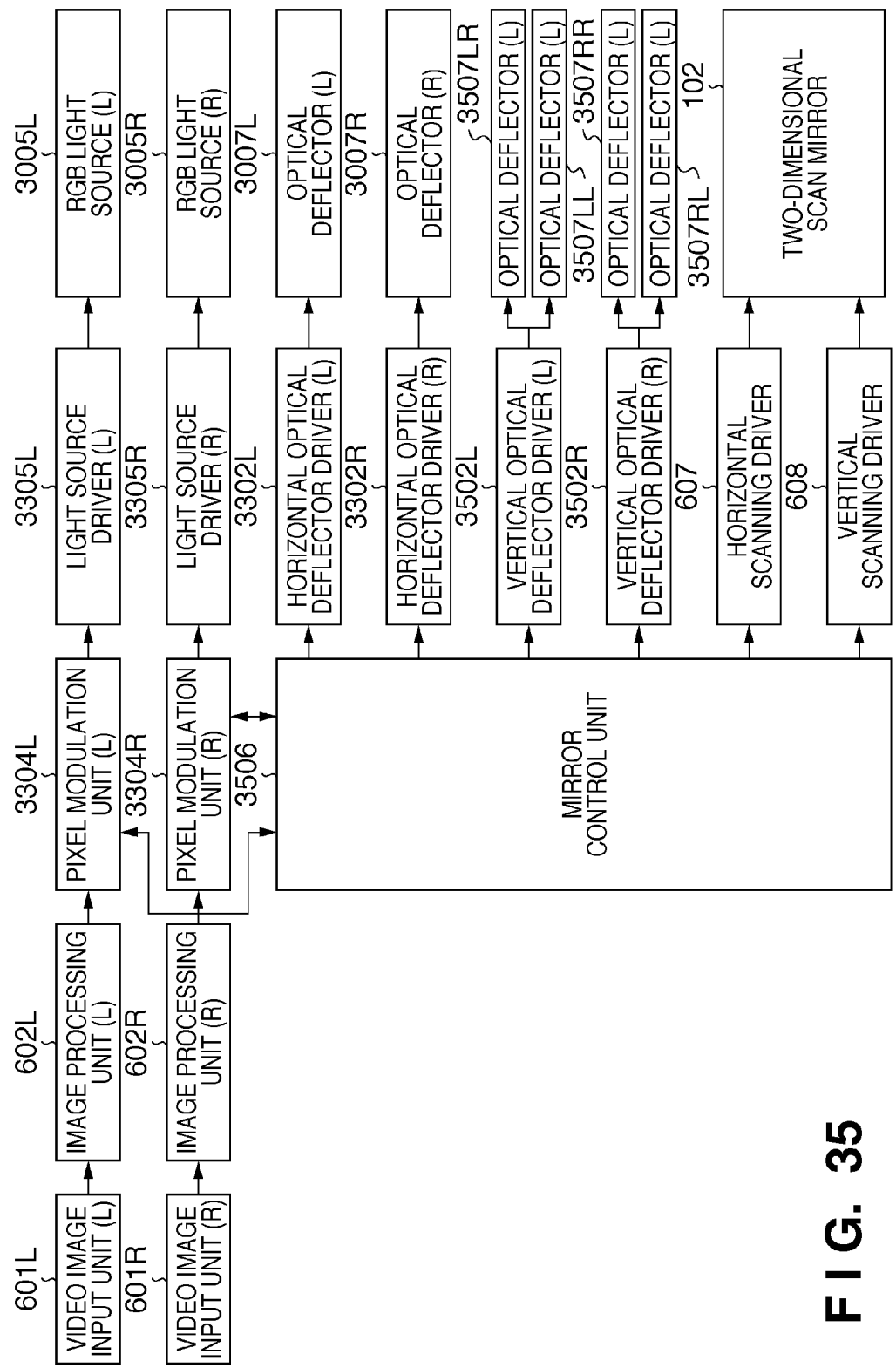
FIG. 35 is a block diagram showing an example of the arrangement of the image display apparatus according to the ninth embodiment.

FIG. 35 is a block diagram of an image display apparatus according to the ninth embodiment. The image display apparatus has an arrangement formed by combining the arrangement in FIG. 24 with that in FIG. 33. A mirror control unit 3506 generates control signals for a two-dimensional scan mirror 102, and optical deflectors 3007L, 3007R, 3507L, and 3507R based on the timings of the left-eye image signal input to a left-eye pixel modulation unit 3304L and the right-eye image signal input to a right-eye pixel modulation unit 3304R. A left-eye horizontal optical deflector driver 3502L drives left-eye vertical optical deflectors 3507LL and 3507LR to switch the left-eye three-color light beam to the upper video image or the lower video image. A right-eye horizontal optical deflector driver 3502R drives right-eye vertical optical deflectors 3507RL and 3507RR to switch the right-eye three-color light beam to the upper video image or the lower video image. Since a vertical optical deflector is necessary in each of two horizontal deflection directions, two vertical optical deflectors are provided for each eye (one driver is provided in correspondence with every two vertical optical deflectors because they are not operated simultaneously). The left-eye horizontal optical deflector driver 3502L and the right-eye horizontal optical deflector driver 3502R have the same functions as the optical deflector drivers 2002L and 2002R of the sixth embodiment (FIG. 24).

The remaining drawings are the same as in the eighth and sixth embodiments, and a description thereof will not be repeated. Note that the arrangement of the optical system is slightly different from that of the eighth embodiment. However, the components are the same as in the eighth embodiment except a video image generation unit 104, and a description thereof will not be repeated.

As described above, in the ninth embodiment, adding the method of the sixth embodiment to the eight embodiment enables tiling display of four left-eye left, right, upper, and lower video images.

The ninth embodiment has been described using the method of the sixth embodiment. However, the ninth embodiment is also practicable using the method of the fifth embodiment. The ninth embodiment is also practicable using the method of the fourth embodiment. In this case, although not four video images but two left and right video images are displayed in tiling display, the same effect as described above can be obtained.

In the above description, a light source of three colors, that is, red, green, and blue is used. However, the present invention is not limited to this and can also be practiced using monochromatic light or a combination of other colors.

In the above description, the two-dimensional scanning light beam reflected by a left-eye two-dimensional scanning light beam horizontal reflecting mirror 2507L is the beam on the right side. The present invention is practicable even when the arrangement reflects the light beam on the left side.

A left-eye ocular optical system 105L and a right-eye ocular optical system 105R are not limited to those shown in FIG. 1. Any other optical arrangement having the same function is usable.

In the above explanation, a two-dimensional scan mirror which scans in the horizontal and vertical directions is used. However, different elements may do horizontal scanning and vertical scanning.

In the above description, distortion correction is performed by image processing. However, the present invention is also practicable using an optical member for distortion correction inserted between each diffusing plate and the two-dimensional scan mirror. In this case, each image processing unit need not have the distortion correction function.

In the above description, a light beam is projected onto each diffusing plate. However, the present invention is also practicable without diffusing plates.

The above-described apparatus is a binocular apparatus using the left-eye ocular optical system 105L and the right-eye ocular optical system 105R. However, it may be a monocular apparatus using only the left-eye or right-eye system.

In the above explanation, the left, right, upper, and lower video images overlap. However, the present invention is practicable even without overlap. In this case, the position accuracy in the horizontal and vertical directions needs to be high.

The above-described apparatus is a viewfinder-type apparatus using ocular optical systems. However, it may be a projection-type apparatus such as a projector. In this case, the diffusing plate in the above description corresponds to the projection screen.

The embodiments have been described above in detail. The present invention can take a form of, for example, a system, apparatus, method, program, or storage medium. More specifically, the present invention is applicable to a system including a plurality of devices, or an apparatus including a single device.

The present invention also incorporates a case in which the functions of the above-described embodiments are achieved by supplying a software program to the system or apparatus directly or from a remote site and causing the computer of the system or apparatus to read out and execute the supplied program code. In this case, the supplied program is a computer program corresponding to the flowcharts illustrated in the embodiments.

As described above, according to the embodiments, it is possible to provide an image display apparatus that enables stereoscopic vision by causing the left- and right-eye systems to share a two-dimensional scan mirror. Alternatively, the optical paths for the left- and right-eye video images or the left and right video images are individually separated and used in the forward path and the backward path of horizontal scanning. This facilitates to maintain a constant resonance frequency. Using the optical paths even in the forward path and the backward path of vertical scanning enables to make the laser beam that irradiates the two-dimensional scan mirror almost uniform, and further facilitates to maintain a constant resonance frequency.

The periods when the left- and right-eye laser beams simultaneously irradiate the two-dimensional scan mirror and periods when neither laser beam irradiates it are eliminated. It is therefore possible to reduce the temperature unevenness caused by a time-rate variation in the temperature of the two-dimensional scan mirror and image distortion caused by a time-rate shift in the resonance frequency.

If reciprocating scanning is directly used in tiling display, the scanning direction of the left video image and that of the right video image are different. The scan position shifts at the overlap portion of the left and right video images, and this makes the joint of the overlap portion of the left and right video images noticeable. Additionally, since scanning of the right video image is done in a direction opposite to the normal raster scanning direction, each light source needs a buffer in general. In the seventh to ninth embodiments of the present invention, however, the same scanning direction is maintained for the left and right video images. This solves the above problems.

According to the present invention, the periods when both the left- and right-eye laser beams irradiate the reflection surface and periods when neither irradiates it are eliminated. This makes it possible to reduce the temperature unevenness on the reflection surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-207401, filed Aug. 11, 2008, which is hereby incorporated by reference herein in its entirety.

What is claimed is:

1. An image display apparatus comprising:
a generation unit which generates a first light beam and a second light beam corresponding to image signals to eyes of an observer;
a reflection unit which has a reflection surface to reflect the first light beam and the second light beam and causes the reflection surface to make a reciprocating rotation about a first axis, thereby converting the first light beam and the second light beam into a first scanning light beam and a second scanning light beam to scan in a lateral direction;
a forming unit which forms images observable by the eyes of the observer based on the first scanning light beam and the second scanning light beam; and
a control unit which controls said generation unit, while the reflection surface executes the reciprocating rotation, to generate the first light beam during a first period in which the reflection surface rotates in a first rotation direction of the reciprocating rotation and generate the second light beam during a second period in which the reflection surface rotates in a second rotation direction opposite to the first rotation direction,
wherein,
a scanning direction of the first scanning light beam in the lateral direction coincides with a scanning direction of the image signal, and a scanning direction of the second scanning light beam is opposite to the scanning direction of the image signal,
the apparatus further comprises a holding unit which holds an image signal of at least one scanning line of the image signal corresponding to the second scanning light beam, and
said generation unit generates the second light beam by reading out the image signal of one scanning line held by said holding unit from an opposite direction.

2. The apparatus according to claim 1, wherein said reflection unit also causes the reflection surface to make a reciprocating rotation about a second axis perpendicular to the first axis so as to cause the first scanning light beam and the second scanning light beam to scan in a longitudinal direction perpendicular to the lateral direction, thereby causing the first scanning light beam and the second scanning light beam to two-dimensionally scan.

3. The apparatus according to claim 2, wherein said generation unit generates, as the first light beam, a light beam corresponding to an odd-numbered line of the image signal corresponding to one eye, and as the second light beam, a light beam corresponding to an even-numbered line of the image signal corresponding to the other eye while the reflection surface rotates in a third direction which is one of directions of the reciprocating rotation about the second axis, and as the first light beam, a light beam corresponding to an even-numbered line of the image signal corresponding to said one eye, and as the second light beam, a light beam corresponding to an odd-numbered line of the image signal corresponding to said other eye while the reflection surface rotates in a fourth direction opposite to the third direction.

4. The apparatus according to claim 3, further comprising a holding unit which holds the even-numbered line of the image signal corresponding to said one eye and the odd-numbered line of the image signal corresponding to said other eye while the reflection surface rotates in the third direction, wherein said generation unit generates the first light beam and the second light beam using the image signals held by said holding unit while the reflection surface rotates in the fourth direction.

5. The apparatus according to claim 2, further comprising an optical member which makes each of the first light beam and the second light beam incident on the reflection surface via one of a first optical path and a second optical path, wherein said control unit controls said generation unit and said optical member to make the light beam incident on the reflection surface via the first optical path to generate a scanning light beam to form an upper image of an image based on the image signal while the reflection surface rotates in the third direction and make the light beam incident on the reflection surface via the second optical path to generate a scanning light beam to form a lower image of the image based on the image signal while the reflection surface rotates in the fourth direction.

6. The apparatus according to claim 5, further comprising an optical path control unit which controls the optical path of the scanning light beam to make scan positions of the scanning light beams which form the upper image and the lower image coincide with a scanning order of the image signals.

7. The apparatus according to claim 1, wherein said forming unit comprises:

a first diffusing plate and a second diffusing plate which generate first image light and second image light upon projecting the first scanning light beam and the second scanning light beam; and a light guide unit which guides the first image light and the second image light generated by said first diffusing plate and said second diffusing plate to the eyes of the observer.

8. The apparatus according to claim 1, further comprising an optical member which makes the scanning directions of the first scanning light beam and the second scanning light beam in the lateral direction coincide with the scanning directions of the image signals, wherein said generation unit generates the first light beam and the second light beam in accordance with an input order of the image signals.

9. The apparatus according to claim 1, wherein said generation unit comprises separate light sources to generate the first light beam and the second light beam.

10. The apparatus according to claim 1, wherein said generation unit comprises an optical deflector to generate the first light beam and the second light beam from a common light source.

11. The apparatus according to claim 1, further comprising a distortion correction unit which corrects distortion generated by an optical path length difference upon scanning when causing each of first scanning light beam and the second scanning light beam to form an image on an optical member which diffuses a light beam.

12. The apparatus according to claim 11, wherein said distortion correction unit corrects the distortion by distorting an image represented by the image signal in correspondence with the distortion.

13. A method of controlling an image display apparatus including:

a generation unit which generates a first light beam and a second light beam corresponding to video images for eyes of an observer;

a reflection unit which has a reflection surface to reflect the first light beam and the second light beam and causes the reflection surface to make a reciprocating rotation about a first axis, thereby converting the first light beam and the second light beam into a first scanning light beam and a second scanning light beam to scan in a lateral direction; and a forming unit which forms images observable by the eyes of the observer based on the first scanning light beam and the second scanning light beam, the method comprising:

controlling the generation unit, while the reflection surface executes the reciprocating rotation, to generate the first light beam during a first period in which the reflection surface rotates in a first rotation direction of the reciprocating rotation and generate the second light beam during a second period in which the reflection surface rotates in a second rotation direction opposite to the first rotation direction, wherein, a scanning direction of the first scanning light beam in the lateral direction coincides with a scanning direction of the image signal, and a scanning direction of the second scanning light beam is opposite to the scanning direction of the image signal, the apparatus further comprises a holding unit which holds an image signal of at least one scanning line of the image signal corresponding to the second scanning light beam, and said method further includes a step of controlling the generation unit to generate the second light beam by reading out the image signal of one scanning line held by said holding unit from an opposite direction.

* * * * *